(12) United States Patent
Zhao et al.

(10) Patent No.: US 11,265,071 B2
(45) Date of Patent: Mar. 1, 2022

(54) ELECTRONIC DEVICE, METHOD AND APPARATUS FOR WIRELESS COMMUNICATION SYSTEM, AND STORAGE MEDIUM

(71) Applicants: Sony Corporation, Tokyo (JP); Peiyao Zhao, Beijing (CN)

(72) Inventors: Peiyao Zhao, Beijing (CN); Zhaocheng Wang, Beijing (CN); Jianfei Cao, Beijing (CN)

(73) Assignee: SONY CORPORATION, Tokyo (JP)

( * ) Notice: Subject to any disclaimer, the term of this patent is extended or adjusted under 35 U.S.C. 154(b) by 0 days.

(21) Appl. No.: 16/760,460

(22) PCT Filed: Dec. 25, 2018

(86) PCT No.: PCT/CN2018/123602
§ 371 (c)(1),
(2) Date: Sep. 24, 2020

(87) PCT Pub. No.: WO2019/129006
PCT Pub. Date: Jul. 4, 2019

(65) Prior Publication Data
US 2021/0013954 A1    Jan. 14, 2021

(30) Foreign Application Priority Data
Dec. 29, 2017    (CN) .......................... 201711469227.0

(51) Int. Cl.
*H04B 7/06* (2006.01)
*H04B 7/08* (2006.01)
(52) U.S. Cl.
CPC .................................. *H04B 7/088* (2013.01)
(58) Field of Classification Search
CPC .... H04B 7/0617; H04B 7/0695; H04B 7/088; H04B 7/08
(Continued)

(56) References Cited

U.S. PATENT DOCUMENTS

2013/0051364 A1* 2/2013 Seol ...................... H04W 16/28
370/331
2013/0102345 A1 4/2013 Jung
(Continued)

FOREIGN PATENT DOCUMENTS

CN         105099636 A    11/2015
CN         107276649 A    10/2017
(Continued)

OTHER PUBLICATIONS

Partial Supplementary European Search Report dated Dec. 17, 2020 in European Patent Application No. 18893796.5, 25 pages.
(Continued)

*Primary Examiner* — Emmanuel Bayard
(74) *Attorney, Agent, or Firm* — Xsensus LLP

(57) ABSTRACT

The present disclosure relates to electronic device, method and storage medium for a wireless communication system. One embodiment of the present disclosure proposes beam management based on matching condition of channel path parameters under different beams. An electronic device includes a processing circuitry configured to: estimate, based on reference signals which are transmitted from the transmitter of the wireless communication system based on at least one second beam included in coverage of a first beam, parameters for channel paths from the transmitter to the receiver corresponding to the second beam, and wherein a particular second beam of the at least one second beam is selected based on the estimated parameters for channel paths, and the estimated parameter for channel path corresponding to the particular second beam matches parameter for channel path corresponding to the first beam.

17 Claims, 22 Drawing Sheets

(58) Field of Classification Search
USPC .................................. 375/267, 299, 347–349
See application file for complete search history.

(56) References Cited

U.S. PATENT DOCUMENTS

| | | | |
|---|---|---|---|
| 2013/0215844 A1* | 8/2013 | Seol ..................... | H04B 7/0695 |
| | | | 370/329 |
| 2013/0217404 A1 | 8/2013 | Jung | |
| 2013/0223251 A1 | 8/2013 | Li et al. | |
| 2014/0314167 A1* | 10/2014 | Jeong .................. | H04B 7/0626 |
| | | | 375/267 |
| 2015/0010112 A1* | 1/2015 | Liu ...................... | H04B 7/0617 |
| | | | 375/316 |
| 2016/0226729 A1 | 8/2016 | Ramachandra | |
| 2016/0241322 A1* | 8/2016 | Son ..................... | H04B 7/0617 |
| 2017/0117947 A1* | 4/2017 | Petersson ............ | H01Q 21/061 |
| 2017/0208494 A1* | 7/2017 | Moon .................. | H04L 5/0048 |
| 2017/0251460 A1* | 8/2017 | Agiwal ............... | H04W 72/0406 |
| 2017/0338956 A1 | 11/2017 | Badawy et al. | |
| 2018/0041319 A1* | 2/2018 | Cheng ................. | H04L 5/0048 |
| 2018/0049042 A1* | 2/2018 | Yu ....................... | H04W 16/28 |
| 2018/0062720 A1* | 3/2018 | Islam .................. | H04L 5/0053 |
| 2018/0083680 A1* | 3/2018 | Guo ..................... | H04L 5/0048 |
| 2019/0044601 A1* | 2/2019 | Chang ................. | H04L 5/0092 |
| 2019/0052331 A1* | 2/2019 | Chang ................. | H04B 7/0626 |
| 2020/0036430 A1* | 1/2020 | Kim ..................... | H04W 24/04 |
| 2020/0059867 A1* | 2/2020 | Haghighat .......... | H04W 52/367 |

FOREIGN PATENT DOCUMENTS

| | | |
|---|---|---|
| WO | 2017/044155 A1 | 3/2017 |
| WO | 2017/155016 A1 | 9/2017 |
| WO | 2017/196612 A1 | 11/2017 |
| WO | 2017/214969 A1 | 12/2017 |

OTHER PUBLICATIONS

International Search Report and Written Opinion dated Mar. 28, 2019 for PCT/CN2018/123602 filed on Dec. 25, 2018, 9 pages including English Translation of the International Search Report.

* cited by examiner

ELECTRONIC DEVICE, METHOD AND APPARATUS FOR WIRELESS COMMUNICATION SYSTEM, AND STORAGE MEDIUM

CROSS-REFERENCE OF RELATED APPLICATIONS

The present disclosure is based on PCT filing PCT/CN2018/123602, filed Dec. 25, 2017, and claims the benefit of priority to Chinese patent application No. 201711469227.0 filed on Dec. 29, 2017 each of which is hereby incorporated by reference in its entirety.

FIELD OF THE INVENTION

The present disclosure relates generally to a wireless communication system, and particularly to techniques for beam management in a wireless communication system.

BACKGROUND

With the development and widespread application of mobile Internet technology, wireless communication has unprecedentedly met people's voice and data communication needs. With increase of the used frequency bands (such as 26 GHz, 60 GHz or higher frequency bands), wireless channels will definitely suffer greater negative effects such as path loss, atmospheric absorption loss and the like compared with lower frequency bands (such as 2 GHz). In order to provide higher communication quality and capacity, a wireless communication system uses various technologies at different levels.

In recent years, Massive Multi-Input Multi-Output (MIMO) technology and millimeter wave technology are considered to be parts of key technologies of future 5G, and have attracted extensive attention in the academics and industry. The millimeter wave band has a large amount of available spectrum resources, which can meet the growing traffic demand of mobile communications. In addition, because the millimeter wave has a short wavelength, according to the antenna theory, sizes of antennas for a millimeter wave system are also small, making it possible to place hundreds or even thousands of antennas in a small range of space, which further contribute to application of a large-scale antenna technology in a real-world system.

In addition, in the large-scale antenna technology, a beam forming technology can be used to effectively make up for a shortcoming that millimeter wave channels fade dramatically, which provides a possibility for application of the millimeter wave technology in mobile communications. Beamforming can increase directivity of antenna transmission and/or reception to provide a beamforming gain to compensate for loss of wireless signals. For this reason, 3GPP introduced a concept of Beam Management in the formulation of 5G standards. One of the important processes is Beam Sweeping. In the beam sweeping technology, a beam sweeping process is used to find a transmission beam and a receiving beam matching between a base station and a terminal equipment, thereby establishing a beam pair link (BPL) between the base station and the terminal equipment.

In the application of the beamforming technology, as more and more beams are capable of being swept, the beam management becomes more and more cumbersome.

DISCLOSURE OF THE INVENTION

In view of the above, the present disclosure provides an electronic device, method, and apparatus for a wireless communication system, and a storage medium.

One aspect of the present disclosure relates to an electronic device for a receiver side of a wireless communication system. According to an embodiment, the electronic device can include a processing circuitry. The processing circuitry can be configured to estimate, based on reference signals which are transmitted from a transmitter side of the wireless communication system via at least one second beam included in coverage of a first beam, parameters for channel paths from the transmitter to the receiver corresponding to the second beam, and wherein a particular second beam of the at least one second beam can be selected based on the estimated parameters for channel paths, and the estimated parameter for channel path corresponding to the particular second beam matches parameter for channel path corresponding to the first beam.

Another aspect of the present disclosure relates to an electronic device for a transmitter side of a wireless communication system. According to an embodiment, the electronic device can include a processing circuitry, which can be configured to transmit reference signals to a receiver side of the wireless communication system via at least one second beam included in coverage of a first beam, and wherein a particular second beam of the at least one second beam can be selected based on estimated parameters for channel paths from the transmitter to the receiver corresponding to the second beam, and the estimated parameter for channel path corresponding to the particular second beam matches parameter for channel path corresponding to the first beam.

Another aspect of the present disclosure relates to an electronic device for a receiver side of a wireless communication system. According to an embodiment, the electronic device may include a processing circuitry, which can be configured to estimate a receive channel path parameter based on reference signals which are received with a first beam acting as a receiving beam and transmitted from a transmitter side of the wireless communication system with a second beam acting as a transmission beam; transmit reference signals to the transmitter side with the first beam acting as a transmission beam, wherein the transmitter side receives the reference signals with the second beam acting as a receiving beam, so that a transmit channel path parameter can be estimated; and wherein beam reciprocity between the transmitter side and the receiver side can be determined based on the receive channel path parameter and the transmit channel path parameter.

Another aspect of the present disclosure relates to an electronic device for a transmitter side of a wireless communication system. According to an embodiment, the electronic device may include a processing circuitry, which can be configured to transmit reference signals to a receiver side of the wireless communication system with a second beam acting as a transmission beam, wherein the receiver side receives the reference signals with a first beam acting as a receiving beam, so that a transmit channel path parameter can be estimated; estimate a receive channel path parameter based on reference signals which are received with the second beam acting as a receiving beam and transmitted from the receiver side with the first beam acting as a transmission beam; wherein beam reciprocity between the transmitter side and the receiver side can be determined based on the receive channel path parameter and the transmit channel path parameter.

Another aspect of the present disclosure relates to an electronic device for a receiver side of a wireless communication system. According to an embodiment, the electronic device may include a processing circuitry, which can be configured to: for each of a plurality of transmission beams which are used by a transmitter side of the wireless communication system for transmitting reference signals, based on the reference signals transmitted based on the transmission beam, estimate a path gain magnitude in a time domain of a channel path from the transmitter side to the receiver side corresponding to the transmission beam, and wherein a particular one of the plurality of transmission beams can be determined based on the estimated path gain magnitude in the time domain.

Another aspect of the present disclosure relates to an electronic device for a transmitter side of a wireless communication system. According to an embodiment, the electronic device may include a processing circuitry, which can be configured to transmit reference signals to a receiver side of the wireless communication system via each of a plurality of transmission beams, wherein for each of a plurality of transmission beams, based on the reference signals transmitted via the transmission beam, a path gain magnitude in a time domain of a channel path from the transmitter to the receiver corresponding to the transmission beam can be estimated, and wherein a particular one of the plurality of transmission beams can be determined based on the estimated path gain magnitudes in the time domain.

Another aspect of the present disclosure relates to a method for a receiver side of a wireless communication system. According to an embodiment, the method comprises estimating, based on reference signals which are transmitted from a transmitter side of the wireless communication system via at least one second beam included in coverage of a first beam, parameters for channel paths from the transmitter to the receiver corresponding to the second beam, and wherein a particular second beam of the at least one second beam can be selected based on the estimated parameters for channel paths, and the estimated parameter for channel path corresponding to the particular second beam matches parameter for channel path corresponding to the first beam.

Another aspect of the present disclosure relates to a method for a transmitter side of a wireless communication system. According to an embodiment, the method comprises transmitting reference signals to a receiver side of the wireless communication system via at least one second beam included in coverage of a first beam, and wherein a particular second beam of the at least one second beam can be selected based on estimated parameters for channel paths from the transmitter to the receiver corresponding to the second beam, and the estimated parameter for channel path corresponding to the particular second beam matches parameter for channel path corresponding to the first beam.

Another aspect of the present disclosure relates to a method for a receiver side of a wireless communication system. According to an embodiment, the method comprises estimating a receive channel path parameter based on reference signals which are received with a first beam acting as a receiving beam and transmitted from a transmitter side of the wireless communication system with a second beam acting as a transmission beam; transmitting reference signals to the transmitter side with the first beam acting as a transmission beam, wherein the transmitter side receives the reference signals with the second beam acting as a receiving beam, so that a transmit channel path parameter can be estimated; wherein beam reciprocity between the transmitter side and the receiver side can be determined based on the receive channel path parameter and the transmit channel path parameter.

Another aspect of the present disclosure relates to a method for a transmitter side of a wireless communication system. According to an embodiment, the method comprises transmitting reference signals to a receiver side of the wireless communication system with a second beam acting as a transmission beam, wherein the receiver side receives the reference signals with a first beam acting as a receiving beam, so that a transmit channel path parameter can be estimated; estimating a receive channel path parameter based on reference signals which are received with the second beam acting as a receiving beam and transmitted from the receiver side with the first beam acting as a transmission beam; wherein beam reciprocity between the transmitter side and the receiver side can be determined based on the receive channel path parameter and the transmit channel path parameter.

Another aspect of the present disclosure relates to a method for a receiver side of a wireless communication system. According to an embodiment, the method comprises: for each of a plurality of transmission beams which are used by a transmitter side of the wireless communication system for transmitting reference signals, based on the reference signals transmitted via the transmission beam, estimating a path gain magnitude in a time domain of a channel path from the transmitter to the receiver corresponding to the transmission beam, and wherein a particular one of the plurality of transmission beams can be determined based on the estimated path gain magnitude in the time domain.

Another aspect of the present disclosure relates to a method for a transmitter side of a wireless communication system. According to an embodiment, the method comprises: transmitting reference signals to a receiver side of the wireless communication system via each of a plurality of transmission beams, wherein for each of a plurality of transmission beams, based on the reference signals transmitted via the transmission beam, a path gain magnitude in a time domain of a channel path from the transmitter to the receiver corresponding to the transmission beam can be estimated, and wherein a particular one of the plurality of transmission beams can be determined based on the estimated path gain magnitude in the time domain.

Yet another aspect of the present disclosure relates to a computer-readable storage medium storing one or more instructions. In some embodiments, the one or more instructions, when executed by one or more processors of an electronic device, cause the electronic device to perform methods according to various embodiments of the present disclosure.

Yet another aspect of the present disclosure relates to various devices including components or units for performing operations of methods according to embodiments of the present disclosure.

The above content is provided to summarize some exemplary embodiments to provide a basic understanding of various aspects of the subject matter described herein. Therefore, the above-mentioned features are merely examples and should not be construed as narrowing the scope or spirit of the subject matter described herein in any way. Other features, aspects, and advantages of the subject matter described herein will become apparent from the following detailed description with reference to the accompanying drawings.

DESCRIPTION OF THE DRAWINGS

A better understanding of the present disclosure may be obtained when considering following detailed description of embodiments in conjunction with the accompanying drawings. The same or similar reference numerals are used in the drawings to indicate the same or similar components. Figures are included in the present specification together with the following detailed description and form a part of the specification, for illustrating the embodiments of the present disclosure and explaining principles and advantages of the present disclosure. Among them.

Figure 1A:
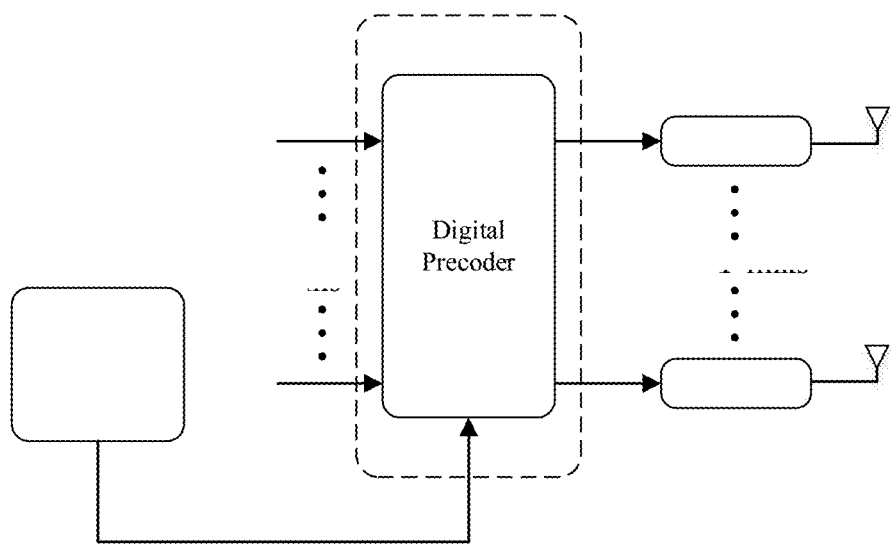
FIG. 1A schematically illustrates a conceptual structure of a base station.

Although the embodiments described in this disclosure may be susceptible to various modifications and alternative forms, specific embodiments thereof are shown by way of example in the drawings and are described in detail herein. It should be understood, however, that the drawings and detailed description thereof are not intended to limit the embodiments to the particular forms disclosed, but on the contrary, the intention is to cover all modifications, equivalents, and alternatives falling within the spirit and scope of the claims. Program.

DETAILED DESCRIPTION OF PREFERRED EMBODIMENTS

Representative applications of various aspects of the device and method according to the present disclosure are described below. These examples are described only to enrich the context and to help to understand the described embodiments. Therefore, it is clear to those skilled in the art that the embodiments described below can be implemented without some or all of the specific details. In other cases, well-known process steps have not been described in detail in order to avoid unnecessarily obscuring the described embodiments. Other applications are possible, and the solutions of the present disclosure are not limited to these examples.

Typically, a wireless communication system includes at least a base station and a user equipment (UE), and the base station provides communication services for one or more UEs.

In this disclosure, the term "base station" has the full breadth of its usual meaning and includes at least wireless communication station that is used as a part of a wireless communication system or a radio system to facilitate communication. As an example, the base station may be, for example, an eNB in a 4G communication standard, a gNB in a 5G communication standard, a remote radio head, a wireless access point, a UAV control tower, or a communication apparatus performing similar functions. Application examples of the base station will be described in detail below with reference to the figures.

In this disclosure, the term "user equipment" or "UE" has the full breadth of its usual meaning and includes at least terminal equipment that is used as a part of a wireless communication system or a radio system to facilitate communication. As an example, the UE may be a terminal equipment such as a mobile phone, a laptop computer, a tablet computer, a vehicle on-board communication apparatus, or the like, or an element thereof. Application examples of the UE will be described in detail below.

In the present disclosure, the term "transmitter side"/"transmitting side" has the full breadth of its usual meaning, and generally indicate a side in a communication system for transmitting a signal flow. Depending on the direction of the signal flow in the communication system, such as uplink/downlink signal transmission, the "transmitter side"/"transmitting side" can indicate "base station" or "user equipment" side of the communication system. Similarly, the term "receiver side"/"receiving side" has the full breadth of its usual meaning, and may accordingly indicate the "user equipment" or "base station" side in a communication system.

It should be noted that although the embodiments of the present disclosure are mainly described below based on a communication system including a base station and a user equipment, these descriptions can be correspondingly extended to a case of a communication system including a transmitter side and a receiver side. For example, depending on the direction of the signal flow in the communication system, the operation at the transmitter side may correspond to the operation of the base station or the operation of the user equipment, and the operation at the receiver side may correspond to the operation of the user equipment or the operation of the base station. It should be noted that the transmitter and the receiver can both be user equipments. For example, in the short-distance-based communication such as device-to-device (D2D), Internet of Vehicles (V2X) and so on, the transmitting side and the receiving side both are user equipments. Correspondingly, the transmitter and the receiver may both be the base station. For example, in a system including a mobile base station, for the wireless communication between a mobile base station and a fixed base station or the wireless communication between a mobile base station and another mobile base station, the transmitting side and the receiving side both are base stations.

The base station and the UE may have multiple antennas supporting MIMO technology. The use of MIMO technology enables the base station and the UE to use the spatial domain to support spatial multiplexing, beamforming, and transmission diversity. Spatial multiplexing can be used to transmit different data streams in the same frequency simultaneously. The data streams can be sent to a single UE to increase the data rate (can be classified as SU-MIMO technology) or to multiple UEs to increase the total system capacity (can be classified as MU-MIMO technology). This is done by spatially precoding each data stream (i.e. performing magnitude scaling and/or phase adjustment) and then transmitting each spatially precoded stream on downlinks (DL) from the base station to the UE via multiple transmission antennas. The spatially precoded data streams arrive at one or more UEs with different spatial signatures, which enables each UE to receive the data streams via its multiple antennas and restore one or more data streams destined for that UE. On uplinks (UL) from the UE to the base station, each UE transmits a spatially pre-coded data stream via its multiple antennas, which enables the base station to receive the data streams via its antennas and identify the source of each spatially pre-encoded data stream.

In a wireless communication system, generally, at a transmitting side (for example, a base station side) and a receiving side (for example, a user equipment), each antenna is connected to a radio frequency link for transmission and reception. Generally speaking, in operation, at the transmitting side, a data stream to be transmitted is first subject to baseband processing, and then converted into a radio frequency signal via a radio frequency link for transmission through a corresponding antenna, and the corresponding radio frequency link at the receiving side processes the received radio frequency signal into a baseband signal, and then further performs baseband processing to obtain the desired data stream.

Generally, in a baseband data processing, in order to enable multiple data streams to multiplex the same transmission resources for transmission via radio frequency links and corresponding antennas, a digital precoding architecture is mainly used. Magnitudes of signals transmitted via respective radio frequency links can be adjusted so as to reduce interference between multiple data signals carried on the same transmission resources. Such processing performed before data is transmitted via a radio frequency link and an antenna may be referred to as baseband digital processing of data at a transmitting side.

For example, FIG. 1A schematically illustrates a conceptual structure of a prior art base station. As shown in FIG. 1A, in the digital precoding architecture, the base station is equipped with M antennas (M is an integer and M≥1), and each antenna is arranged with a corresponding radio frequency link. Under the control of a controller, a digital precoder obtains K-way data streams (K is an integer and K≥1) and performs digital precoding on the K-way data streams (for example, the K-way data stream passes through a M×K digital precoding matrix B). The encoded data is sent to one or more users via radio frequency link(s) and antenna(s).

Correspondingly, the user side may have multiple configuration forms, so that corresponding baseband digital processing can be performed on the encoded data received via the radio frequency links in order to obtain the desired data stream.

Figure 1B:
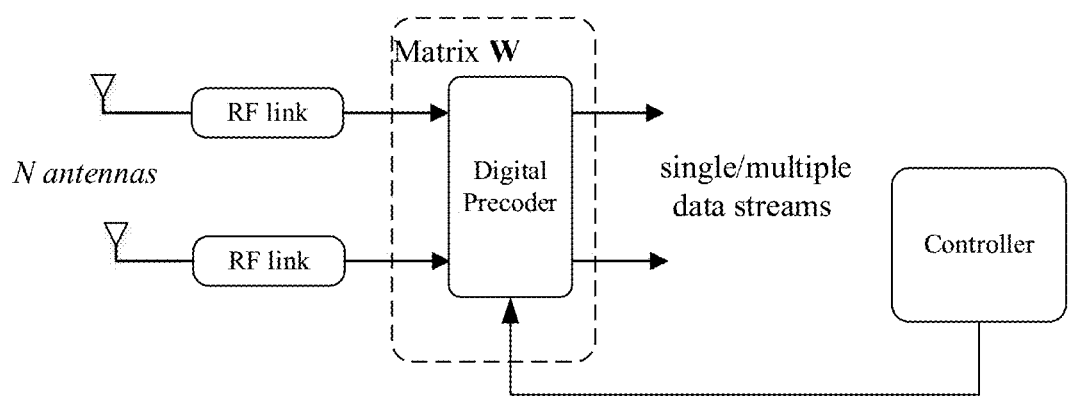
FIG. 1B schematically illustrates a conceptual structure of a user equipment.

FIG. 1B shows a user side equipped with multiple antennas. As shown in FIG. 1B, the user side is equipped with N antennas (N is an integer and N≥1). Each antenna transmits the received data to the digital precoder through a corresponding radio frequency link. Under the control of the controller, the digital precoder uses a digital precoding matrix W with a size of Ku×N (Ku is an integer and Ku≥1) to digitally precode the received data, thereby obtaining a single-way data (when Ku=1) or multi-way data (when Ku>1).

Further, in a wireless communication system, especially a high-frequency communication system such as a millimeter-wave communication system, and 5G NR, etc., both the base station and the user can use directional beams to overcome large path attenuation in the frequency band above 6 GHz, and to reduce hardware complexity, beams are usually generated by using analog beamforming. In the implementation of analog beamforming, a radio frequency link is connected to an antenna unit through a phase shifter, and a beam is generated by adjusting the phase of the phase shifter. In order to improve the signal-to-noise ratio at the receiving side, the beam direction needs to match the channel direction, that is, the base station side beam is aligned with the channel transmission angle (Angle of Departure, AoD) and the user side beam is aligned with the channel arrival angle (Angle of Arrival, AoA).

Due to the limited number of radio frequency links, the prior art uses a beam sweeping method to determine beams for the transmitting and receiving sides, that is, the transmitting and receiving sides store a beamforming codebook in advance, and selects a best matching transmitting and receiving beam pair from the codebook through beam sweeping. This is often referred to as an analog beamforming training. An analog beamforming training refers to a process of optimizing RF configuration information for the base station and user equipment (for example, configuration values for phase shifters related to the base station and the user equipment, also known as weight vectors for the phase shifters), and its main effect is to improve the receiving signal-to-noise ratio of the user equipment. Taking downlink as an example, the base station configures values for multiple phase shifters connected to multiple antennas of the base station to form directional transmission beams, and the user equipment configures values for multiple phase shifters connected to multiple antennas of the user equipment to form directional receiving beams, and transmission beams of the base station and receiving beams of the user equipment form sets of beam pairs for the downlink. The process of downlink beamforming training is a process of finding an optimal beam pair composed of an optimal transmission beam of the base station and an optimal receiving beam of the user equipment. Similarly, in the uplink, the receiving beams of the base station and the transmission beams of the user equipment also form a set of beam pairs.

Figure 2:
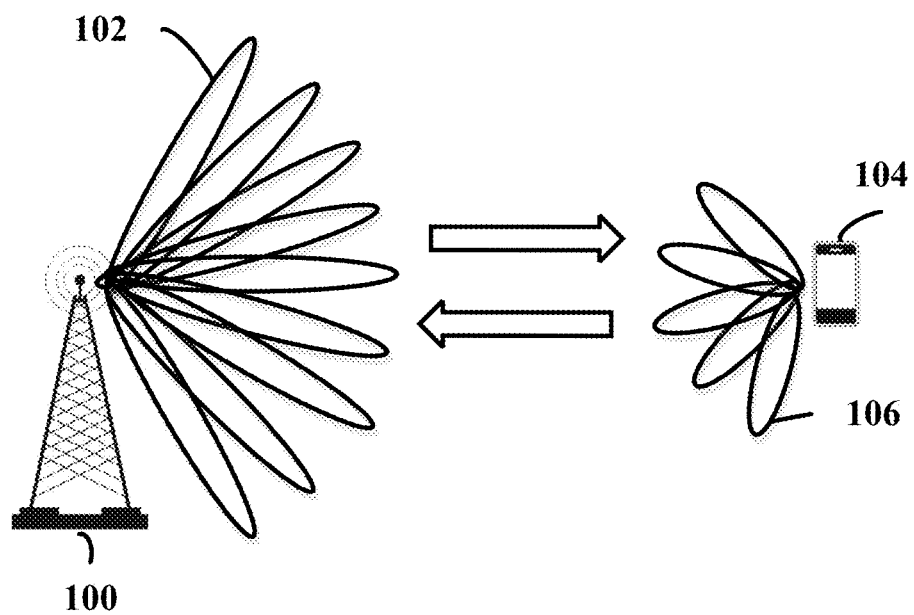
FIG. 2 schematically illustrates an exemplary beamforming operation.

The following briefly describes a beam sweeping process in the wireless communication system with reference to FIG. 2. A rightward arrow in FIG. 2 indicates a downlink direction from the base station 100 to the terminal equipment 104, and a leftward arrow indicates an uplink direction from the terminal equipment 104 to the base station 100. As shown in FIG. 2, the base station 100 includes $n_{t\_DL}$ downlink transmission beams ($n_{t\_DL}$ is a natural number greater than or equal to 1, and exemplarily illustrated as $n_{t\_DL}=9$ in FIG. 2), and the terminal equipment 104 includes $n_{r\_DL}$ downlink receiving beams ($n_{r\_DL}$ is a natural number greater than or equal to 1, and exemplarily illustrated as $n_{r\_DL}=5$ in FIG. 2). In addition, in the wireless communication system shown in FIG. 2, the number $n_{r\_UL}$ of uplink receiving beams of the base station 100 and the coverage range of each uplink receiving beam are the same as that of the downlink transmission beams. The number $n_{t\_UL}$ of uplink transmission beams of the terminal equipment 104 and the coverage range of each uplink transmission beam are the same as that of the downlink receiving beams. It should be understood that according to the system requirements and settings, the uplink receiving beams and the downlink transmission beams of the base station can have different coverage ranges and amounts, so it is for the terminal equipment.

As shown in FIG. 2, during the downlink beam sweeping process, the base station 100 sends $n_{t\_DL}$ downlink reference signals to the terminal equipment 104 via each of $n_{t\_DL}$ downlink transmission beams 102, and the terminal equipment 104 receives the $n_{r\_DL}$ downlink reference signals by using $n_{r\_DL}$ downlink receiving beams respectively. In this way, the base station 100 send $n_{t\_DL} \times n_{r\_DL}$ downlink reference signals to the terminal equipment 104 via $n_{t\_DL}$ downlink transmission beams sequentially, and the terminal equipment 104 receives $n_{t\_DL} \times n_{r\_DL}$ downlink reference signals via each downlink receiving beam 106, that is, receives a total of $n_{t\_DL} \times n_{r\_DL}$ downlink reference signals from the base station 100 via the $n_{r\_DL}$ downlink receiving beams. The terminal equipment 104 measures the $n_{t\_DL} \times n_{r\_DL}$ downlink reference signals (such as measuring the signal received powers of the downlink reference signals (such as RSRP)), so that a downlink transmission beam of the base station 100 and a downlink receiving beam of the terminal equipment 104 when the measurement result is better or the best are determined as a matching transmission and receiving beam pair for downlink, and a downlink beam pair link (hereinafter referred to as BPL) is established.

During the uplink beam sweeping, similar to the downlink beam sweeping, the terminal equipment 104 sends $n_{r\_UL}$ uplink reference signals to the base station 100 via each of $n_{t\_UL}$ uplink transmission beams 106, and the base station 100 receives the $n_{r\_UL}$ uplink reference signals by using $n_{r\_UL}$ uplink receiving beams respectively. In this way, the terminal equipment 104 sends $n_{t\_UL} \times n_{r\_UL}$ uplink reference signals to the base station 100 via the $n_{t\_UL}$ uplink transmission beams sequentially, and the base station 100 receives $n_{t\_UL}$ uplink reference signals via each uplink receiving beam 102, that is, the base station 100 receives a total of $n_{r\_UL} \times n_{t\_UL}$ uplink reference signals from the terminal equipment 104 via the $n_{r\_UL}$ uplink receiving beams. The base station 100 measures the $n_{r\_UL} \times n_{t\_UL}$ uplink reference signals (such as measuring signal received powers of the uplink reference signals (such as RSRP)), so that an uplink transmission beam of the terminal equipment 104 and an uplink receiving beam of the base station 100 when the measurement result is better or the best are determined as a matching transmission and receiving beam pair for uplink, and an uplink beam pair link is established.

It should be understood that the coverage ranges and amounts of the uplink receiving beams and the downlink transmission beams of the base station may be different, and the coverage ranges and amounts of the uplink transmission beams and the downlink receiving beams of the terminal equipments may be different, while the foregoing determination operation may still be performed similarly. For example, in the above description, both the transmitting side (base station) and the receiving side (terminal equipment) use the beamforming technology, but in an implementation, the receiving side does not use receiving beamforming and only sets a full-width receiving beam. Here, a full-width beam may refer to a beam in a case of not using beamforming, that is, a beam whose width is not narrowed by a beamforming process. For example, a beam of an omnidirectional antenna can be considered a full-width beam.

In addition, in the beam sweeping method, a multi-level scanning method can also be adopted, which distributes the beam training over multiple levels of beams. The transmitting side may be provided with hierarchical transmission beams, such as a first-level transmission beam (also referred to as a coarse transmission beam, a wide beam, etc.) and a second-level transmission beam (also referred to as a fine transmission beam, a narrow beam, etc.). The beam width of the coarse transmission beam can be wider than that of the fine transmission beam, and one coarse transmission beam can cover several fine transmission beams, and the gain of the fine transmission beam can be greater than that of the coarse transmission beam.

In the beam sweeping operation, a wide beam can be swept first to determine a coarse channel direction, and then a narrow beam sweeping can be used to determine a fine channel direction within the determined coarse channel direction. For example, the transmitting side may first perform a first-level transmission beam sweeping, and the receiving side may determine a matching first-level transmission beam in a similar manner as described above. When the transmitting side performs beam sweeping by using a second-level transmission beam covered by the matching first-level transmission beam, the receiving end may similarly determine a matching second-level transmission beam.

Figure 3:
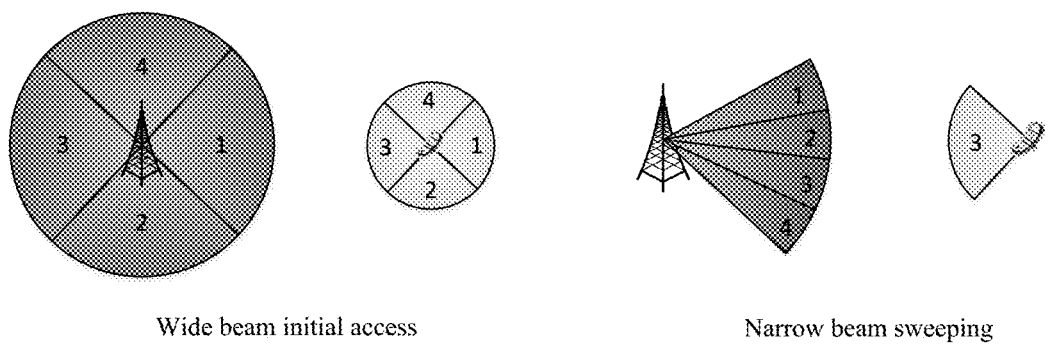
FIG. 3 schematically illustrates an example of a hierarchical beam sweeping operation between a base station and a user equipment.

FIG. 3 illustrates an exemplary hierarchical beam sweeping operation in which a wide beam is used for initial access and then a narrow beam sweeping is performed. As shown in FIG. 3, in the initial access stage, an optimal beam pair is determined as the wide beam 1 on the base station side and the receiving beam 3 on the user side. In the narrow beam sweeping stage, four narrow beams within the coverage of the wide beam 1 are swept to determine an optimal beam direction.

At present, when performing narrow beam sweeping, reception qualities of all candidate beams needs to be measured, and the information about several beams is fed back for the base station to perform beam selection. The overhead and delay of beam sweeping by this method are fixed, and when the number of narrow beams to be selected is large, the overhead and delay are high.

Figure 4:
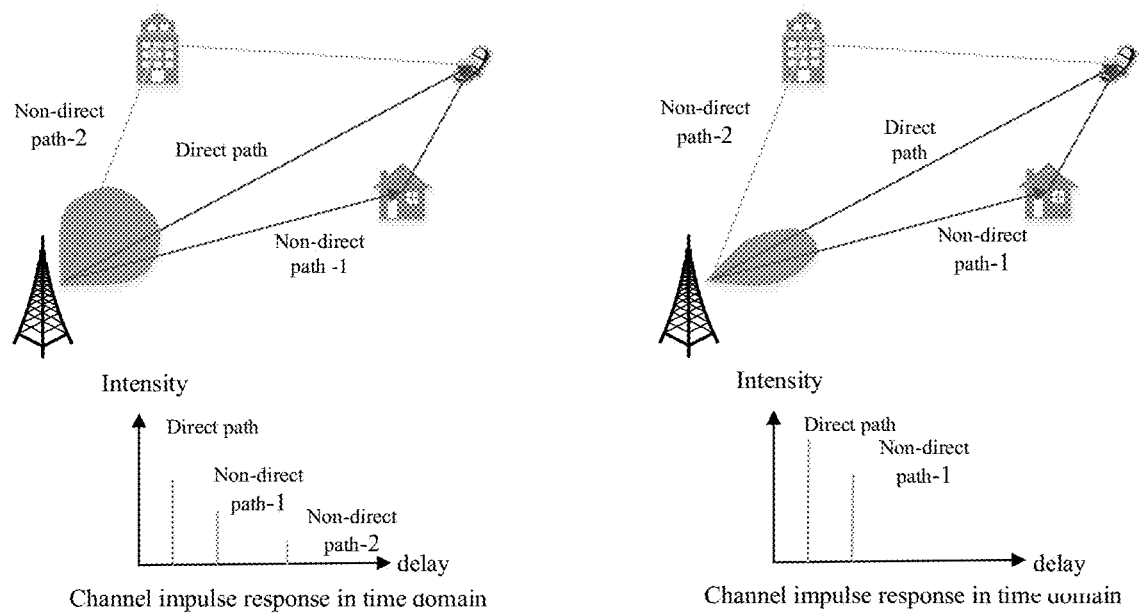
FIG. 4 is a schematic diagram of channel sparsity.

On the other hand, it is noted that a high-frequency electromagnetic wave signal has large path attenuation and reflection attenuation, and thus the channels have sparse characteristics, that is, the number of channel paths is small and the path delay is small. As the beam narrows, the number of channel paths and path delays further decrease. And, the channel paths under a narrow beam belong to a subset of the channel paths under a wide beam. As shown in FIG. 4, the channel has one direct path and two reflective paths. When a wide beam is used, all paths are within the coverage of the wide beam, so there are three paths with different delays in the impulse response of the baseband channel in time-domain. When a narrow beam is employed, since the narrow beam only covers the direct path and the non-direct path-1, there are only two paths with different delays in the impulse response of the baseband channel in time-domain. And, it is noted that the delay of each of the direct path and non-direct path-1 in the wide beam and the narrow beam should be substantially the same, and the gain in the narrow beam is greater.

Based on the above, an improved fast beam management mechanism is proposed. The basic principle of the fast beam management mechanism is to perform matching between a channel path parameter in a wide beam with the channel path parameter in respective narrow beams covered by the wide beam. If a matching condition is met, a narrow beam can be determined to be an optimal beam, and thus there is no need to sweep the remaining candidate beams, and the beam sweeping process can be ceased in advance.

Therefore, the fast beam management mechanism proposed in the present disclosure can reduce overhead and delay of narrow beam sweeping, and the performance loss is small compared with a solution of sweeping all candidate beams.

On the other hand, in a wireless communication system, it is generally believed that the following channel reciprocity can exist: when an uplink channel and a downlink channel are within the relevant time and bandwidth, the same channel impulse response (CIR) can be observed on the uplink and downlink channels. At this time, it can be considered that the uplink and downlink channels are consistent, that is, channel reciprocity exists. Moreover, the inventor of the present disclosure has realized that when there exists the channel reciprocity, there may be a certain kind of correspondence relationship between radio frequency beams of the base station and the terminal equipment, that is, beam correspondence (sometimes referred to as beam reciprocity or beam consistency). For example, the beam correspondence may include the beam correspondence of each of the base station and the terminal equipment, which is also referred to as the transmit-receive beam symmetry, and indicates that the strongest receiving beam is the same as the strongest transmission beam for a communication equipment (such as a base station or terminal equipment) on one side of the communication link. In this way, the downlink transmission (receiving) beam can be used to determine the uplink receiving (transmission) beam, so that the beam sweeping can be performed only in the uplink or downlink direction, which saves beam sweeping overhead.

In the prior art, it is generally assumed that there is a static beam reciprocity, that is, the beam reciprocity is determined according to a difference between uplink and downlink carrier frequencies, a measurement result during cell deployment, and the like. However, its disadvantage is that the same beam reciprocity state is assumed for different channel states of different users, which must inevitably lead to inaccurate beam state setting.

Based on the above, an improved beam reciprocity determination mechanism is further proposed. The basic principle of the beam reciprocity determination mechanism is to perform matching between a channel path parameter under the uplink beam with the channel path parameter under the downlink beam. If a matching condition is met, it is determined that the beam reciprocity is met.

The reciprocity measurement technology proposed by the present disclosure can measure the beam reciprocity for a specific channel state of a specific user with higher accuracy.

On the other hand, based on the above, an improved beam management mechanism is also proposed. The basic principle of the beam management mechanism is to estimate a time domain path parameter of a channel under each beam, and select a specific transmission beam for subsequent operations based on the estimated time domain path parameter.

Various implementations of the technical solutions of the present disclosure will be described in detail below.

It should be noted that the technical solution of the present disclosure is mainly applied in combination with the beam sweeping/beamforming technology, which facilitates beam sweeping/beamforming by performing estimation, matching and judgement for each swept beam during the beam sweeping/forming. The beam sweeping/beamforming technology can be applied in various operation stages in a wireless communication system. Therefore, the technical solution of the present disclosure can also be applied in these operation stages of the wireless communication system, thereby improving the implementation of beam sweeping/beamforming in these stages.

On one hand, the beamforming technology can be particularly applied to a communication process between a base station and a terminal equipment by means of reference signals. As an example, the beamforming may be used in a data transceiving process between a base station and a terminal equipment. After the downlink beam sweeping and the uplink beam sweeping processes are completed by using the reference signals, the established BPL is used to perform subsequent data and/or control signal transmission. In this case, the technical solution of the present disclosure may be performed based on reference signals.

A reference signal is a kind of known signal provided by the transmitting side to the receiving side for channel estimation or channel detection, and can be used for various measurements to determine actual channel conditions experienced by radio signals from the base station to the UE. Compared with theoretical methods such as geographic location estimation, etc., channel estimation based on reference signals is more accurate. The reference signal is of great significance for mobility management, resource allocation, MIMO operation, and data demodulation.

According to the transmission direction, a reference signal can be typically classified as an uplink reference signal and a downlink reference signal. In the time domain and/or frequency domain, the reference signals and the user data streams are multiplexed in uplink resources or downlink resources, wherein the reference signals occupy certain communication resources. The downlink reference signal is a kind of predefined signal that is transmitted from the base station to the UE and occupies a specific downlink communication resource (for example, a specific resource element in a time-frequency resource block), and is used for downlink channel estimation, downlink channel detection, cell search, and the like. The downlink reference signal includes, but not limited to, a cell reference signal (CRS), a data demodulation reference signal (DMRS), a channel state information reference signal (CSI-RS), and the like. The uplink reference signal is a predefined signal that is transmitted from the UE to the base station and occupies a specific uplink communication resource (for example, a specific resource element in a time-frequency resource block), and is used for uplink channel estimation, uplink channel quality measurement and the like. The uplink reference signal includes, but not limited to, DMRS, sounding reference signal (SRS), and the like. In one example, CSI-RS is used for downlink channel state feedback.

The "communication resource" mentioned here has different meanings in different communication systems. For example, a "communication resource" may be a time domain and/or a frequency domain resource. Taking LTE as an example, each LTE frame (10 ms) can be divided into 10 equal-sized subframes, and each subframe (1 ms) can include 2 consecutive time slots, and each time slot includes a resource block (RB). The resource block can be represented by a resource grid which can be divided into multiple resource elements (RE). For example, each resource block contains 12 consecutive subcarriers in the frequency domain, and for normal cyclic prefix in each OFDM symbol, each resource block contains 7 consecutive OFDM symbols in the time domain, that is, each resource block contains 84 resource elements. In such a LTE frame, symbols of user data or reference signals are allocated to corresponding resource elements. However, in addition to time-frequency resource, "communication resource" can also refer to air-space resource or code domain resource.

In the communication system of the present disclosure, different reference signals usually have different usage scenarios and purposes. For example, DMRS may be transmitted mainly along with PUCCH, PDCCH, PUSCH, or PDSCH for the base station to perform channel state estimation and related demodulation. SRS may be transmitted periodically or a periodically for the base station to perform channel state estimation in order to support channel-dependent scheduling and link adaptation for the uplink.

In an embodiment of the present disclosure, the reference signal may be a kind of reference signal specifically used for channel estimation such as CSI-RS/SRS; may also be a kind of reference signal inserted into data for demodulation such as DMRS (it can be inserted sparsely and less than the existing ones), where the receiving side uses DMRS on partial subcarriers to obtain channels on other subcarriers on the entire resource block carrying data and uses it for demodulation. Of course, depending on the communication system of a specific application, the reference signal may also be other types of reference signal.

On the other hand, the beamforming technology can be particularly applied to a communication process between a base station and a terminal equipment by means of a synchronization signal. The initial connection/synchronization between the terminal equipment and the base station (including, for example, the base station transmitting a synchronization signal (SS), and the terminal equipment transmitting a random access signal to the base station) is the first step to enable the terminal equipment to properly communicate with the base station. For example, the beamforming technology can be used in a process of receiving and transmitting the synchronization signal and a process of receiving and transmitting the random access signal. The technical solution of the present disclosure is also applicable in such synchronization signal beamforming, so as to compensate for loss of the synchronization signal to ensure that the terminal equipment properly performs downlink synchronization and random access procedure.

Generally speaking, the synchronization signal may include a synchronization sequence, which is known to both the base station and the terminal equipment. For example, in the LTE system, the synchronization signal includes a primary synchronization signal (PSS) and a secondary synchronization signal (SSS). The primary synchronization signal may be a Zadoff-Chu sequence with a length of 63, and the secondary synchronization signal may be a sequence with a length of 62 and be obtained by concatenating two M sequences each having a length of 31. Moreover, the synchronization signal may be transmitted in a certain time period or time pattern, for example, the synchronization signal may be transmitted at a fixed position (such as a fixed subframe, time slot, and symbol position) in a downlink frame.

In some embodiments of the present disclosure, the transmission of the synchronization signal may indicate transmitting transmission beam information used by the synchronization signal, so that the terminal equipment may obtain the transmission beam information by receiving the synchronization signal. According to some embodiments of the present disclosure, the synchronization signal may be repeatedly transmitted by the base station to multiple terminal equipments, including the terminal equipment, by using different transmission beams based on a transmission beam configuration, and the synchronization signal may include a transmission beam information used to transmit the synchronization signal.

The terminal equipment can receive the synchronization signal in a variety of ways. When receiving the synchronization signal, the terminal equipment may at least determine a transmission beam of the base station that matches the terminal equipment, and feedback the matched transmission beam to the base station in any suitable manner. At least the matched transmission beam of the base station can be used for subsequent communication between the base station and the terminal equipment (including a random access process and a data transceiving process).

In one embodiment, the terminal equipment may also use receive beamforming when receiving the synchronization signal. At this time, a receiving beam on the terminal equipment side and a transmission beam on the base station side which match can be determined when the synchronization signal is successfully received, and the matched transmission beam can be fed back to the base station. In some embodiments, in a case that the terminal equipment also uses a beamforming technology to receive the synchronization signal, the terminal equipment may also set the receiving beam of the terminal equipment to receive the synchronization signal based on the transmission beam configuration of the base station transmitting the synchronization signal. For example, because the terminal equipment needs to perform the receive beam sweeping, that is, use different receive beams to receive signals transmitted by the base station through the same transmission beam, the terminal equipment may need to know the transmission beam configuration of the base station. In one example, the transmission beam configuration of the base station may be notified to the terminal equipment in advance, for example, the terminal equipment may obtain the transmission beam configuration information of the base station from another base station. In another example, the terminal equipment may obtain the transmission beam configuration of the base station from the synchronization signal transmitted by the base station. For example, the terminal equipment may estimate the transmission beam configuration of the base station through a measurement process of the synchronization signal.

The embodiments of the present disclosure can be used for various communication frequency bands, including traditional radio frequency communication frequency bands ranging from several hundred MHz to several GHz. With enhancement of wireless communication system frequency bands, such as usage of 26 GHz, 60 GHz or higher frequency bands, wireless channels will suffer from some negative effects, such as path loss, atmospheric absorption losses, and the like, more than that for lower frequency bands (eg 2 GHz). Therefore, the technical solution according to the present disclosure is equally applicable to and even more important for high-frequency band (such as millimeter wave) communication.

The embodiments of the present disclosure may have various implementation manners, and may be applied to various wireless communication systems, and are particularly suitable for wireless communication systems with channel sparsity.

According to some embodiments, the embodiments of the present disclosure are particularly preferably applicable to a millimeter-wave orthogonal frequency division multiplexing system, and by utilizing the sparsity of the millimeter-wave channels and the stronger sparsity after beamforming thereof, improved beam management can be achieved.

According to some embodiments, the embodiments of the present disclosure may also be used in a wireless communication system that mainly communicates through a direct path. For example, in addition that the millimeter wave system has a characteristic of direct path, in the traditional decimeter/centimeter wave system and other systems, now there are a scenario where an aircraft communicates with a ground base station, and in this case, the aircraft and the base station communicates through direct paths mostly, without obstacle blocking, and thus it is also suitable for the setting of the present disclosure.

It should be noted that the above application scenarios are merely exemplary, and the embodiments of the present disclosure can also be used in other wireless channel systems with channel sparsity.

According to some embodiments, the communication system described in this disclosure is an OFDM-based communication system, and communication resources correspond to subcarriers. The following will be explained in detail on this basis, but it should be understood that the implementation described below can be equally applied to other types of communication resources. As an example, an OFDM-based non-orthogonal multiple access NOMA communication system can also be used.

The basic implementations of embodiments of the present disclosure will be described in detail below with reference to the figures. It should be noted that these basic implementations can be equally applied to the above-mentioned embodiments of the transmitter/receiver side, as well as other embodiments of the present disclosure.

System Configuration

Figure 5:
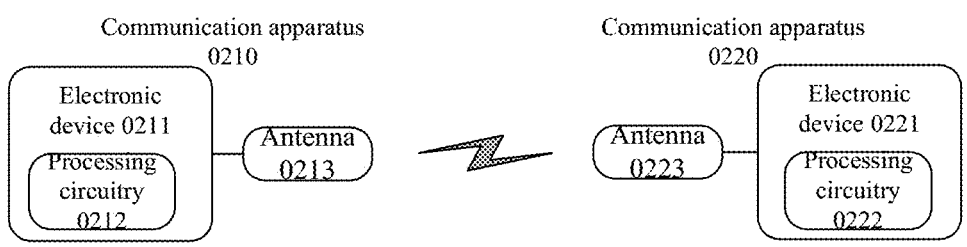
FIG. 5 illustrates an exemplary communication system.

FIG. 5 shows a schematic diagram of a communication system 0200 according to an embodiment of the present disclosure. The communication system 0200 may include a communication apparatus 0210 and a communication apparatus 0220 that wirelessly communicate with each other. Although FIG. 5 shows that one communication apparatus 0210 communicates with one communication apparatus 0220, the communication apparatus 0210 can communicate with multiple communication apparatus 0220, and the communication apparatus 0220 can communicate with multiple communication apparatus 0210, for example, in a case of multi-point cooperation.

The communication apparatus 0210 may include an electronic device 0211 and an antenna 0213. In addition, the communication apparatus 0210 may further include other components not shown, such as a radio frequency link, a baseband processing unit, a network interface, a processor, a memory, a controller, and the like. The electronic device 0211 may be associated with the antenna 0213. For example, the electronic device 0211 may be directly or indirectly connected to the antenna 0213 (for example, other components may be interposed therebetween), transmit radio signals via the antenna 0213, and receive radio signals via the antenna 0213.

The electronic device 0211 may include a processing circuitry 0212. In addition, the electronic device 0211 may further include an input-output interface and a memory. The processing circuitry 0212 in the electronic device 0211 can output (digital or analog) signals to other components in the communication apparatus 0210, and can also receive (digital or analog) signals from other components in the communication apparatus 0210. In addition, the processing circuitry 0212 may control some or all operations of other components in the communication apparatus 0210.

The processing circuitry 0212 may be in the form of a general-purpose processor, or may be a dedicated processing circuit, such as an ASIC. For example, the processing circuitry 0212 can be configured by a circuit (hardware) or a central processing device such as a central processing unit (CPU). In addition, the processing circuitry 0212 may carry a program (software) for operating the circuit (hardware) or the central processing device. The program can be stored in a memory (such as arranged in the communication apparatus 0210 or the electronic device 0211) or an external storage medium connected from the outside, and downloaded via a network (such as the Internet).

Although it is shown in FIG. 5 that the electronic device 0211 is separated from the antenna 0213, the electronic device 0211 may also be implemented as including the antenna 0213. In addition, the electronic device 0211 may also be implemented as including one or more other components in the communication apparatus 0210, or the electronic device 0211 may be implemented as the communication apparatus 0210 itself. In an actual implementation, the electronic device 0211 may be implemented as a chip (such as an integrated circuit module including a single chip), a hardware component, or a complete product.

The communication apparatus 0220 may include an electronic device 0221 and an antenna 0223, and the electronic device 0221 may include a processing circuitry 0222. In addition, the above description of the structure of the communication apparatus 0210 is also applicable to the communication apparatus 0220, and details are not described herein again.

The communication system 0200 may be a cellular communication system, a machine type communication (MTC)

system, an ad-hoc network, or a cognitive radio system (eg, IEEE P802.19.1a and Spectrum Access System (SAS)), etc.

The communication apparatus 0210 can be implemented as a base station (BS), a small base station, a Node B an e-NodeB (eNB), a g-NodeB (gNB), a relay, etc. in a cellular communication system, a terminal equipment in a MTC system, a sensor node in an ad-hoc network, a coexistence managers (CM), SAS, etc. in a cognitive radio system, and the like. For example, the communication apparatus 0210 may preferably be implemented as any type of node gNB, such as a macro gNB (associated with a macro cell) and a small gNB (associated with a small cell). A small gNB may be a gNB covering a cell smaller than a macro cell, such as a micro gNB, a pico gNB, and a home (femto) gNB. Alternatively, the communication apparatus 0210 may be implemented as any other type of base station, such as an eNB, a NodeB, and a base transceiver station (BTS). The communication apparatus 0210 may include: a main body (also referred to as a base station device) configured to control wireless communication; and one or more remote wireless headends (RRH) located different from the main body. In addition, various types of terminals which will be described later can operate as the communication apparatus 0210 by temporarily or semi-persistently performing the base station function.

The communication apparatus 0220 may be implemented as a terminal equipment or a user equipment (UE). For example, the communication apparatus 0220 may be implemented as a mobile terminal (such as a smart phone, a tablet personal computer (PC), a notebook PC, a portable game terminal, a portable/dongle-type mobile router, and a digital camera device), a UAV, or a vehicle on-board terminal (such as a car navigation equipment). The communication apparatus 0220 may also be implemented as a terminal that performs machine-to-machine (M2M) communication, also referred to as a machine type communication (MTC) terminal. In addition, the communication apparatus 0220 may be a wireless communication module (such as an integrated circuit module including a single chip) mounted on each of the terminals described above. The communication apparatus 0220 may also be implemented as a smart meter, a smart home appliance, or a Geolocation Capability Object (GCO), a Citizens Broadband Radio Service Device (CBSD) in a cognitive radio system.

For simplicity of description, the processing of the communication apparatus 0210 and 0220 will be described below on an assumption that the communication apparatus 0210 is a base station and the communication apparatus 0220 is a user equipment. The communication from the communication apparatus 0210 to the communication apparatus 0220 is referred to as downlink communication, and the communication from the communication apparatus 0220 to the communication apparatus 0210 is referred to as uplink communication. Note that in a case where the communication apparatus 0210 is not a base station and the communication apparatus 0220 is not a user equipment, for example, in a case of proximity-based service communication between two user equipments or in a case of wireless communication between two base stations, the communication apparatus 0210 and 0220 can also perform the processing described below. In addition, part or all of the processings performed by the communication apparatus 0210 and 0220 described below may be performed by the processing circuitries 0212 and 0222, or may be performed by other components in the communication apparatus 0210 and 0220 and/or other components in other apparatuses under the control of the processing circuits 0212 and 0222.

The electronic device described in this disclosure can also be implemented in various other ways. According to some embodiments, the processing circuitry of the electronic device may include various units to implement various embodiments according to the present disclosure. For example, the processing circuitry of the electronic device for the receiver side may include various estimation units to implement various estimation operations described herein. The processing circuitry of the electronic device for the transmitter side may include a transmission unit and a receiving unit to implement various operations performed on the transmitter side as described herein.

First Embodiment

The first embodiment of the present disclosure is described in detail below. The first embodiment of the present disclosure mainly relates to an improved fast beam management, which utilizes a matching status between a channel path parameter under a first beam and a channel path parameter under a second beam covered by the first beam to select a particular second beam.

According to some embodiments, an electronic device for a receiver side in a wireless communication system is proposed. According to an embodiment, the electronic device can include a processing circuitry. The processing circuitry can be configured to estimate, based on reference signals which are transmitted from a transmitter side of the wireless communication system via at least one second beam included in coverage of a first beam, parameters for channel paths from the transmitter to the receiver corresponding to the second beam, and wherein a particular second beam of the at least one second beam can be selected based on the estimated parameters for channel paths, and the estimated parameter for channel path corresponding to the particular second beam matches parameter for channel path corresponding to the first beam.

According to some embodiments, an electronic device for a transmitter side of a wireless communication system is proposed. According to an embodiment, the electronic device can include a processing circuitry, which can be configured to transmit reference signals to a receiver side of the wireless communication system via at least one second beam included in coverage of a first beam, and wherein a particular second beam of the at least one second beam can be selected based on estimated parameters for channel paths from the transmitter to the receiver corresponding to the second beam, and the estimated parameter for channel path corresponding to the particular second beam matches parameter for channel path corresponding to the first beam.

According to some embodiments, the processing circuitry of the electronic device may include various units to implement various embodiments according to the present disclosure. Of course, the processing circuitry can also be implemented in other ways, and is not limited to this.

Figure 6A:
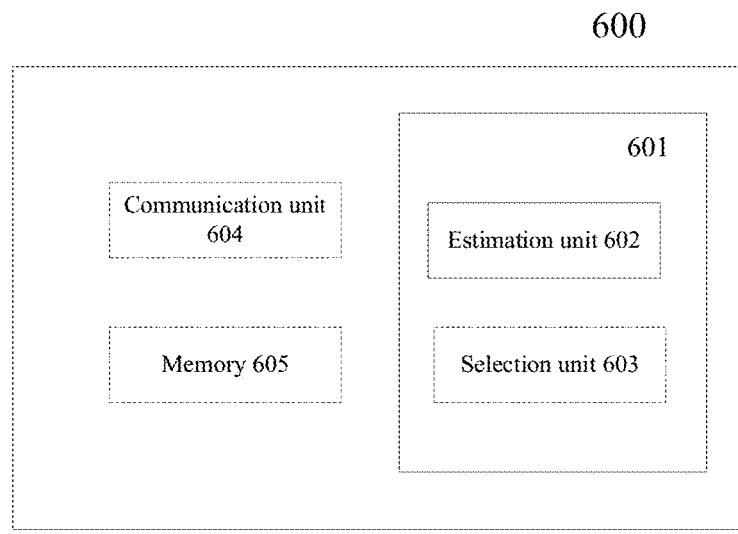
FIG. 6A illustrates an exemplary electronic device for a transmitter side according to an embodiment of the present disclosure.

FIG. 6A illustrates an exemplary implementation of an electronic device 600 for a receiver side according to an embodiment of the present disclosure. In one embodiment, the electronic device 600 may be implemented as a receiver or a part thereof, or may be implemented as a device or a part of the device for controlling a receiver or otherwise being related to the receiver.

The electronic device 600 shown in FIG. 6A may include a processing circuitry 601, which may refer to various implementations of a digital circuitry system, an analog circuitry system, or a mixed signal (combination of analog signals and digital signals) circuitry system in a computing system that perform functions. The processing circuitry may include, for example, a circuit such as an integrated circuit (IC) and an application specific integrated circuit (ASIC), a portion or circuit of a separate processor core, an entire processor core, a separate processor, a programmable hardware device such as a field programmable array (FPGA)), and/or a system including multiple processors.

In one embodiment, the processing circuitry 601 includes at least an estimation unit 602. Various operations described below may be implemented by units 602 of the electronic device 600 or other possible units.

In one embodiment, the estimation unit 602 may estimate, based on reference signals which are transmitted from a transmitter of the wireless communication system via at least one second beam included in coverage of a first beam, parameters for channel paths from the transmitter to the receiver corresponding to the second beam. The corresponding estimation process will be described in detail below.

The processing circuitry may further include a selection unit 603, which may select a particular second beam of the at least one second beam based on the estimated parameters for channel paths, wherein the estimated parameter for channel path corresponding to the particular second beam matches parameter for channel path corresponding to the first beam. According to some aspects, the selection unit 603 may include a comparison unit that may compare the estimated parameter for channel path corresponding to a second beam to parameter for channel path corresponding to the first beam. If the comparison result meets the matching condition, the second beam may be selected by the selection unit as the particular second beam.

It should be noted that such a selection unit 603 is not necessarily located in the processing circuitry, but may also be located outside the processing circuitry or outside the electronic device. Therefore, the selection unit 603 is shown with a dotted line in the figure, and the corresponding processing will be described in detail below.

The electronic device 600 may further include, for example, a communication unit 604 and a memory 605.

The communication unit 604 may be configured to communicate with a receiving side under the control of the processing circuitry 601. In one example, the communication unit 604 may be implemented as including communication components such as the antenna arrays and/or the radio frequency links described above. In one embodiment, the communication unit may provide the estimation result obtained in the processing circuitry 601 to the electronic device on the base station side. In one embodiment, the communication unit may also transmit and receive information for beamforming processing, and may even include a processing unit for performing beamforming processing. Of course, such a processing unit may be outside the communication unit.

The communication unit 604 is drawn with a dashed line because it can also be located outside the electronic device 600.

The memory 605 may store various kinds of information generated by the processing circuit 601 (for example, information about beam training, information about a target channel direction, and basic compensation phase information, etc.), programs and data used for operation by the electronic device 600, and data to be transmitted by the communication unit 604, and so on. The memory 605 is drawn with a dashed line because it can also be located inside the processing circuitry 601 or even outside the electronic device 600. The memory 605 may be a volatile memory and/or a non-volatile memory. For example, the memory 605 may include, but not limited to, random access memory (RAM), dynamic random access memory (DRAM), static random access memory (SRAM), read-only memory (ROM), and flash memory.

Figure 6B:
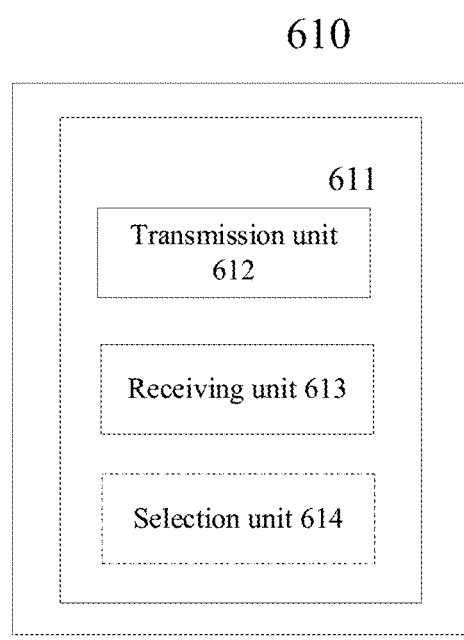
FIG. 6B illustrates an exemplary electronic device for a receiver side according to an embodiment of the present disclosure.

FIG. 6B illustrates an exemplary implementation of an electronic device for a transmitter side according to an embodiment of the present disclosure. The electronic device 610 shown in FIG. 6B may include a processing circuitry 611, which may be implemented in various ways as described above.

In one embodiment, the processing circuitry 611 may include a transmission unit 612 and a receiving unit 613. Various operations below may be implemented by units 612 and 613 or other possible units.

In one embodiment, the transmission unit 612 may transmit reference signals to a receiver side of the wireless communication system via at least one second beam included in coverage of a first beam. The receiving unit 613 may receive any information about the estimation result from the receiver, such as the estimated channel path parameters, the beam information of the selected beam, and so on.

The processing circuitry may further include a selection unit 614, which may select a particular second beam of the at least one second beam based on estimated parameters for channel paths from the transmitter to the receiver corresponding to the second beam, and the estimated parameter for channel path corresponding to the particular second beam matches parameter for channel path corresponding to the first beam. According to some aspects, the selection unit 614 may be implemented similarly with the selection unit 603 shown in FIG. 6A. It should be noted that such a selection unit 614 is not necessarily located in the processing circuitry, and may also be located outside the processing circuitry or outside the electronic device. Therefore, the selection unit 614 is shown with a dotted line in the figure, and the corresponding processing will be described in detail below.

The electronic device 610 may further include, for example, a communication unit and a memory as described above.

It should be noted that each of the above units is only a logical module classified according to the specific function it implements, instead of limiting its specific implementation manner. For example, it can be implemented in software, hardware, or a combination of software and hardware. In actual implementation, the foregoing units may be implemented as independent physical entities, or may be implemented by a single entity (for example, a processor (CPU or DSP, etc.), an integrated circuit, etc.).

It should be noted that the arrangement of each unit as described above is also exemplary only, and is not limited to the above-mentioned case. For example, considering that the estimation processing can also be distributed on both of the receiver side and the transmitter side, some functions in the estimation unit on the receiver side can also be at least partially distributed on the transmitter side, and perform calculation by receiving information feedback from the receiver. In addition, for example, the transmission and receiving units on the transmitter side may be similarly arranged on the receiver side.

It should be noted that the transmitter side and the receiver side as described above may correspond to respective parties in a wireless communication system. For example, the transmitter side may correspond to a base station, the receiver side may correspond to a user equipment, and the operations particularly correspond to downlink communication transmission. For example, the transmitter side may correspond to a user equipment, the receiver side may correspond to a base station, and the operation particularly corresponds to uplink communication transmission.

Figure 7:
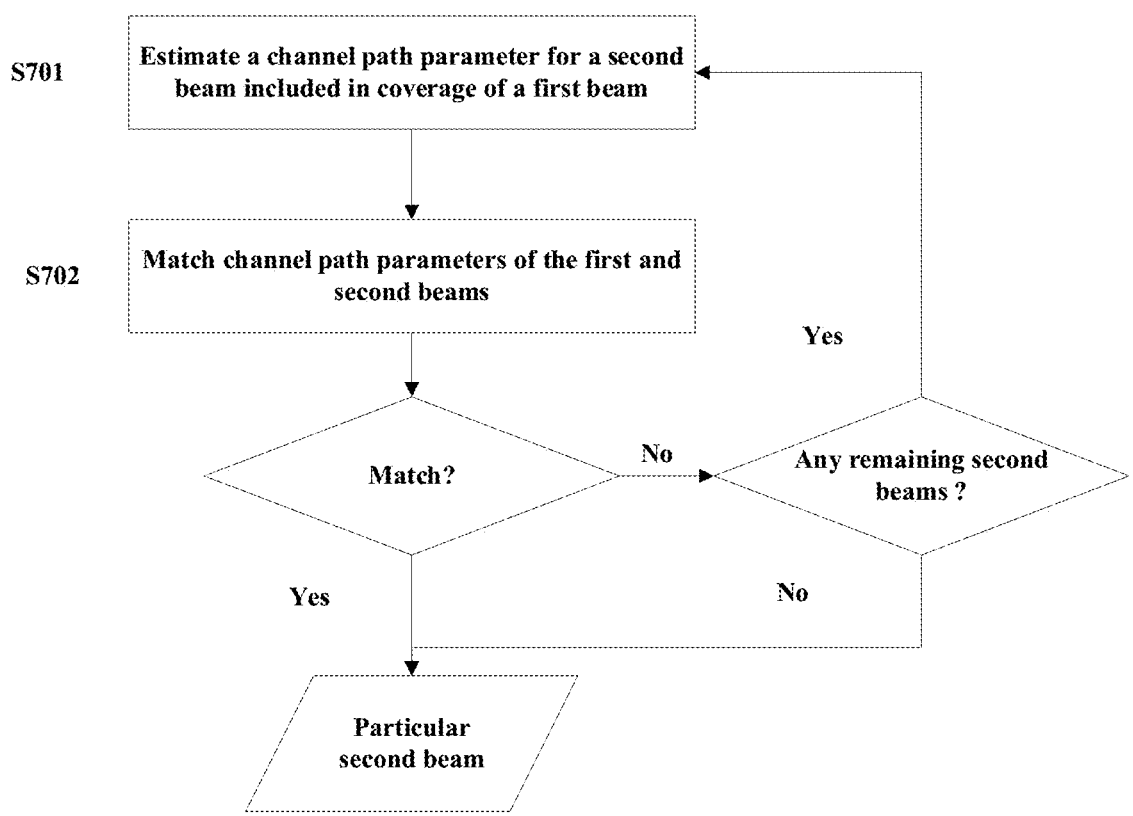
FIG. 7 schematically illustrates a beam management process according to a first embodiment of the present disclosure.

An exemplary implementation of the beam management mechanism in this embodiment will be described in detail below. FIG. 7 shows an exemplary flow of a beam management mechanism according to this embodiment, which is particularly applicable to a case of hierarchical beam management. The following description is made with reference to a case where a first-level beam (first beam) and a second-level beam (second beam) are included, but it should be understood that the embodiments of the present disclosure can be equally applied to the case of more-level beams, where the technical solution according to the embodiments of the present disclosure can be applied to beams of any two adjacent levels.

First, the channel path parameters for second beams covered by the first beam are estimated (step 701).

Generally, at least two second beams may be covered by the first beam, so the estimation step is performed sequentially for the at least two second beams, respectively. And the at least two second beams can be numbered in any order, so that the channel path parameter estimation can be sequentially performed for each second beam in any order.

In operation of step 701, channel path parameter estimation will be performed for one second beam at a time, and this estimation may be performed as described below.

Then, the estimated channel path parameters for the second beams and the channel path parameters for the first beam are compared to determine whether they match (step 702).

The channel path parameters for the first beam may be obtained in various ways in advance, for example, the channel path parameters for the first beam may be estimated by using an estimation method similar to channel path parameter estimation for the second beam.

In addition, depending on application scenarios of the technical solution of the present disclosure, the estimation of channel path parameters for the first beam and the estimation of channel path parameters for the second beam may be performed at similar stages, for example, both of them may be performed in a stage of configuring reference signals for beam sweeping in beamforming. In this case, the estimation of the channel path parameters for the first beam and the estimation of the channel path parameters for the second beam are performed using reference signals. Of course, the reference signals applied by the two estimation can be the same or different. According to some embodiments, the reference signals include one or more of CSI-RS, UE-RS, SRS, and DMRS.

According to some aspects, the estimation of channel path parameters for the first beam and the estimation of channel path parameters for the second beam may be performed at different stages. For example, the estimation of channel path parameters for the first beam may be performed in a stage before the estimation of channel path parameters for the second beam. For example, the estimation of channel path parameters for the first beam may be performed in a stage of random access/initial synchronization utilizing a synchronization signal in beamforming. In this case, the estimation of channel path parameters for the first beam may be performed by using synchronization signals, and the estimation of channel path parameters for the second beam may be performed in a subsequent stage of configuring reference signals for beam sweeping. According to some embodiments, the synchronization signals include one or both of PSS and SSS.

Next, if they match, the second beam is selected as an appropriate second beam, and the channel path parameter estimation for remaining second beams is ceased.

If they do not match, in a case that there still exists remaining second beams, the remaining second beams are sequentially subjected to the channel parameter estimation and matching as described above, until a matching second beam is found. It should be noted that if no match is found after all the second beams have been estimated, a second beam among all the second beams with the best estimated channel path parameter may be selected as the particular second beam.

It should be noted that the basic operation flow of the beam management scheme according to the first embodiment of the present disclosure is mainly described briefly here, and is not particularly limited to uplink communication or downlink communication. That is, the beam management scheme according to the first embodiment of the present disclosure is applicable to each of uplink communication and downlink communication. For example, in the downlink communication, the transmitter side and receiver side may correspond to a base station and a terminal equipment, respectively, and the first beam and the second beam are the first downlink transmission beam and the second downlink transmission beam from the transmitter side, respectively. In the uplink communication, the transmitter side and the receiver side may correspond to the terminal equipment and the base station, respectively, and the first beam and the second beam are the first uplink transmission beam and the second uplink transmission beam from the terminal equipment respectively.

In addition, the execution subject of each step is not specifically limited. These steps can be performed on one side of the wireless communication system, for example, on the receiver side (downlink communication) or the transmitter side (uplink communication) of the wireless communication system, or they can be distributed on both sides of the wireless communication system.

According to some aspects, the above operations may be performed on the receiver side of a wireless communication system. In this case, the receiver estimates channel path parameters corresponding to a second transmission beam based on reference signals transmitted from the transmitter side via the second transmission beam. The receiver can select an appropriate second transmission beam, and feed back beam information about the selected second beam to the transmitter.

According to some aspects, the feedback beam information may at least include one or both of a beam index, a beam quality. For example, the beam quality may include at least one of parameters such as a received power such as RSRP, a signal-to-interference and noise ratio such as SINR, a time domain gain, an error rate such as BLER, and the like.

According to some embodiments, after the particular second beam is selected, the receiver will cease the estimation of channel path parameters corresponding to the remaining second beams. Additionally or alternatively, according to some embodiments, after the particular second beam is selected, the receiver may notify the transmitter to cease transmitting reference signals via other second beams.

According to other aspects, the above selection step may be performed by a transmitter side of the wireless communication system. According to some embodiments, the estimated channel path parameters corresponding to the second beam are fed back to the transmitter side. Therefore, the transmitter side can match the received channel path parameters of the second beam with channel path parameters of the first beam, thereby selecting a particular second beam. According to some embodiments, after the particular second beam is selected, the transmitter may cease transmitting reference signals via other second beams.

According to some embodiments, after the particular second beam is selected, the transmitter may provide beam information about the particular second beam to a receiver side. According to some embodiments, the beam information at least includes one or both of a beam index and a beam quality. For example, the beam quality may include at least one of parameters such as RSRP, time domain gain, BLER, and the like.

According to some aspects, the first beam is determined from a first beam set through a beam sweeping operation from a transmitter side to a receiver side. This beam sweeping operation can be implemented by a variety of well-known beam sweeping technologies, which will not be described in detail here.

According to some aspects, the channel path parameters corresponding to the first beam may be estimated at the receiver side. According to some embodiments, channel path parameters corresponding to the first beam are estimated based on reference signals or synchronization signals transmitted from the transmitter side via the first beam. Therefore, the receiving side can perform matching based on both the channel path parameters of the first beam and the channel path parameters of the second beam.

Where the matching operation is to be performed at the transmitter side, according to some embodiments, the estimated channel path parameters corresponding to the first beam may be fed back from the receiver to the transmitter. Alternatively, the channel path parameters corresponding to the first beam may be notified to the transmitter by other devices. Therefore, the transmitter side can perform matching based on both the channel path parameters of the first beam and the feedback channel path parameters of the second beam.

Of course, this matching and selection operation can also be performed on a device other than the receiver and the transmitter, as long as the device can obtain the estimated channel path parameters and notify the transmitter side and/or receiver side of the selection result.

Next, the channel path parameters corresponding to a beam to be estimated will be further described in detail.

According to some embodiments, the channel path parameters to be estimated may include path gain. According to some embodiments, the channel path parameters include the magnitude of the path gain in the time domain. According to some embodiments, the channel path parameters may further include a path delay.

Figure 8:
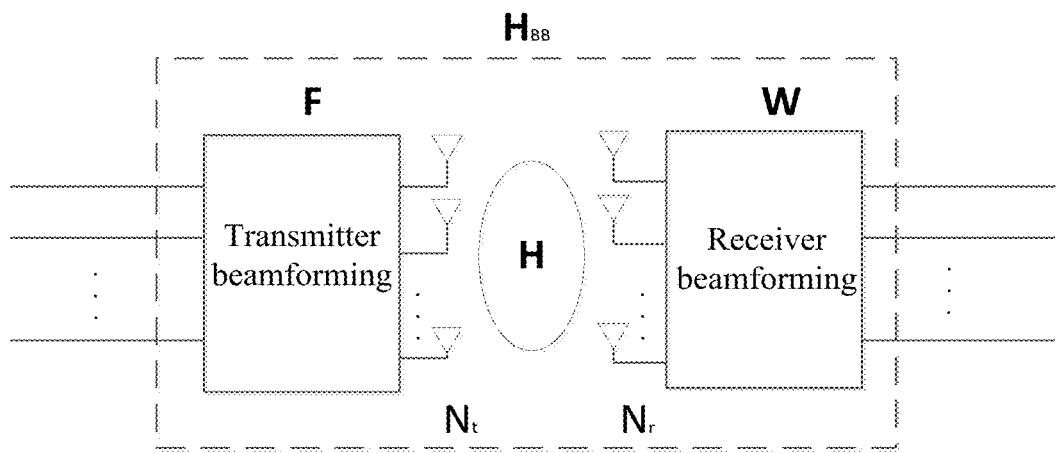
FIG. 8 is a schematic diagram of a transceiver structure of a millimeter wave large-scale multiple-input multiple-output antenna system.

An example of a channel path parameter will be understood detailedly in combination with a channel model in a wireless system, especially a millimeter-wave system. FIG. 8 shows a schematic transceiver structure of a millimeter-wave large-scale multiple-input multiple-output antenna system.

The millimeter-wave time domain channel can be described by:

$$h(\tau) = \sum_{l=1}^{L} \alpha_l a_r(\theta_l^r, \phi_l^r) a_t^T(\theta_l^t, \phi_l^t) \delta(\tau - \tau_l) \in C^{N_r \times N_t}$$

where L is the number of paths, which is usually small, especially in a sparse case, $\alpha_l$ and $\tau_l$ are complex gain and delay of the lth path, $a_r$ and $a_t$ are antenna response vectors on the receiving side and the transmission side respectively, Nr and Nt is the amount of antennas on the receiving side and the transmission side, and $\theta$ and $\phi$ represents angles of departure/angles of arrival in the horizontal and vertical directions, respectively. Thereby, the frequency domain channel can be expressed as $$H(f) = \sum_{l=1}^{L} \alpha_l e^{-j2\pi\tau_l f} a_r(\theta_l^r, \phi_l^r) a_t^T(\theta_l^t, \phi_l^t) \in C^{N_r \times N_t}$$

In an OFDM system, the channel coefficient on the nth subcarrier can be expressed as:

$$H(n) = \sum_{l=1}^{L} \alpha_l e^{-j2\pi\tau_l n\Delta f} a_r(\theta_l^r, \phi_l^r) a_t^T(\theta_l^t, \phi_l^t) \in C^{N_r \times N_t}$$

wherein $0 \le n \le N-1$, and $\Delta f$ is the subcarrier interval. Assume that the transmission side utilizes a beam $F \in C^{M_t \times 1}$, and the receiving side utilizes a beam $W \in C^{N_r \times 1}$, the baseband equivalent channel after beamforming can be expressed as:

$$H_{BB}(n) = w^T \left( \sum_{l=1}^{L} \alpha_l e^{-j2\pi\tau_l n\Delta f} a_r(\theta_l^r, \phi_l^r) a_t^T(\theta_l^t, \phi_l^t) \right) f = \sum_{l=1}^{L} \beta_l e^{-j2\pi\tau_l n\Delta f}$$

where $\beta_l = \alpha_l w^T a_r(\theta_l^r, \phi_l^r) a_t^T(\theta_l^t, \phi_l^t) f$ is an equivalent gain for the lth path.

By transmitting reference signals on OFDM subcarriers, the channel path parameters can be estimated, which can include the channel path gain, and further can include the channel path delay.

Therefore, by referring to the above model to estimate the channel path parameters corresponding to the beam, and performing matching between the path parameters of the first beam with the path parameters of the second beam covered by the first beam, a particular second beam can be determined relatively quickly, which belongs to the basic work principle of the embodiment.

Exemplary estimation of channel path parameters, especially channel path gain and channel path delay, will be described below.

According to some embodiments, the channel path parameters may be estimated by: estimating, based on reference signals from the transmitter side, channel states on a communication resource carrying the reference signals; and estimating the channel path parameters by using the estimated channel states of the communication resource.

Here, taking uniform insertion of reference signals on OFDM subcarriers as an example, an exemplary implementation process of path delay and gain estimation is given. It should be noted that this estimation process is only an example, and can be equally applied to an estimation processes based on other signals (for example, synchronization signal).

Figure 9:
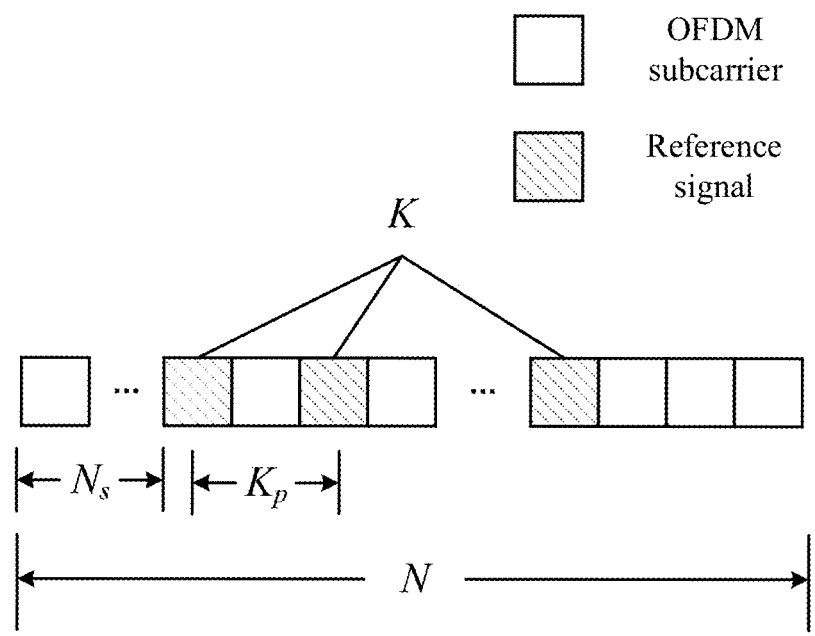
FIG. 9 is a schematic diagram of uniform distribution of reference signals.

As shown in FIG. 9, let the number of OFDM subcarriers is N, the number of reference signals is K, the reference signal interval is Kp, and the subcarrier index of the first reference signal is Ns. The reference signals in the existing LTE system, such as UE-RS, CSI-RS, PSS, SRS, and DMRS, can be described by this model. By means of a classic channel estimation algorithm such as the latest square, the minimum mean square error, etc., the channel estimation on the sub-carriers transmitting the reference signals can be obtained as $\hat{H}_{BB}(N_s+kK_p)$, $0 \le k \le K-1$.

According to the above channel model, we can get $$\begin{bmatrix} \hat{H}_{BB}(N_s) \\ \hat{H}_{BB}(N_s + K_p) \\ \vdots \\ \hat{H}_{BB}(N_s + (K-1)K_p) \end{bmatrix} = \begin{bmatrix} 1 & \cdots & 1 \\ e^{-j2\pi\tau_1 K_p \Delta f} & \cdots & e^{-j2\pi\tau_L K_p \Delta f} \\ \vdots & \ddots & \vdots \\ e^{-j2\pi\tau_1 (K-1)K_p \Delta f} & \cdots & e^{-j2\pi\tau_L (K-1)K_p \Delta f} \end{bmatrix} \begin{bmatrix} \beta_1 e^{-j2\pi\tau_1 N_s \Delta f} \\ \vdots \\ \beta_L e^{-j2\pi\tau_L N_s \Delta f} \end{bmatrix}$$

$$\hat{H} = \Phi A$$

where, $\hat{H}$, is the channel estimation on the subcarriers transmitting the reference signals, and $\Phi$ and A represent the delay matrix and the gain matrix, respectively.

Mathematical operations can then be performed on the above model formulas. The above problem is a classic spectrum analysis problem. Some classic algorithms, such as Fast Fourier Transform (FFT) based algorithm, MUlitple Signal Classification (MUSIC) algorithm, Estimating Signal Parameters via Rotational Invariance Techniques (ESPRIT) algorithm, etc., can be utilized to estimate the path delay. Then the least squares algorithm is utilized to estimate the gain matrix $A=(\Phi \cdot \Phi)\Phi \cdot H$. Note that in the embodiments of the present disclosure, the magnitude of the path gain, i.e., |A|, is of concern, without having to consider its phase.

The process of path delay estimation using FFT algorithm is briefly described here. Make a $N_{fft}$-point FFT transformation to the channel estimation $\hat{H}$. to obtain its time-domain impulse response, and obtain several peaks with magnitudes greater than a certain threshold. Let $\{\hat{k}_l\}_{l=1}^{L}$ represents the index, the path delay estimation result can be obtained:

$$\hat{\tau}_l = \frac{\hat{k}_l}{N_{fft} K_p \Delta f}$$

Figure 10:
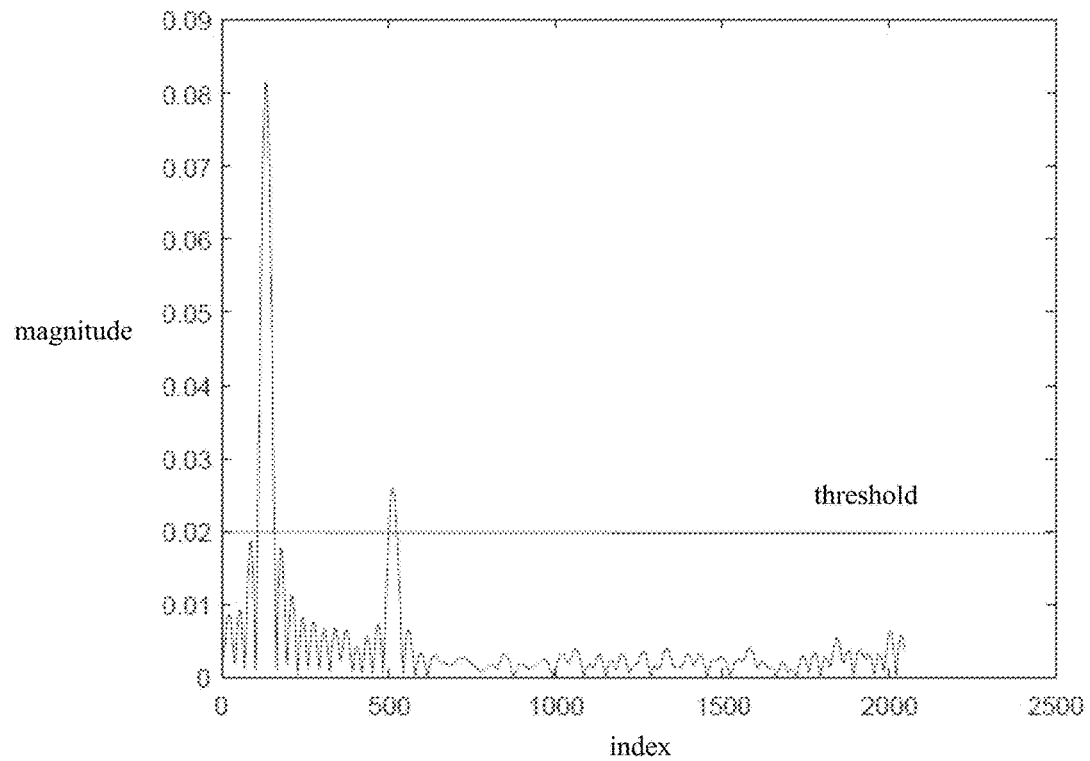
FIG. 10 shows an example of path gain and delay estimation.

An example of path delay estimation is shown in FIG. 10, in which K=64 reference signals at an interval Kp=8 are used, the subcarrier interval $\Delta f$ is =120 KHz, and a FFT transformation with $N_{fft}$=2048 is used. FIG. 10 shows the magnitude of each element after the FFT transformation of the channel estimation $\hat{H}$. It can be seen that there are two peaks larger than the threshold: $\hat{k}_1$=132 and $\hat{k}_2$=511, and thus the path delay estimation results can be obtained: $\hat{\tau}_1$=67.1 ns. and $\hat{\tau}_2$=259.9 ns.

It should be noted that the estimation of the channel path parameters is also related to configuration of the reference signals on the subcarriers. In the embodiment of the present disclosure, the setting of the predetermined interval Kp between reference signals and/or the number K of subcarriers carrying the reference signals will affect the channel estimation performance.

Maximum delay estimation range $$\tau_{max} = \frac{1}{K_p \Delta f},$$

wherein a path with a delay beyond this range cannot be estimated.

Delay estimation accuracy $$\delta\tau = \frac{1}{N_{fft} K_p \Delta f},$$

which represents the accuracy of delay estimation for a certain path under a noise-free condition;

Delay estimation resolution $$\Delta\tau = \frac{1}{K K_p \Delta f},$$

expressed as the minimum value among delay differences between different paths that do not cause aliasing, that is, a path with a delay difference less $\Delta\tau$ cannot be resolved for delay estimation.

It can be seen that increasing the reference signal interval Kp can improve the delay estimation accuracy and resolution, and increasing the number K of reference signals can improve the delay estimation resolution. From the above, the relationship between the configuration of the reference signals and the estimation of the channel path parameters can be clearly understood, and the reference signals, especially the intervals and data of the reference signals, can be appropriately configured based on thereon.

According to some embodiments, the reference signals are distributed at a predetermined interval over a frequency domain, and the predetermined interval is determined based on a maximum delay spread of channel and a frequency domain interval between adjacent communication resources in the communication system.

According to some embodiments, the number of reference signals may be determined based on the accuracy of the channel estimation and the total bandwidth of a first frequency domain range which is to be occupied by the subcarriers containing the reference signals.

The setting of the number of reference signals will be exemplarily described below.

For example, when $K_p$ is fixed, the estimation accuracy can increase as the total number $K_s$ of pilots increases. The reason is that when $K_s$ increases, the influence of sidelobes in 1024-point FFT caused by a zero-padding operation is reduced, and the width of the main lobe is narrowed, which will improve the estimation accuracy of the total number L of paths and path delay parameter $\Delta_l$. In addition, the accuracy of the least square estimation used in estimating the intensity parameter $\beta_l$ will increase as $K_s$ increases, but the pilot overhead will also increase as the value of $K_s$ increases.

Conversely, if the value of $K_s$ is too small, sidelobes corresponding to the peaks of FFT spectrum will have larger magnitudes and the main lobe will have a larger width, resulting in larger estimation error. It is assumed here that the number of FFT points used in path estimation is $2^n$, 1024-FFT corresponding to n=10, and in order to ensure the estimation accuracy, K shall satisfy $$K_s \geq \frac{2^n}{64}$$

For example, if 1024-FFT is used, the value of $K_s$ needs to be at least 16.

Based on the above, for setting of $K_p$ and $K_s$, the upper bound of $K_p$ shall be firstly determined based on the maximum delay spread of the channel and the subcarrier interval, and a larger $K_p$ can be selected without exceeding the upper bound. Further, according to the set number of FFT points, a lower bound of $K_s$ is determined, and based on this lower bound, the largest possible $K_s$ can be set based on this lower bound while taking into account the limitations of bandwidth and pilot overhead, so as to improve the accuracy of channel estimation.

The bandwidth occupied by the frequency bands containing the pilots is about a bandwidth of $K_p K_s$ subcarriers. If the bandwidth corresponding to the $K_p K_s$ subcarriers still exceeds the expected total bandwidth in the case of $K_s$ taking its minimum value, then the value of $K_p$ can be reduced so that the bandwidth corresponding to the $K_p K_s$ subcarriers is less than expected total bandwidth.

In an implementation, the path delay and gain estimation can be performed by utilizing the existing uplink and downlink reference signals in the LTE standard, such as PSS (Primary Synchronization Signal). CSI-RS, UE-RS in downlink, and SRS and DMRS in downlink, etc. For K=62 subcarriers where the PSS signal is centered and the subcarrier interval Kp=1, the accuracy and resolution of the delay estimation are relatively low. In addition, because PSS signals are broadcasted only through wide beams, they can be used for only delay estimation under wide beams. The advantage is that PSS signals are broadcasted periodically and do not require additional resources. For CSI-RS and UE-RS, their number is configurable, and the subcarrier interval is relatively large (CSI-RS: Kp=12, UE-RS: Kp=6), so more accurate delay estimation can be achieved. CSI-RS and UE-RS can be configured in a wide beam or a narrow beam. In addition, SRS and DMRS are also continuously distributed (Kp=1), their number depends on the uplink bandwidth allocated to the user. In order to improve the accuracy of delay estimation, the channel estimation $\hat{H}$. can be sampled at the receiving side, which effectively increases the subcarrier interval Kp. SRS and DMRS are suitable for delay estimation in wide and narrow beams.

It should be noted that the arrangement of the reference signals is not limited to the uniform arrangement described above, and other arrangements may be adopted.

Figure 11:
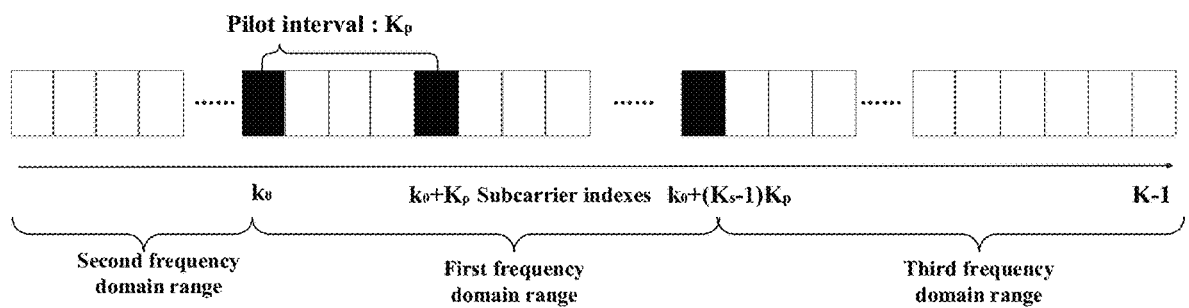
FIG. 11 is a schematic diagram of sparse reference signals in the frequency domain.

According to some embodiments, the reference signals may be arranged only on a part of subcarriers of the communication system; and the reference signals are transmitted to the receiver side through the part of subcarriers. As shown in FIG. 11, the reference signals may be distributed only on subcarriers in a partial frequency domain range of the communication system, such as the first frequency domain range, and the partial frequency domain range is only a small part of the entire frequency domain range.

According to an embodiment, the reference signals may be distributed over communication resources in a first frequency domain range of the communication system, and frequency domain resources of the communication system are divided into a plurality of orthogonal frequency domain ranges including the first frequency domain range.

According to some embodiments, the distribution of the reference signals may also take the condition of time slots into account. In some implementations, channel states of subcarriers containing the reference signals are jointly estimated by using reference signals at least distributed over one time slot.

According to some embodiments, the reference signals are distributed over an entire transmission band in a specific time slot and the reference signals are only distributed over a partial frequency band range in time slots other than the specific time slot.

According to some embodiments, in all time slots, the reference signals are only distributed over a partial frequency band range.

According to some embodiments, for even-numbered and odd-numbered time slots, the reference signals are alternately distributed over a half of the frequency band range with lower frequency or a half of the frequency band range with higher frequency.

Next, the fast beam management mechanism according to this embodiment will be further described in combination with the above-mentioned channel path parameters. Based on the estimation results of the channel path parameters obtained through the above estimation process, this embodiment can perform comparison to achieve advantageous fast beam management.

The basic principle of the fast beam management mechanism of the present disclosure is that channel paths under a narrow beam belong to a subset of channel paths under a wide beam, so the path delay measured under the narrow beam should match the measurement result under the wide beam. If a narrow beam that meets the matching condition is searched during the beam sweeping process, the narrow beam can be selected as the optimal beam direction, without needing to sweep the remaining candidate beams, so that the overhead and delay of the beam sweeping can be reduced.

According to some embodiments, the channel path parameters to be estimated may include a path gain. In such a case, when a path gain of a channel path corresponding to the second beam is greater than a path gain of a target path corresponding to the first beam by more than a gain threshold, it is determined that the channel path parameter corresponding to the second beam matches the channel path parameter corresponding to the first beam According to some embodiments, the gain threshold is set based on a difference between a maximum path gain corresponding to the first beam and a maximum path gain corresponding to the second beam. In this disclosure, the gain threshold may also be referred to as a gain matching parameter.

This scheme of matching narrow and wide beams by estimating path gain corresponds to the so-called Gain Improvement criterion, which is based on a theory that the gain of a narrow beam should be greater than that of a wide beam.

It is assumed that gains $\{G_l^{wide}\}_{l=1}^{L}$ of L paths are estimated under a wide beam. One path is selected from the L paths as the target path, and the target path is numbered as $l_d$. The selection of the target path depends on a beam selection strategy. For example, a path with the strongest gain can usually be selected in order to obtain an optimal narrow beam. However, it is not limited to this. For example, in order to obtain a candidate narrow beam, a beam with the next strongest gain may be selected.

Hereinafter the gain improvement criterion will be described by taking selection of the strongest path as an example. Suppose that when sweeping a narrow beam, the gain of the strongest path is measured as $G^{narrow}$. Gain similarity can be expressed as $$G^{narrow} - G_{l_d}^{wide} > \eta_G$$

Figure 12:
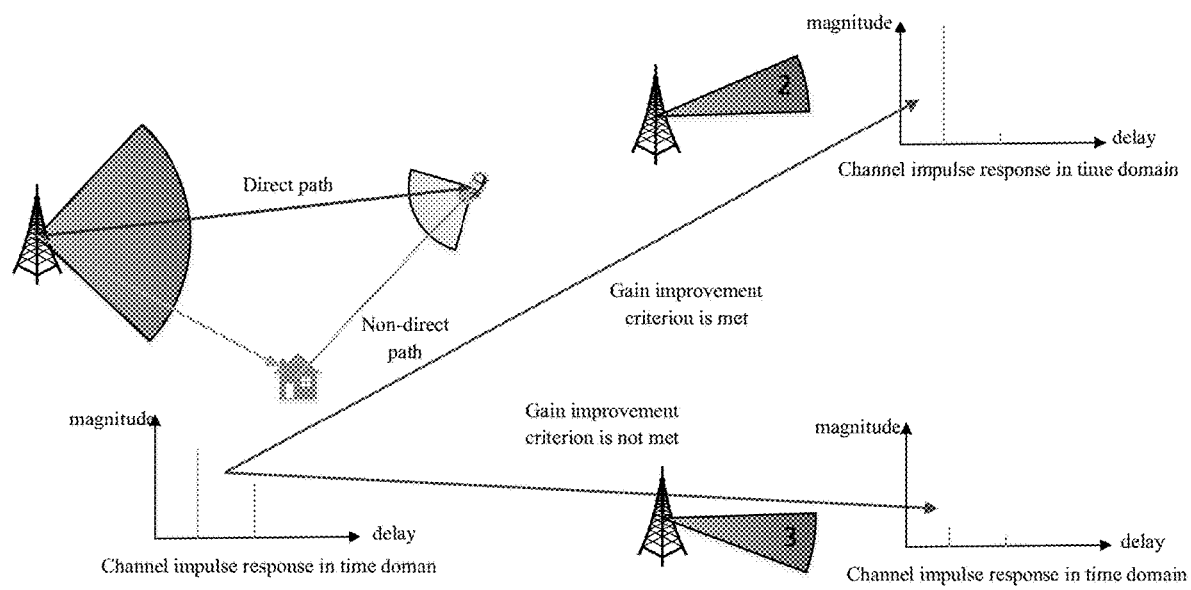
FIG. 12 is a schematic diagram of a matching operation to which again improvement criterion is applied.

Among them, $\eta_G$ is the threshold for gain improvement, and depends on the difference between the maximum gains of the wide beam and the narrow beam. For example, if the maximum gain of the wide beam is 3 dB lower than the maximum gain of the narrow beam, it can be set that $\eta_G=2$ dB. FIG. 12 shows an example of a gain improvement criterion. It can be seen that the strongest path delay of narrow beam 3 is the same as that of the direct path under the wide beam, but its gain is too low to meet the gain improvement criterion, so it is not the optimal beam which is expected to be found. The strongest path gain of narrow beam 2 is high, which meets the gain improvement criterion, and thus is the optimal beam which is expected to be found.

According to some aspects, the matching operation may be performed on the receiver side. Therefore, according to some embodiments, the gain threshold is transmitted from the transmitter side to the receiver side. Alternatively, this matching operation may be performed at the transmitter side, for example, in this case, the gain threshold is set and stored at the transmitter side, and the transmitter side performs the matching operation based on the estimated path parameters fed back from the receiver side.

According to some embodiments, the channel path parameter may further include a path delay. In this case, when a difference between the path delay of a channel path corresponding to the second beam and the path delay of a target path corresponding to the first beam is less than a delay threshold, it is determined that the channel path parameter corresponding to the second beam matches the channel path parameter corresponding to the first beam.

According to some embodiments, the delay threshold is set based on a delay estimation accuracy.

According to some embodiments, the delay threshold is set by the receiver side based on the delay estimation accuracy, or is notified to the receiver side by the transmitter side.

This scheme of matching narrow and wide beams by estimating the path delay corresponds to the so-called Delay Similarity criterion, which is based on a theory that the delay of a narrow beam should be basically consistent with the delay of a wide beam.

Assume that the delays $\{\tau_l^{wide}\}_{l=1}^{L}$ of L paths are estimated under a wide beam. One path is selected from the L paths as the target path, and the target path is numbered as $l_d$. Suppose that when sweeping a narrow beam, the measured path delay is $\tau^{narrow}$. The delay similarity can be expressed as:

$$|\tau^{narrow} - \tau_{l_d}^{wide}| < \eta_\tau$$

Figure 13:
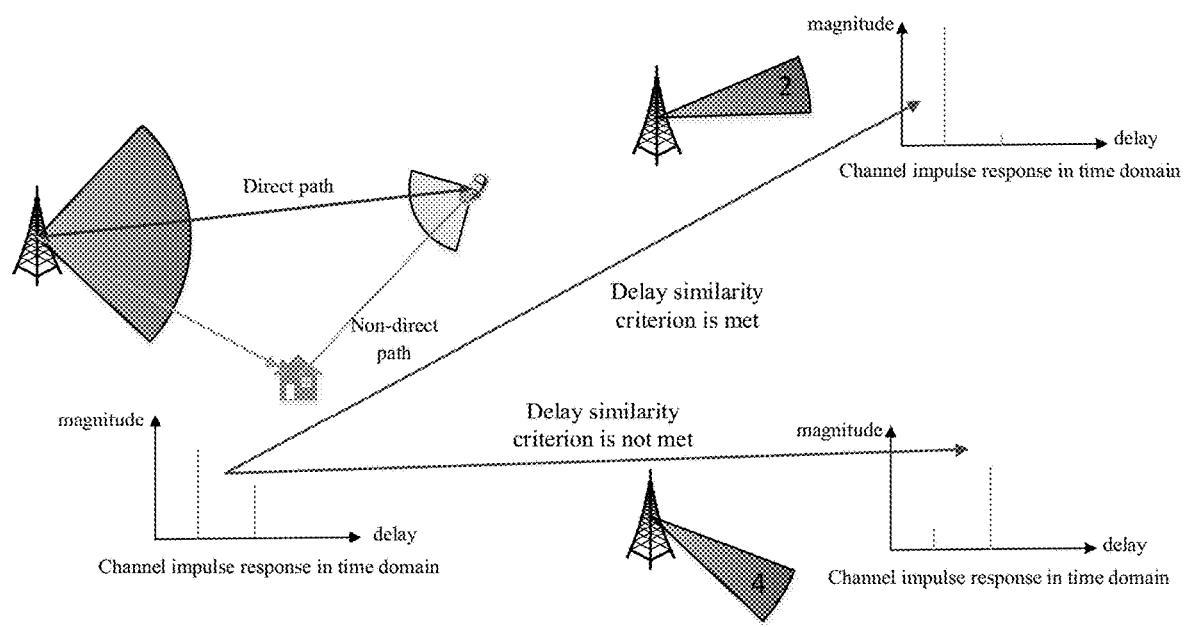
FIG. 13 is a schematic diagram of a matching operation to which a delay similarity criterion is applied.

Among them, $\eta_\tau$ is a threshold for the delay difference, which can be set to several times of the delay estimation accuracy, for example. FIG. 13 shows an example of the delay similarity criterion. It can be seen that narrow beam 2 meets the delay similarity criterion, while narrow beam 4 does not.

It should be noted that in the fast beam management mechanism of the present disclosure, only one of channel path gain matching and channel path delay matching may be performed. And preferably, considering that the change of the channel path gain can often accurately reflect the correspondence between the wide and narrow beams, the fast beam management mechanism of the present disclosure can perform only the channel path gain matching.

On the other hand, according to some embodiments, the fast beam management mechanism of the present disclosure can combine both channel path gain matching and channel path delay matching, thereby enabling more accurate path matching. For example, the channel path delay can be firstly considered for preliminary selection, and then the channel path gain can be utilized for further selection.

As an example, in an actual system, due to the influence of noise, etc., it may not find a beam that simultaneously meets the above criteria in the narrow beam search process. At this time, a narrow beam with the largest gain that meets the delay similarity criterion can be selected. If no beam meets the delay similarity criterion, a narrow beam with the largest gain is selected. Ideally, each candidate narrow beam is selected with equal probability, so the average number of searches required by this disclosure is:

$$E\{\text{overhead}\} = \frac{1}{N_{narrow}}(i + \ldots + N_{narrow}) = \frac{N_{narrow} + 1}{2}$$

Where $N_{narrow}$ is the number of candidate narrow beams. In an actual system, because there is a certain probability that a beam that meets the above conditions simultaneously cannot be not found, the average number of searches may be slightly larger than the above value.

Figure 14:
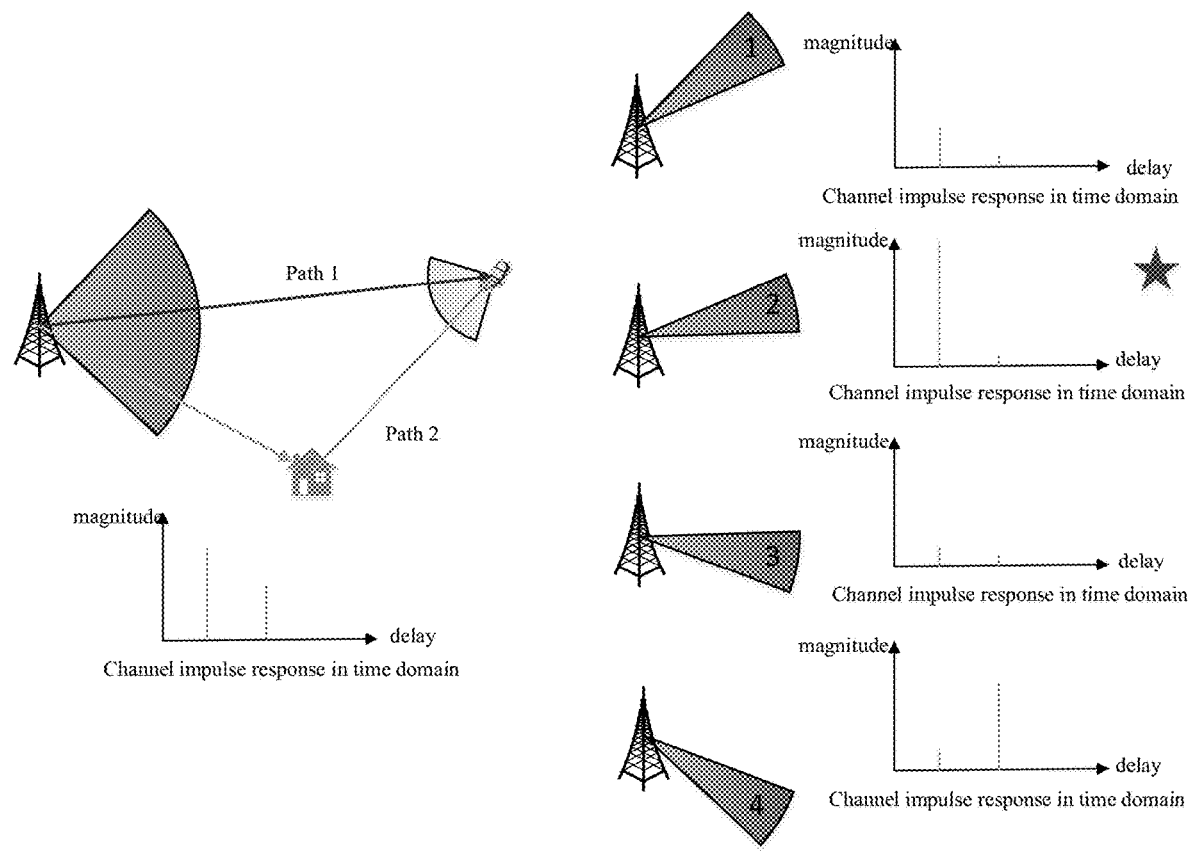
FIG. 14 is a schematic diagram of a beam management operation according to the present embodiment.

FIG. 14 shows a schematic diagram of a fast beam management mechanism according to this embodiment.

It can be seen that there are two communication paths between the base station and the user, and the wide beam used has been determined and the path delay and gain under this wide beam have been estimated. From the delay estimation result, two paths can be identified, path 1 has a small delay and a large gain, and path 2 has a large delay and a small gain. In an example where a narrow beam is desired to align to the path 1, when sweeping narrow beam 2, it can be measured that the delay of the strongest path measured under the narrow beam is the same as the delay of path 1, and the gain is improved, so it can be judged that the narrow beam 2 is aligned with the path 1, so that the beam sweeping process can be ceased without sweeping narrow beams 3 and 4, which reduces sweeping overhead and delay. Similarly, if it is desired that a narrow beam aligns to the path 2, when sweeping beam 4, it can be measured that the delay of the strongest path under the narrow beam is the same as the delay of path 2 and the gain is improved, so it can be judged that narrow beam 4 is aligned with path 2.

Figure 15:
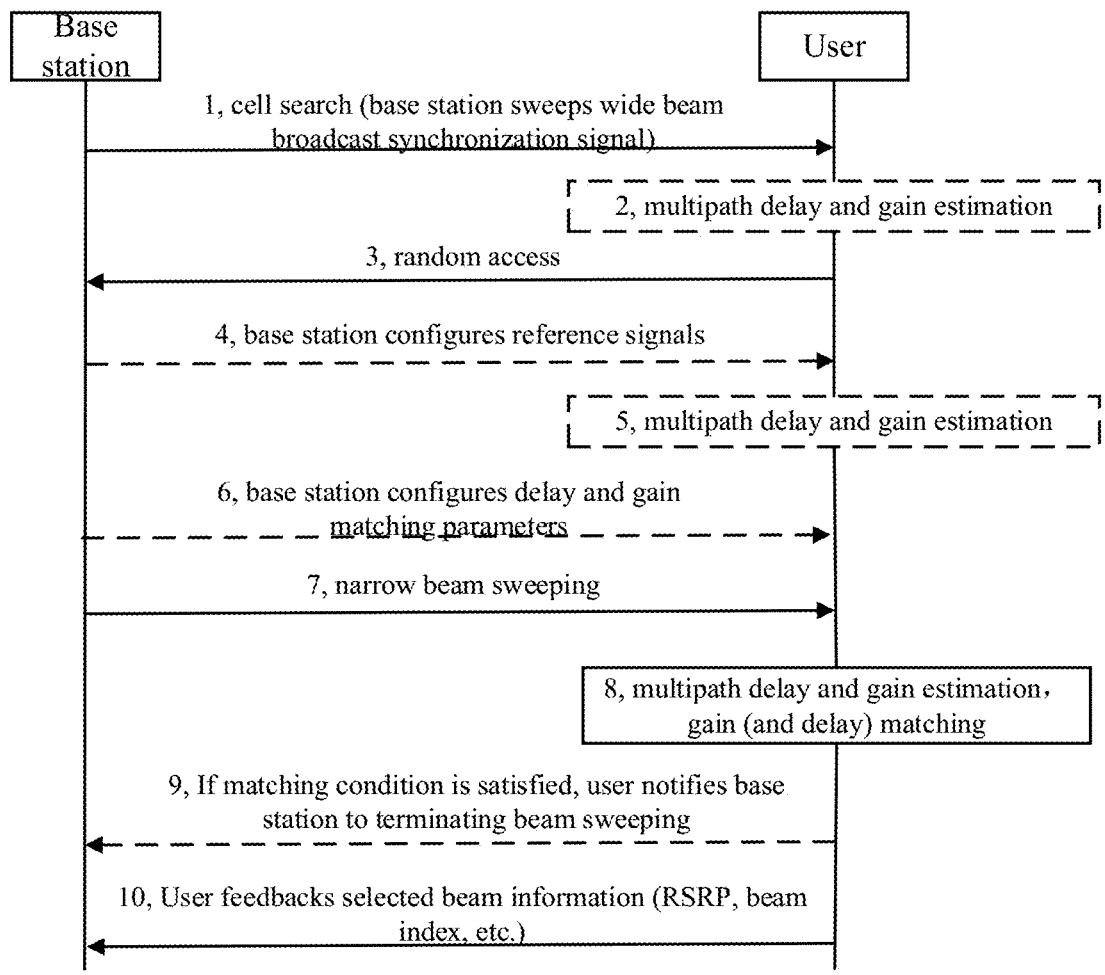
FIG. 15 is a signaling flowchart of beam selection performed by a terminal equipment in a downlink communication.
Figure 16:
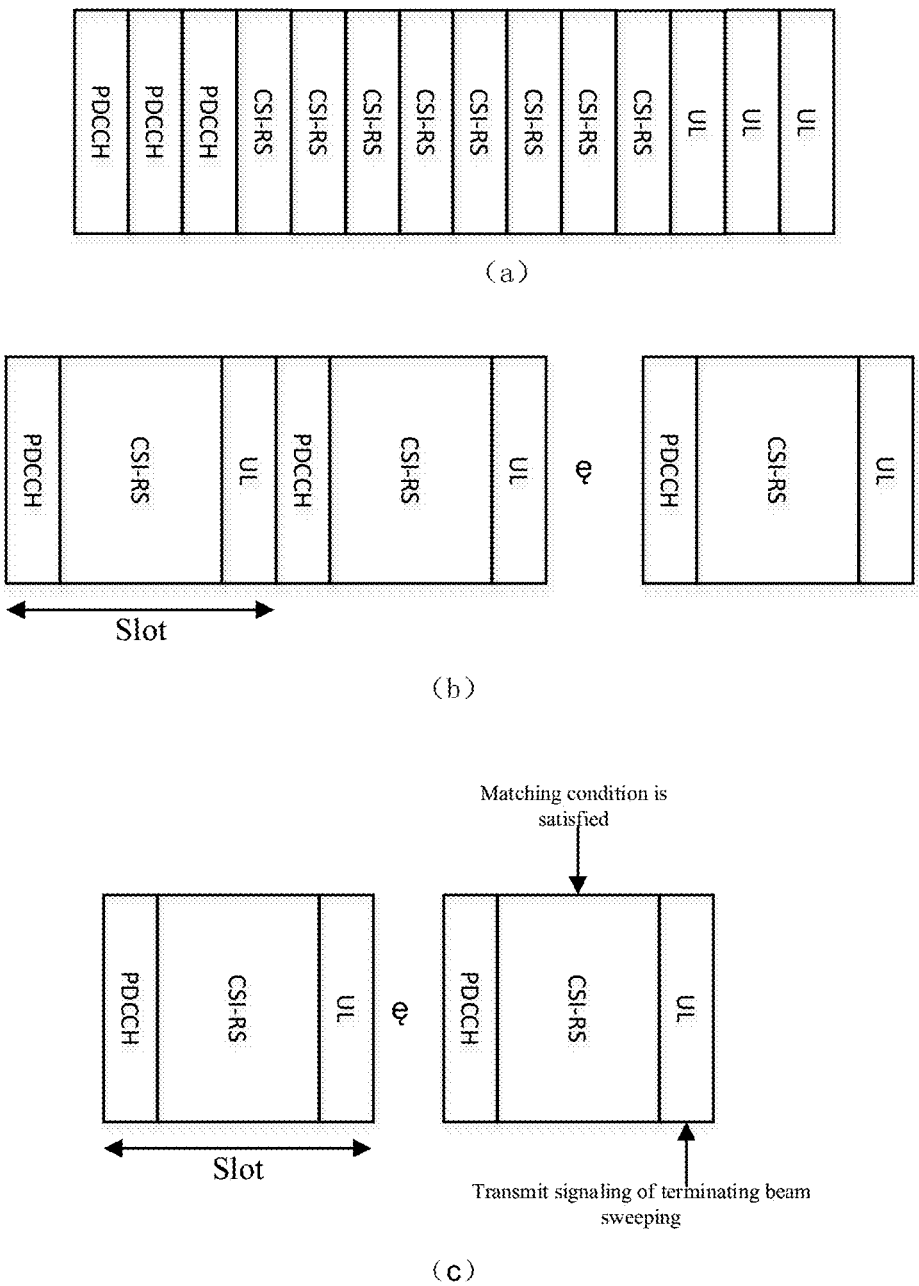
FIG. 16 is a schematic diagram of a terminal equipment feedbacking beam termination information.

Hereinafter the signaling flows of implementing the beam management scheme according to this embodiment mainly at the base station side and the terminal equipment side respectively will be described with reference to the accompanying drawings. FIGS. 15 and 16 particularly show a beam management scheme according to this embodiment implemented in downlink communication, in which a base station and a terminal equipment (user) may correspond to a transmitter side and a receiver side in this embodiment, respectively.

FIG. 15 illustrates a signaling flow of the beam management scheme according to this embodiment being mainly implemented at a terminal equipment. The channel path estimation and matching in the scheme according to this embodiment is mainly performed on the terminal equipment side (receiver side).

First, an initial connection/synchronization between the terminal equipment and the base station is done in steps 1 and 3. The initial connection/synchronization between the terminal equipment and the base station (including, for example, the base station transmitting a synchronization signal (SS), the terminal equipment transmitting a random access signal to the base station) is the first stage to enable the terminal equipment to properly communicate with the base station.

The initial connection/synchronization between the terminal equipment and the base station can be implemented in various manners known in the art. An exemplary implementation of this initial connection/synchronization will be briefly described below.

The base station transmits a synchronization signal so that the terminal equipment can obtain a cell frame timing (step 1). The base station may periodically transmit the synchronization signal, for example. Generally speaking, the synchronization signal may include a synchronization sequence, which is known to both the base station and the terminal equipment. Moreover, the synchronization signal may be transmitted in a certain time period or time pattern, for example, the synchronization signal may be transmitted at a fixed position (such as a fixed subframe, time slot, and symbol position) in a downlink frame. In this way, the terminal equipment can perform, for example, a correlation operation between a signal, for example received in a single subframe, and a known synchronization sequence at the center of the carrier, and the position of the correlation peak corresponds to the position of the synchronization signal in the downlink frame, so that the terminal equipment can obtain downlink cell synchronization.

After the downlink cell synchronization is obtained, the terminal equipment can receive a cell system information at an appropriate position in the downlink frame. The system information may be periodically broadcasted by the base station through a broadcast channel (for example, a broadcast channel PBCH, a shared channel PDSCH, etc.), and may include information necessary for the terminal equipment to access the base station, such as random access related information.

After that, in order to obtain uplink cell synchronization, the terminal equipment needs to perform a random access procedure (step 3). For example, the terminal equipment may notify the base station of its access behavior by transmitting a random access preamble (for example, included in MSG-1) to the base station. In one example, after the random access procedure is successfully performed, the initial connection/synchronization process between the terminal equipment and the base station may be considered to be complete, and the terminal equipment may perform subsequent communication with the base station.

It should be noted that channel path parameters under the first beam (wide beam) can be estimated during the initial connection/synchronization process between the terminal equipment and the base station. According to some embodiments, the channel path parameters under the first beam (wide beam) may be estimated using the synchronization signal. For example, as shown in step 2, the terminal equipment may perform estimation of channel path parameters under the first beam (wide beam), including path delay and gain estimation, based on the received synchronization signal, where the synchronization signal may be, for example, a PSS signal. The estimated channel path parameters under the first beam are stored in the terminal equipment.

Alternatively, the channel path parameters under the first beam (wide beam) may be estimated after the initial connection/synchronization process between the terminal equipment and the base station. According to some embodiments, the sweeping of the first beam (wide beam) and the estimation of the channel path parameters under the first beam may be performed by means of reference signals. For example, as shown in step 4, the base station configures reference signals to perform beam sweeping to the user equipment through the first beam, and then as shown in step 5, the terminal equipment estimates the channel path parameters, including path delay and gain, under the first beam (wide beam) based on the received reference signals, where the reference signal may be CSI-RS or UE-RS signal for measurement. The estimated channel path parameters under the first beam are stored in the terminal equipment.

Subsequently, before performing narrow beam sweeping, the base station configures parameters for matching, including, but not limited to, delay similarity threshold, gain improvement threshold, etc., and notifies the terminal equipment of the configured parameters for matching, as shown in step 6. It should be noted that the parameters for matching may also be notified to the terminal equipment in other ways, for example, the parameters for matching may be notified to the terminal equipment in other operations in advance, or may be notified to the terminal equipment by other devices in advance.

It should be noted that the parameters for matching (including, but not limited to, the delay similarity threshold, gain improvement threshold, etc.) can also be notified to the terminal equipment by the base station in another processing. For example, the base station may incorporate the parameters for delay and gain matching into the system broadcast, and notify the terminal equipment during the cell search stage in step 1. In this case, step 6 may be omitted.

According to some aspects, the parameters for matching configured by the base station may only include the gain improvement threshold, and the delay similarity threshold may be set by the terminal equipment itself. For example, the terminal equipment may set the delay similarity threshold to a multiple of the delay estimation accuracy, and the delay estimation accuracy may be calculated as described above. Therefore, the delay similarity threshold may not be transmitted in step 6, which saves communication overhead.

Then, the base station sweeps second beams (narrow beam) included in the coverage of the first beam, as shown in step 7. The narrow beam sweeping here is performed for each second beam one by one.

For each swept narrow beam, the terminal equipment estimates the channel path parameters corresponding to the narrow beam, including the delay and gain, and performs matching by means of at least one of or both of the delay similarity criterion and the gain improvement criterion, as shown in steps 8.

It should be noted that, as described above, the matching operation can be performed with respect to only the channel path gain, so in the operation of step 8, the delay matching operation is optional. According to some aspects, if the matching operation is performed based on only the channel path gain, then in the previous estimation result, only the estimation result of the channel path gain may be stored, thereby saving storage resources to a certain extent.

If the matching condition is met, it is determined that the desired beam is found, and the terminal equipment notifies the base station to cease the beam sweeping, and thus the estimation of channel path parameters will cease, as shown in step 9.

Alternatively, instead of notifying the base station to cease the sweeping, the terminal equipment itself can directly cease the estimation of channel path parameters corresponding to the narrow beam. At this time, although the base station continues to transmit narrow beams, because the terminal equipment no longer performs parameter estimation, the terminal equipment itself can save power, and the communication process can be simplified to a certain extent. In this case, step 9 can also be omitted.

After the desired beam is determined, the terminal equipment may feedback the beam information of the selected beam to the base station, including beam quality, beam index, etc., as shown in step 10.

If the matching condition is not met, the terminal equipment will receive the next narrow beam, and repeat the operations in steps 8-10 for the narrow beam, until the desired beam is determined, and the estimation of the channel path parameters will cease.

Therefore, an appropriate narrow beam can be cost-effectively determined and notified to the base station side, so that a communication beam pair between the base station and the user equipment can be cost-effectively established, which reduces the overhead and delay of beam sweeping.

In the prior beam sweeping process, the base station sweeps the beams on its own, and there is no mechanism for the terminal equipment to actively cease, however, the scheme in this embodiment can implement such a mechanism, as shown in step 9. An example of the terminal device feedbacking beam termination information will be briefly described below with reference to FIG. 16.

In the beam sweeping operation, the base station may configure CSI-RS resources for the terminal equipment to perform beam sweeping, and each beam sweeping occupies a length of one OFDM symbol in the time domain. According to the prior frame structure, each slot contains 14 OFDM symbols, of which several OFDM symbols can be used for placing CSI-RS, that is, several candidate beams can be swept in each slot. At the end of the slot, the terminal device can generate an uplink signal.

In combination with the present disclosure, if a beam that meets a matching condition is found during the sweeping process, a sweeping termination signaling is transmitted to the base station on the uplink channel at the end of the time slot, thereby completing the beam sweeping.

For example, the base station has 64 candidate beams (numbered Tx1-Tx64), and 8 candidate beams can be swept in each slot, and the beam sweeping is performed in order. In a prior scheme, users need 8 time slots to complete the beam sweeping. In this disclosure, for example, if the user finds that the beam Tx21 meets the matching condition, the termination signaling is fed back in the third time slot, so that the beam sweeping is completed using only three time slots, which reduces delay and overhead of the beam sweeping.

Figure 17:
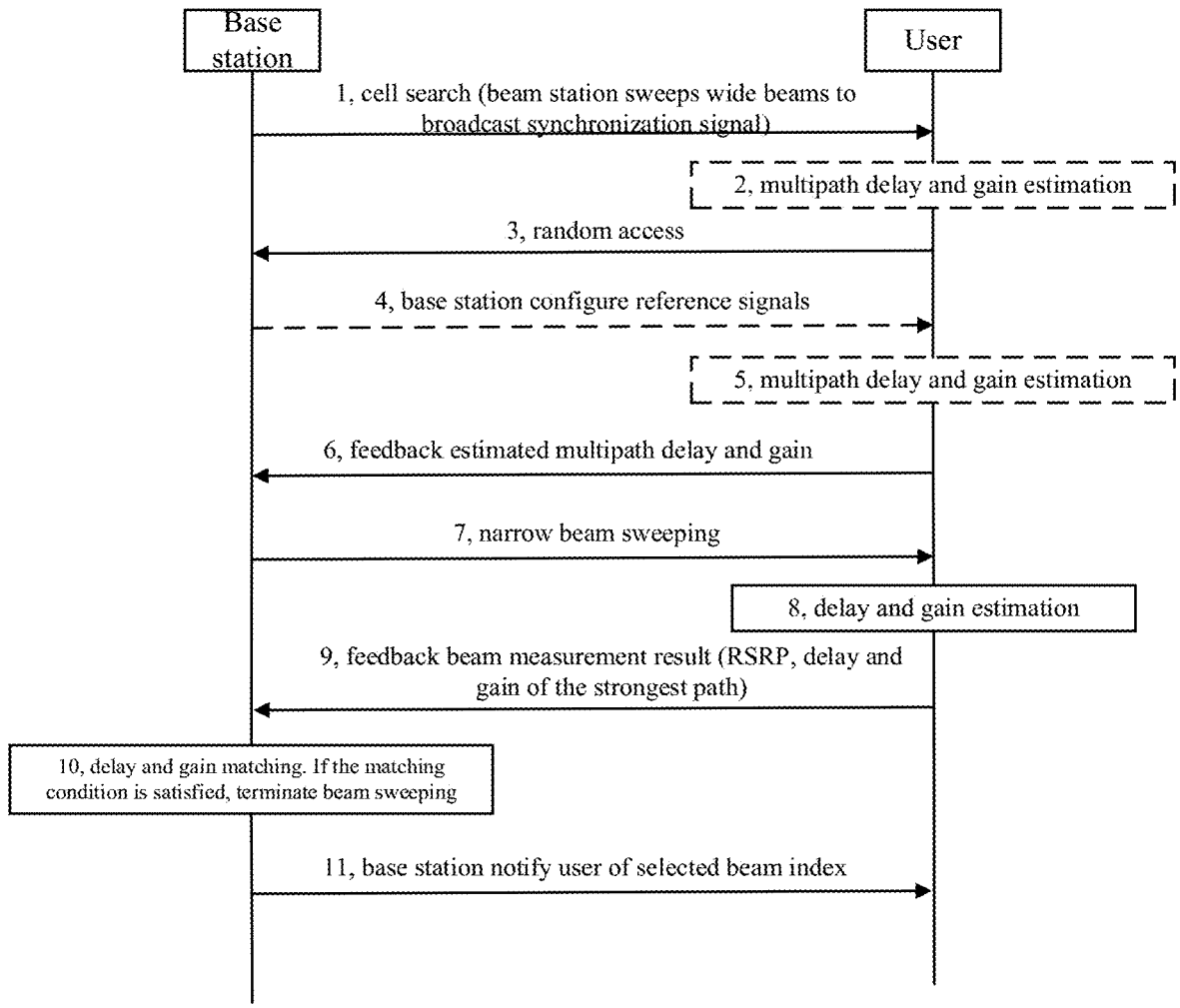
FIG. 17 is a signaling flowchart of beam selection performed by a base station in a downlink communication.

FIG. 17 illustrates a signaling flow of the beam management scheme according to this embodiment being mainly implemented at a base station side. The channel path estimation and matching in the scheme according to this embodiment is mainly performed on the base station side (transmitter side).

Steps 1-5 show the initial synchronization/access between the base station and the terminal equipment, and the estimation of channel path parameters for the wide beam, which can be implemented as steps 1-5 in FIG. 15, and will not be described in detail.

Subsequently, the terminal equipment feeds back the estimated channel path parameters corresponding to the wide beam to the base station, as shown in step 6.

Then, the base station sweeps second beams (narrow beams) included in coverage of the first beam, as shown in step 7. The narrow beam sweeping here is performed for each second beam one by one.

For each swept narrow beam, the terminal equipment estimates the channel path parameters, including delay and gain, corresponding to the narrow beam, as shown in step 8, and feedback them to the base station. The feedback content may include the estimation result of the channel path parameters corresponding to the narrow beam, and may further include beam information of the narrow beam, which includes beam quality, beam index, etc., as shown in step 9.

Next, the base station performs matching between the channel path parameters under the first beam and the channel path parameters under the second beam, and the matching may be performed by using at least one of or both of the delay similarity criterion and the gain improvement criterion. If the matching condition is met, it is determined that a desired beam is found, the base station ceases the beam sweeping, and thus the estimation of the channel path parameters will cease, as shown in step 10.

The parameters for matching used in the matching can be set by the base station itself, and include, but not limited to, a delay similarity threshold, a gain improvement threshold, and the like. It should be noted that the parameters for matching can also be notified to the base station in other ways, such as being notified to the base station by other devices in advance. According to some aspects, if the delay similarity threshold is set by the terminal equipment, the delay similarity threshold may be fed back to the base station by the terminal equipment, for example, in step 6 or step 9.

It should be noted that, as described above, the matching operation can be performed based on only the channel path gain, so in the operation of step 10, the delay matching operation is optional. According to some aspects, if the matching operation is performed based on only the channel path gain, only the channel path gain may be fed back in the channel path estimation result fed back by the terminal equipment, thereby saving communication overhead to a certain extent.

If the matching condition is not met, the base station will sweep the next narrow beam and repeat the operations in steps 8-10 for the narrow beam, until the desired beam is determined and the estimation of channel path parameters will cease.

After determining the desired beam, the base station may notify the terminal equipment of information about the selected beam, such as a beam index. Therefore, an appropriate narrow beam can be determined cost-effectively and notified to the terminal equipment side, so that a communication beam pair between the base station and the user equipment can be cost-effectively established.

It should be noted that the example described above is mainly for a case of downlink communication link, and its operation can be similarly applied to an uplink communication link in which the base station corresponds to the receiver side and the terminal equipment (user) corresponds to the transmitter side.

Figure 18:
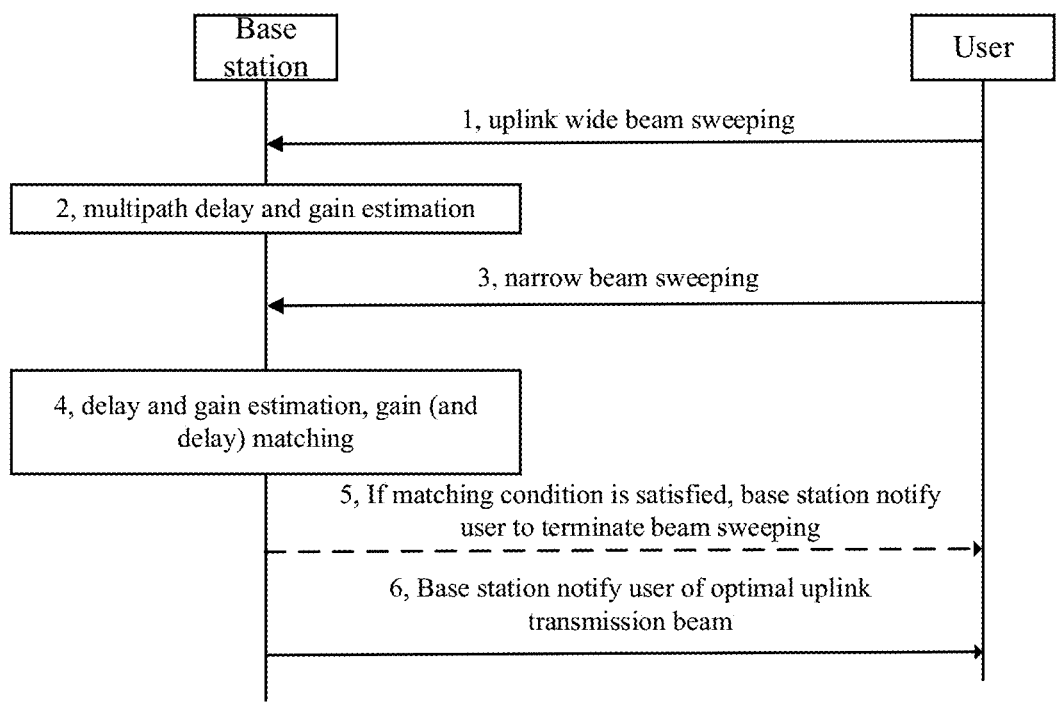
FIG. 18 is a signaling flowchart of beam selection in an uplink communication.

FIG. 18 shows a signaling flowchart of beam selection in the uplink communication.

As shown in step 1, the terminal equipment configures reference signals to perform uplink beam sweeping to the base station through a first beam (wide beam). After receiving the wide beam, the base station can perform channel path parameter estimation under the wide beam, as shown in step 2. The estimation may include path delay and gain estimation.

Subsequently, as shown in step 3, the terminal equipment configures reference signals, and performs uplink beam sweeping to the base station through second beams (narrow beam) included in coverage of the first beam. The narrow beam sweeping here is performed for each second beam one by one.

For each swept narrow beam, the base station estimates channel path parameters corresponding to the narrow beam, including delay and gain, and uses at least one of or both of the delay similarity criterion and the gain improvement criterion to perform matching, as shown in step 4.

The parameters for matching used in the matching can be set by the base station itself, and include, but not limited to, a delay similarity threshold, a gain improvement threshold, and the like. It should be noted that the parameters for matching can also be notified to the base station in other ways, such as being notified to the base station by other devices in advance. According to some aspects, if the delay similarity threshold is set by the terminal equipment, the delay similarity threshold may be notified to the base station by the terminal equipment during the sweeping process.

It should be noted that, as described above, the matching operation can be performed based on only the channel path gain, so in the operation of step 4, the delay matching operation is optional. According to some aspects, if the matching operation is performed based on only the channel path gain, only the channel path gain may be stored in the previous estimation result, thereby saving storage resources to a certain extent.

If the matching condition is met, it is judged that the desired beam is determined, and the base station notify the terminal equipment to cease beam sweeping, as shown in step 5. Alternatively, instead of notifying the terminal equipment to cease the beam sweeping, the base station can directly cease the estimation of channel path parameters corresponding to narrow beams. In such a case, the step 5 can be omitted.

After determining the desired beam, the base station may notify the terminal equipment of information about the selected beam, including a beam quality, a beam index, etc., as shown in step 6. Therefore, the terminal equipment can know the optimal uplink transmission narrow beam.

If the matching condition is not met, the base station will receive the next narrow beam and repeat the operations in steps 3-6 for the narrow beam, until the desired beam is determined and the estimation of channel path parameters will cease.

In the technical solution according to this embodiment, in the beam training, estimation, matching and feedback are performed for each swept narrow beam (second beam). Compared with the prior technology, the feedback information can be reduced. For example, in the wide beam measurement, the number of feedback paths can be configured by the base station (at least 1); in the narrow beam measurement, only the strongest path can be fed back, thereby reducing feedback information. Further, the path gain in the feedback channel path parameter may be only the magnitude of the path gain, and even the feedback channel path parameter may include only the path gain, so that the information to be feedback may be further reduced. This saves communication overhead.

Therefore, the fast beam management mechanism proposed in the present disclosure can reduce the overhead and delay of narrow beam sweeping, and has a small performance degradation compared with the scheme of scanning all candidate beams.

Hereinafter, simulation results of a fast beam management mechanism based on channel path parameters according to an embodiment of the present disclosure will be described with reference to the drawings.

The simulation conditions are that the channel includes a direct path and a reflective path, and the base station and the user are equipped with 16 and 4 antennas, respectively. The channel delay is extended to 300 ns, the OFDM size is 2048, and the subcarrier interval is 120 kHz. The wide beam has a width of about 30 degrees and covers five narrow beams each with a width of about 7.5 degrees. A DFT codebook is used for beamforming, and 64 reference signals spaced at an interval of 6 subcarriers are used for path delay and gain estimation. Compared with an exhaustive search algorithm that searches all candidate beams and selects the highest gain.

Figure 19:
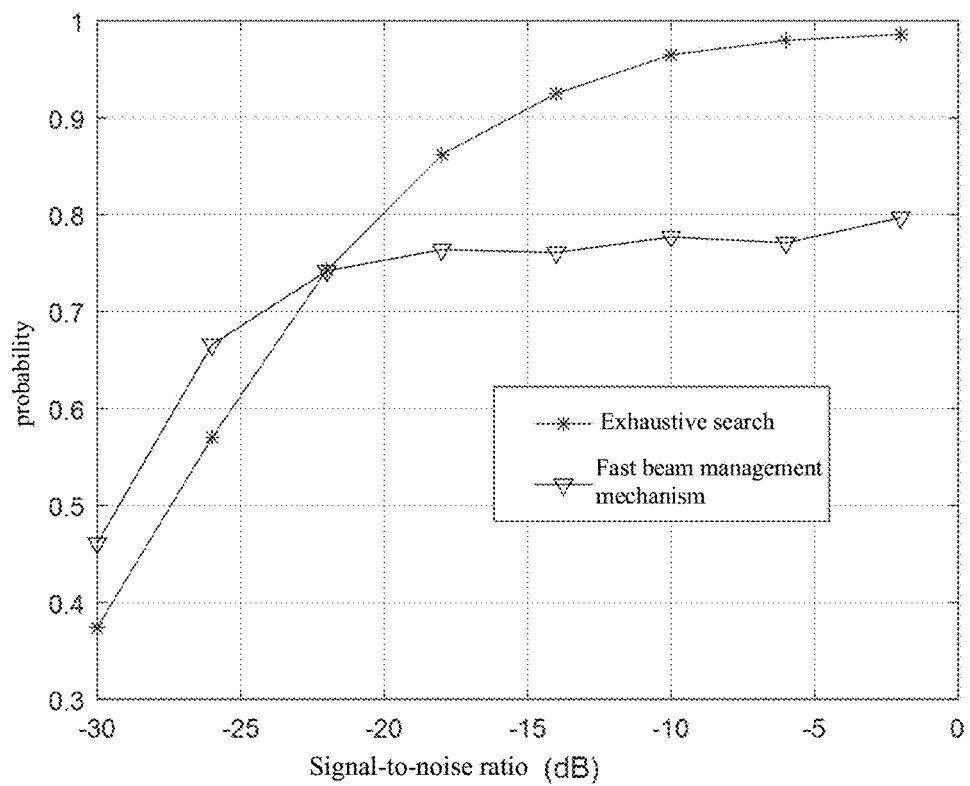
FIG. 19 is a simulation result of a probability of obtaining an optimal beam of the technical solution according to an embodiment.

FIG. 19 shows the simulation result for a probability of obtaining the optimal beam at different signal-to-noise ratios. It can be seen that the probability of the disclosed method to obtain the optimal beam is better than that of the exhaustive search at a low signal-to-noise ratio, and the probability of the disclosed method to obtain the optimal beam is more than 80% at a high signal-to-noise ratio. It should be noted that even if the optimal beam is not obtained, the gain improvement criterion ensures that the technical solution of this embodiment can obtain sufficient beamforming gain.

Figure 20:
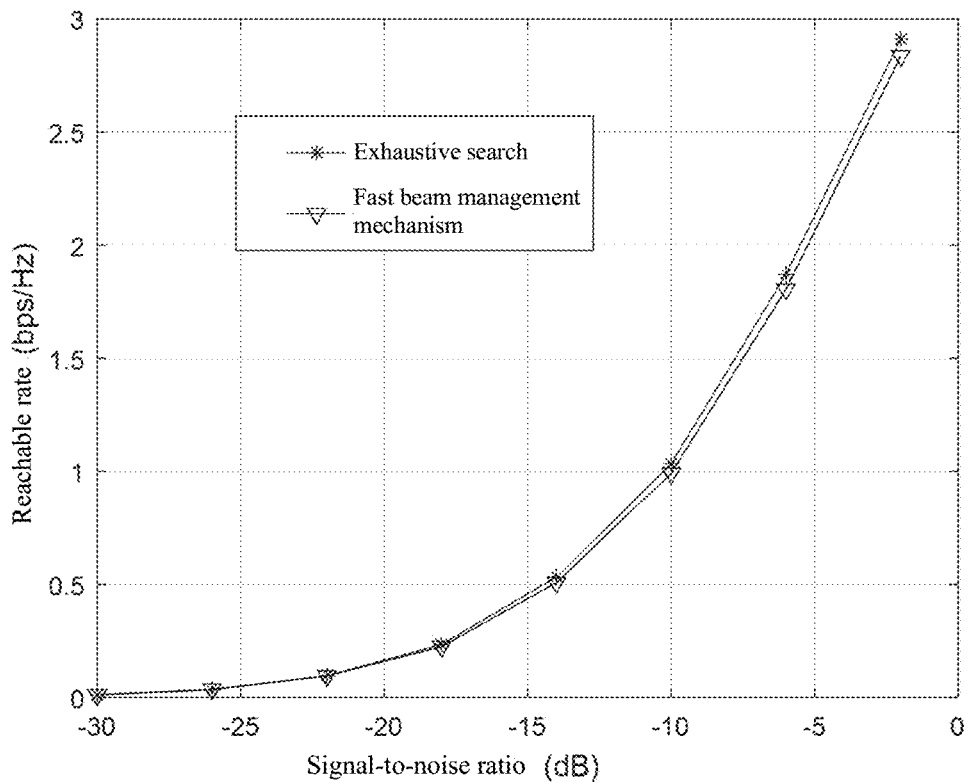
FIG. 20 is a simulation result of the reachable probability of the technical solution according to the embodiment.

FIG. 20 shows the simulation result of reachable rate at different signal-to-noise ratios. It can be seen that, because the technical solution of this embodiment obtains an optimal beam with a relative high probability, and even if the optimal beam is not obtained, a sufficiently high beamforming gain can be ensured, so the loss of the reachable rate is very small compared to the exhaustive search algorithm.

Figure 21:
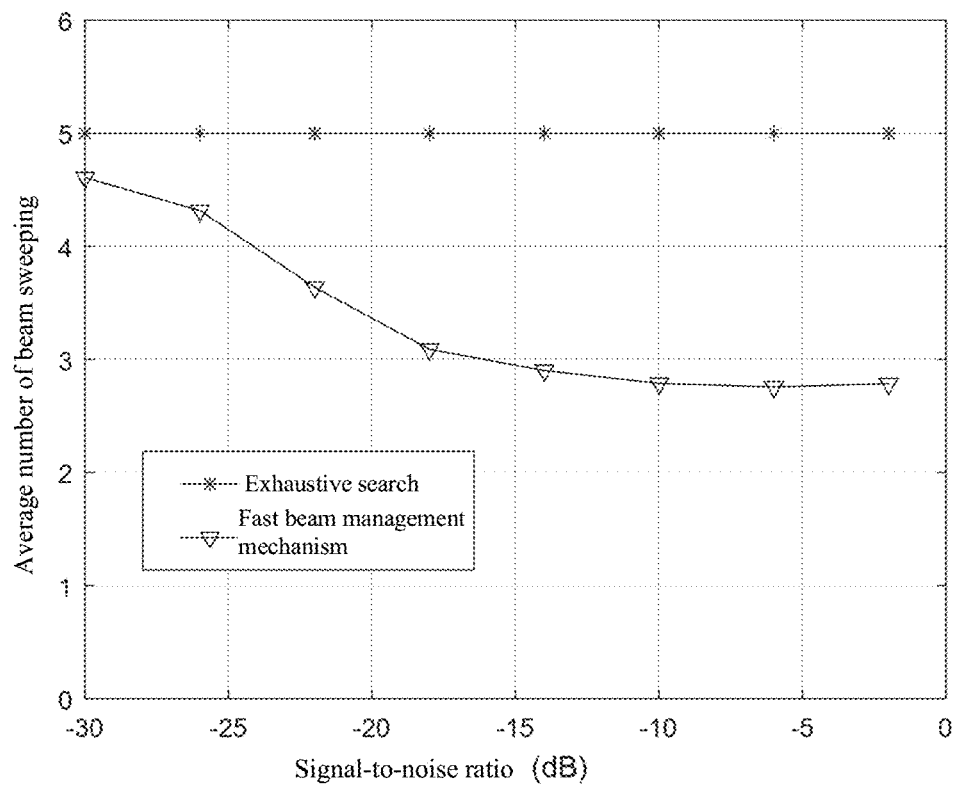
FIG. 21 is a simulation result of beam sweeping overhead of the technical solution according to the embodiment.

FIG. 21 shows the average number of beam searches at different signal-to-noise ratios. It can be seen that as the signal-to-noise ratio increases, the average number of searches of the disclosed method decreases. When the signal-to-noise ratio is sufficiently high, it approaches the theoretical limit $$\frac{N_{narrow} + 1}{2}$$

under equal probability. It is proved that the technical solution of this embodiment can effectively reduce the overhead and delay of the beam search.

Second Embodiment

The second embodiment of the present disclosure will be described in detail below. The second embodiment of the present disclosure mainly relates to an improved beam reciprocity determination, which utilizes a matching status between a channel path parameter under an uplink beam and a channel path parameter under a downlink beam to determine whether there exists the reciprocity between the uplink and downlink beams.

Beam reciprocity can also be referred to as beam symmetry, which can include the beam symmetry of each of the base station and the terminal equipment, and can also be known as the transmit and receive beam symmetry, which represents the strongest receiving beam and the strongest transmission beam are the same for a communication device (for example, the base station or the terminal equipment) on one side of a communication link. According to the beam reciprocity, the uplink receiving (transmission) beam can be determined according to the downlink transmission (receiving) beam. The principle lies in that there exists reciprocity between the angle of departure/angle of arrival for the uplink and downlink channel transmission paths, thereby simplifying the beam determination process.

In a TDD systems, the reciprocity usually exists. In a FDD system, it is difficult to determine whether the beam reciprocity exists due to different uplink and downlink carrier frequencies. The simplest approach to determine the beam reciprocity is to perform determination based on the uplink and downlink carrier frequency interval. If the interval is small, the reciprocity is considered to be true; if the interval is large, the reciprocity is considered not to be true. Another approach is to measure beam reciprocity within a cell when the infrastructure is deployed. However, the above approaches are static, that is, the beam reciprocity is the same for all users at any time.

The present embodiment proposes an improved beam/channel reciprocity determination scheme, which particularly determines the beam/channel reciprocity by using channel path parameters (which may include channel path gain and/or channel path delay) corresponding to a beam. The principle is that if the angle of departure/angle of arrival of a channel transmission path has reciprocity, the corresponding transmission paths of the uplink and downlink channels will experience similar channel status, so the parameters of the uplink and downlink channel paths should be similar. Therefore, whether the uplink and downlink channels/beams have reciprocity can be determined by judging whether the channel path parameters of the uplink and downlink channels match.

The technical solution of this embodiment is that one side (transmitter side/receiver side) in a wireless communication system uses a beam to transmit to the other side (receiver side/transmitter side) of the wireless communication system and uses the same beam to receive a signal from the other side, estimate respective channel path parameters in the transmission and reception, and determine whether there is a channel/beam reciprocity by performing matching between the estimated two channel path parameters.

According to some embodiments, an electronic device for a receiver side of a wireless communication system is proposed. The electronic device may include a processing circuitry, which can be configured to estimate a receive channel path parameter based on reference signals which are received with a first beam acting as a receiving beam and transmitted from a transmitter side of the wireless communication system with a second beam acting as a transmission beam; transmit reference signals to the transmitter side with the first beam acting as a transmission beam, wherein the transmitter side receives the reference signals with the second beam acting as a receiving beam, so that a transmit channel path parameter can be estimated; and wherein beam reciprocity between the transmitter side and the receiver side can be determined based on the receive channel path parameter and the transmit channel path parameter.

According to some embodiments, an electronic device for a transmitter side of a wireless communication system is proposed. The electronic device may include a processing circuitry, which can be configured to transmit reference signals to a receiver side of the wireless communication system with a second beam acting as a transmission beam, wherein the receiver side receives the reference signals with a first beam acting as a receiving beam, so that a transmit channel path parameter can be estimated; estimate a receive channel path parameter based on reference signals which are received with the second beam acting as a receiving beam and transmitted from the receiver side with the first beam acting as a transmission beam; wherein beam reciprocity between the transmitter side and the receiver side can be determined based on the receive channel path parameter and the transmit channel path parameter.

According to some embodiments, the receive channel path parameter may comprise respective receive channel path parameters for one or more channel paths. According to some embodiment, the transmit channel path parameter may include respective transmit channel path parameter for one or more channel paths.

According to some aspects, the estimation of the channel path parameters in this embodiment may be performed as described above with reference to the first embodiment, for example, may be performed based on transmitted reference signals and/or transmitted synchronization signals, and will not be described in detail herein.

According to some aspects, in the determination of the beam reciprocity in this embodiment, whether there is the beam reciprocity is judged by judging whether the receive channel path parameter and the transmit channel path parameter match.

According to some aspects, each of the receive channel path parameter and the transmit channel path parameter may include at least one of a channel path gain and a channel path delay as described above, which may also be estimated as described above, and thus will not be described in detail. The embodiments of the present disclosure can determine whether respective channel path gains or channel path delays match according to the gain similarity criterion or the delay similarity criterion.

According to some embodiments, the receive channel path parameter and the transmit channel path parameter each may include a channel path delay. Wherein, when a difference between the receive channel path delay and the transmit channel path delay is less than a delay threshold, there exists a beam reciprocity between the transmitter side and the receiver side.

According to some embodiments, the receive channel path parameter and the transmit channel path parameter each may include a channel path gain. Wherein, when a difference between the receive channel path gain and the transmit channel path gain is less than a gain threshold, there exists a beam reciprocity between the transmitter side and the receiver side.

Specifically, let the path delay and gain obtained from the uplink channel estimation and downlink channel estimation be $\{\tau_l^{DL}, G_l^{DL}\}_{l=1}^{L}$, and $\{\tau_l^{UL}, G_l^{UL}\}_{l=1}^{L}$ respectively, and the delay similarity and gain similarity criteria can be expressed as $$|\tau_l^{DL} - \tau_l^{UL}| < \beta_\tau, 1 \leq l \leq L$$

$$|G_l^{DL} - G_l^{UL}| < \beta_G, 1 \leq l \leq L$$

Where $\beta_\tau$ and $\beta_G$ are thresholds for the delay similarity and the gain similarity respectively. It should be noted that due to different factors of uplink and downlink such as transmit power, the gain $G_l^{DL}$ and $G_l^{UL}$ should be corrected in advance so that they are basically in the same order of magnitude. For example, if the downlink power is 10 dB greater than the uplink power, so $G_l^{DL}$ should be scaled down by 10 dB in advance.

It should be noted that in the operation of determining the beam reciprocity according to this embodiment, the determination can be made based on only the channel delay, that is, whether the beam reciprocity exists can be judged according to the delay similarity criterion. On the other hand, according to some embodiments, the beam reciprocity determination of the present disclosure may combine both channel path gain similarity and channel path delay similarity, thereby enabling more accurate determination of reciprocity.

According to some aspects, the operation of reciprocity determination according to this embodiment may be performed on either side in a wireless communication system (receiver/transmitter side), and after the determination, the determination result (beam reciprocity) may be notified to the other side (transmitter/receiver side).

According to some embodiments, the processing circuitry of the electronic device may include various units to implement various embodiments according to the present disclosure. Of course, the processing circuitry can also be implemented in other ways, and is not limited to this.

Figure 22A:
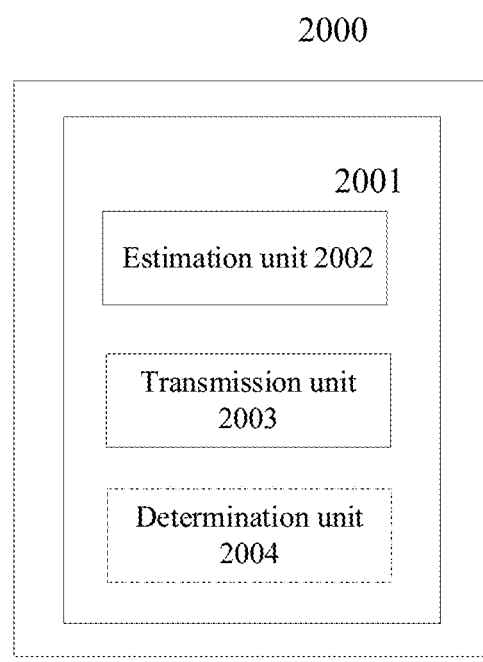
FIGS. 22A and 22B are an electronic device for a receiver side and an electronic device for a transmitter side according to a second embodiment, respectively.

FIG. 22A illustrates an exemplary implementation of an electronic device 2000 for a receiver side according to an embodiment of the present disclosure. In one embodiment, the electronic device 2000 may be implemented as a receiver or a part thereof, or may be implemented as a device or a part of the device for controlling a receiver or otherwise being related to a receiver.

The electronic device 2000 shown in FIG. 22A may include a processing circuitry 2001, which may refer to various implementations of a digital circuitry system, an analog circuitry system, or a mixed signal (combination of analog signals and digital signals) circuitry system in a computing system that perform functions. The processing circuitry may include, for example, a circuit such as an integrated circuit (IC) and an application specific integrated circuit (ASIC), a portion or circuit of a separate processor core, an entire processor core, a separate processor, a programmable hardware device such as a field programmable array (FPGA)), and/or a system including multiple processors.

In one embodiment, the processing circuitry 2001 includes at least an estimation unit 2002. Various operations described below may be implemented by units 2002 or other possible units.

In one embodiment, the estimation unit 2002 may estimate a receive channel path parameter based on reference signals which are received with a first beam acting as a receiving beam and transmitted from a transmitter side of the wireless communication system with a second beam acting as a transmission beam. The corresponding estimation processing may be implemented as described in the first embodiment, or implemented in other manners known in the art, and will not be described in detail here.

In one embodiment, the processing circuitry may further include a transmission unit 2003, which may transmit reference signals to the transmitter with the first beam acting as a transmitting beam.

The processing circuit may optionally further include a determination unit 2003, which may determine beam reciprocity between the transmitter side and the receiver side based on the receive channel path parameter and the transmit channel path parameter. According to some aspects, the determination unit may include a comparison unit that compares the receive channel path parameter and the transmit channel path parameter, for example, calculates a difference therebetween as described above. If the difference is less than a threshold, it can be determined that the beam reciprocity exists.

It should be noted that such a determination unit 2003 is not necessarily located in the processing circuitry, but may also be located outside the processing circuitry or outside the electronic device. Therefore, the determination unit 2003 is shown with a dotted line in the drawing, and the corresponding processing will be described in detail below.

According to some embodiments, the electronic device may further include a receiving unit that receive the reference signals transmitted from a transmitter side of the wireless communication system with a second beam acting as a transmission beam in a case of a first beam acting as a receiving beam. Such a receiving unit may be located in the processing circuitry, in the estimation unit, or elsewhere in the electronic device. Additionally, the electronic device may further include a receiving unit for receiving any information about the channel path parameter estimation result or the beam reciprocity determination result and the like from the transmitter side.

The electronic device 2000 may further include, for example, a communication unit for communicating with the transmitter side and a memory storing related information. The communication unit and the memory may be implemented like the communication unit 604 or the memory 605 in FIG. 6, or may be implemented in other manners known in the art, which will not be described in detail here.

Figure 22B:
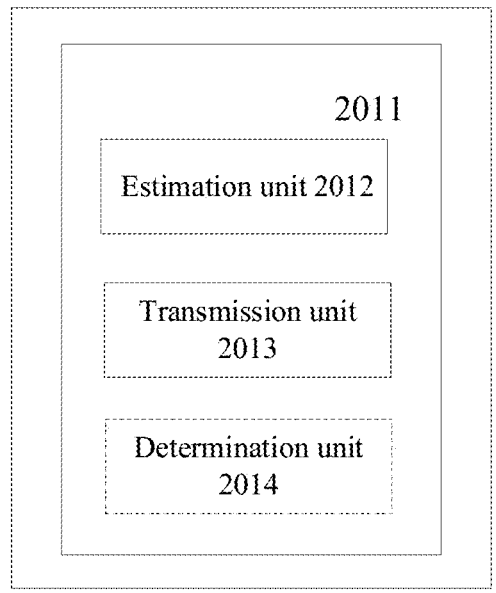

FIG. 22B illustrates an exemplary implementation of an electronic device for a transmitter side according to an embodiment of the present disclosure. The electronic device 2010 shown in FIG. 22B may comprise a processing circuitry 2011, which may be implemented in various ways as described above.

In one embodiment, the processing circuitry may be implemented substantially like the processing circuitry 2001 shown in FIG. 22A. For example, each unit included in the processing circuitry may be implemented like the corresponding unit shown in FIG. 22A, which will not be described in detail here.

It should be noted that each of the above units is only a logical module classified according to the specific function it implements, instead of limiting its specific implementation manner. For example, it can be implemented in software, hardware, or a combination of software and hardware. In actual implementation, the foregoing units may be implemented as independent physical entities, or may be implemented by a single entity (for example, a processor (CPU or DSP, etc.), an integrated circuit, etc.).

It should be noted that the arrangement of each unit as described above is also exemplary only, and is not limited to the above-mentioned case. For example, considering that the estimation processing can also be distributed on both of the receiver side and the transmitter side, some functions in the estimation unit on the receiver side can also be at least partially distributed on the transmitter side, and perform calculation by receiving information feedback from the receiver. In addition, for example, the transmission and receiving units on the transmitter side may be similarly arranged on the receiver side.

It should be noted that the transmitter side and the receiver side as described above may correspond to respective parties in a wireless communication system. For example, the transmitter side may correspond to a base station, the receiver side may correspond to a user equipment, and the operations particularly correspond to downlink communication transmission. For example, the transmitter side may correspond to a user equipment, the receiver side may correspond to a base station, and the operation particularly corresponds to uplink communication transmission.

Figure 23:
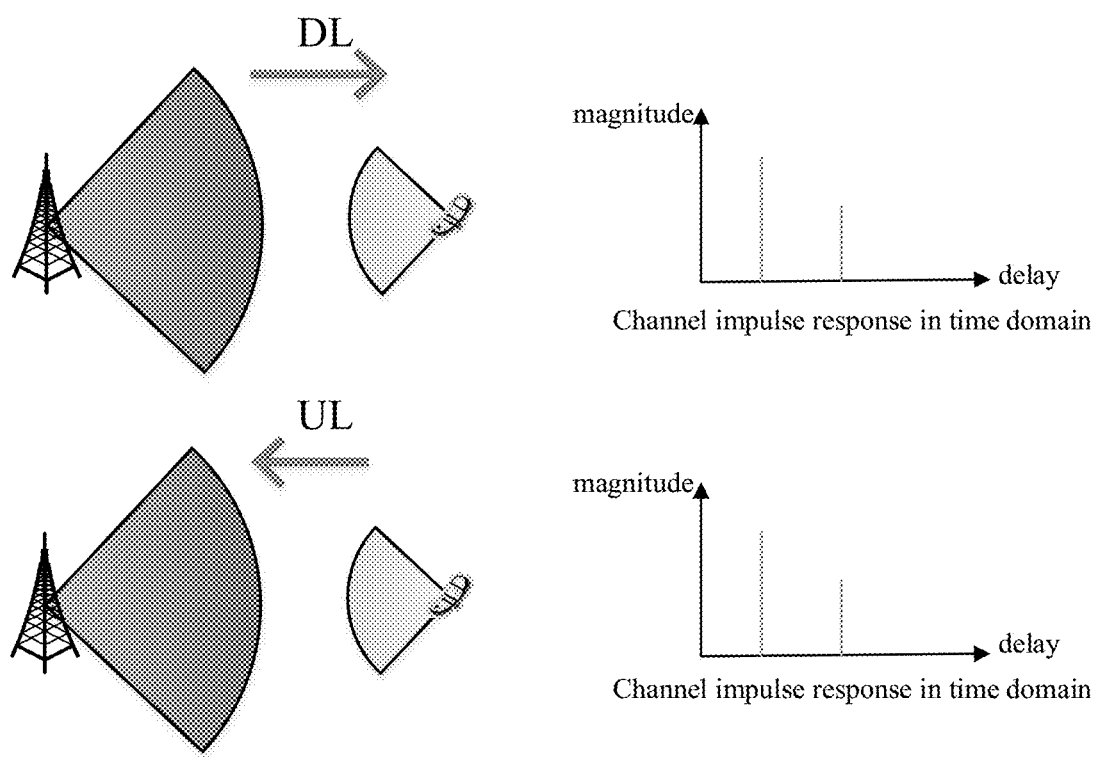
FIG. 23 is a schematic diagram of beam reciprocity determination.

FIG. 23 shows an example that meets the delay similarity and gain similarity criteria. As shown in the figure, the path gains and delays of two paths in the downlink channel match with the path gains and delays of the corresponding paths in the uplink channel respectively, so the uplink and downlink channels are reciprocal.

Figure 24:
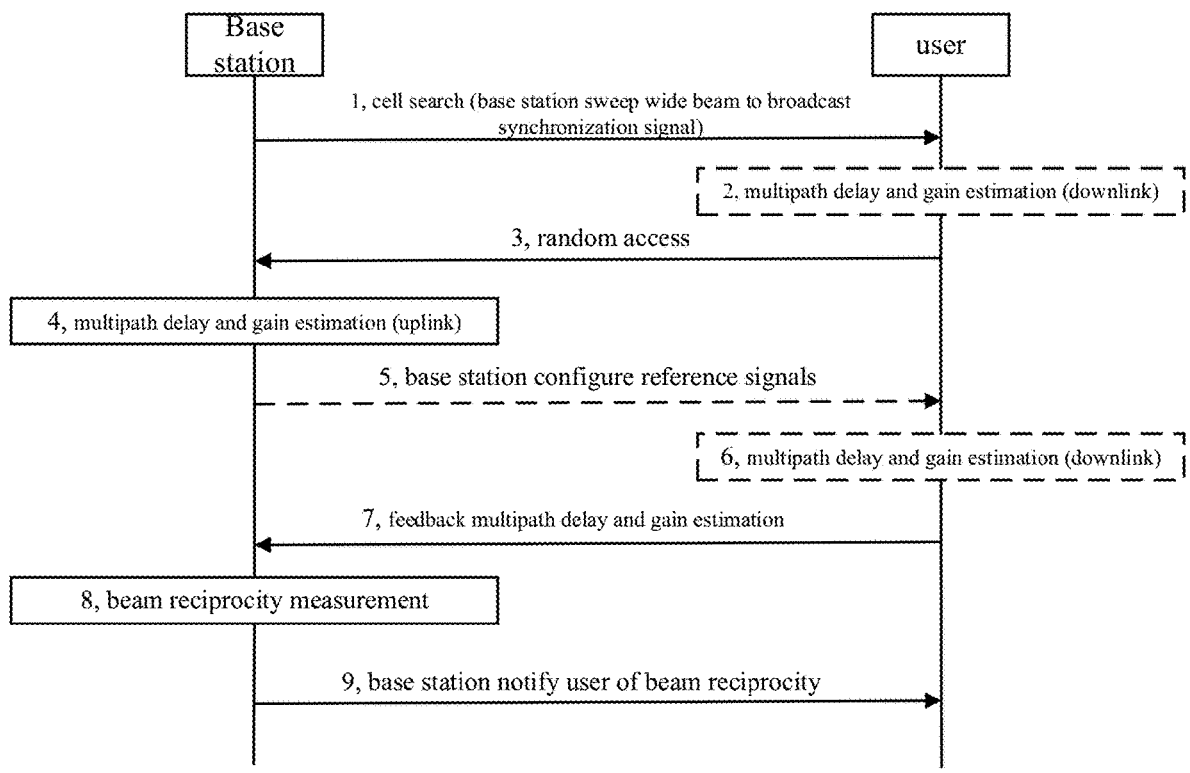
FIG. 24 is a signaling flowchart of beam reciprocity determination.

FIG. 24 shows a signalling flowchart of beam reciprocity measurement. The determination of reciprocity is mainly performed at the base station (transmitter side).

Steps 1 and 3 show the initial synchronization/access between the base station and the terminal equipment, which can be implemented like that described in the first embodiment, or can be performed by other methods known in the art, and thus will not be described in detail here.

The parameters of the downlink channel path from the base station to the terminal equipment can be estimated during the initial synchronization/access between the base station and the terminal equipment, as shown in step 2. In this case, this estimation is performed based on synchronization signal, which may be, for example, PSS signal. The estimated downlink channel path parameters are stored in the terminal equipment.

During the random access process, the base station can estimate the uplink channel path parameters according to the received reference signals, as shown in step 4.

Preferably, each of the base station and the terminal equipment can perform the receiving and transmission by using a wide beam, which has strong inclusiveness, so that the base station transmission beam used by the base station to broadcast the synchronization signal and searched by the user and the base station receiving beam used by the base station to receive a user signal during the random access usually correspond to the same beam direction, and the user receiving beam when the terminal equipment side receives the broadcast signal and the user transmission beam received by the base station when performing random access also generally correspond to the same beam direction.

Next, after the random access is successfully completed, the user can feed back the downlink channel path parameter estimated in step 2 to the base station in step 7.

According to some embodiments, the downlink channel path parameter and the uplink channel path parameter may also be estimated after the initial synchronization/access between the base station and the terminal equipment. In this case, the parameters of a downlink channel path from the base station to the terminal equipment and the parameters of an uplink channel path from the terminal equipment to the base station can be estimated by means of reference signals. For example, as shown in step 5, the base station configures the reference signals, and then as shown in step 6, the terminal equipment perform estimation of the downlink channel path parameters based on the received reference signals, including the path delay and gain estimation, where the reference signals may be, for example, CSI-RS or UE-RS signals. The estimated downlink channel path parameters are stored in the terminal equipment. On the other hand, although not shown, the terminal equipment may configure uplink reference signals to perform uplink transmission of the reference signals to the base station, whereby the base station performs estimation of the uplink channel path parameters based on the received reference signals, including path delay and gain estimation.

Preferably, each of the base station and the terminal equipment can perform the receiving and transmission of the reference signals by using a wide beam, which has strong inclusiveness, therefore, a base station transmission beam corresponding to a strongest downlink reference signal received by the terminal equipment and a base station receiving beam when the base station receives a strongest user signal usually corresponds to the same beam direction, and a user transmission beam corresponding to a strongest reference signal of the terminal equipment received by the base station and a user receiving beam used when the terminal equipment receives a strongest base station reference signal usually also corresponds to the same beam direction.

According to some embodiments, the uplink channel path parameter estimation and downlink channel path parameter estimation performed after the initial synchronization/access can be performed as a supplement to the uplink channel path parameter estimation and the downlink channel path parameter estimation performed during the initial synchronization/access process.

For example, it can be judged whether the channel path parameters estimated during the initial synchronization/access process are accurate, and if they are not accurate enough, a supplementary channel path parameter estimation can be performed, such as the channel path parameter estimation based on the reference signals.

As an example, if the result of the downlink channel path parameter estimation by broadcasting the synchronization signal as described above is not accurate enough, the downlink channel path parameter estimation based on the reference signals may be further performed, as shown in steps 5 and 6. As an example, if the result of the channel path parameter estimation performed in the random access process as described above is not accurate enough, the above-mentioned reference signal-based uplink channel path parameter estimation may be further performed.

Whether the result of the channel path parameter estimation is accurate can be judged based on a variety of conditions, for example, by setting a threshold and determining that the result is accurate when the result is lower than the threshold. Of course, it can also be judged by other methods, which will not be described in detail here.

Subsequently, the terminal equipment feeds back to the base station, and the feedback content may include an estimation result of downlink channel path parameter, as shown in step 7.

Next, the base station performs matching between the feedback downlink channel path parameter with its estimated uplink channel path parameter, and the matching can be performed by using at least one of a delay similarity criterion and a gain similarity criterion, as shown in step 8, if the matching condition is met, it is determined that beam reciprocity exists, and the terminal equipment is notified of the beam reciprocity, as shown in step 9.

It should be noted that the beam reciprocity determination performed in the above step 8 may also be performed on the terminal equipment side. For example, the base station may notify the terminal equipment of the uplink channel path parameter estimated by the base station, thereby the reciprocity determination is performed at the terminal equipment, and the terminal equipment notifies the base station of the reciprocity determination result. In this case, the terminal equipment will not need to feed back the downlink channel path parameter to the base station.

The parameters for matching used in the matching can be set by the base station itself, and include, but not limited to, a delay similarity threshold, a gain similarity threshold, and the like. It should be noted that the parameters for matching can also be notified to the base station in other ways, such as being notified to the base station by other devices in advance. According to some aspects, if the delay similarity threshold is set by the terminal equipment, the delay similarity threshold may be notified to the base station by the terminal equipment, for example, notified to the base station by feedback.

It should be noted that, as described above, the matching operation can be performed based on only the channel path delay, so in the operation of step 8, the beam reciprocity can be determined based on only the channel path delay. According to some aspects, if the matching operation is performed based on only the channel path delay, in the previous estimation result, only the estimation result of the channel path delay may be stored and feedback, thereby saving storage resources and communication overhead to a certain extent.

It should be noted that the example described above is mainly directed to a case of downlink communication link, and its operation can be applied to the uplink communication link in the same way. In the uplink communication link, the base station corresponds to the receiver and the terminal equipment (user) corresponds to the transmitter.

The reciprocity measurement technology proposed in the present disclosure can efficiently determine the beam reciprocity with higher accuracy. In particular, the reciprocity measurement technology proposed in the present disclosure does not need to use a narrow beam for sweeping as in the prior art, and only by the transmitting and receiving parties using wide beams for sweeping and in combination with uplink and downlink channel path parameters, the beam reciprocity under narrow beam can be judged, which can significantly reduce the overhead of reciprocity measurement while ensuring accuracy.

Moreover, the technical solution of the present disclosure enables the beam reciprocity to be explicitly notified to the user as signaling.

Third Embodiment

Furthermore, based on the above knowledge, an improved beam management mechanism is proposed. The basic principle of the beam management mechanism is to estimate a time domain path parameter of a channel under each beam, and select a particular transmission beam for subsequent operations based on the estimated time domain path parameters.

According to an embodiment, the time-domain path parameter of the channel may include a path gain of the channel in the time domain, and may preferably be a path gain magnitude.

According to an embodiment, there provides an electronic device for a receiver side of a wireless communication system, the electronic device may include a processing circuitry, which can be configured to: for each of a plurality of transmission beams which are used by a transmitter side of the wireless communication system for transmitting reference signals, based on reference signals transmitted via the transmission beam, estimate a path gain magnitude in a time domain of a channel path from the transmitter to the receiver corresponding to the transmission beam, and wherein a particular one of the plurality of transmission beams can be determined based on the estimated path gain magnitudes in the time domain.

According to an embodiment, there provides an electronic device for a transmitter side of a wireless communication system, the electronic device may include a processing circuitry, which can be configured to: transmit reference signals to a receiver side of the wireless communication system via each of a plurality of transmission beams, wherein for each of a plurality of transmission beams, based on the reference signals transmitted via the transmission beam, a path gain magnitude in a time domain of a channel path from the transmitter to the receiver corresponding to the transmission beam can be estimated, and wherein a particular one of the plurality of transmission beams can be determined based on the estimated path gain magnitudes in the time domain.

According to an embodiment, among the plurality of transmit beams, the path gain magnitude in the time domain of the channel path covered by the particular transmit beam is maximum.

According to an embodiment, the path gain magnitude in the time domain is a magnitude of a time-domain impulse response of the channel path.

The parameter of the channel path in the time domain involved in this embodiment, especially the path gain magnitude of the channel path in the time domain, can be performed as in the first embodiment, and will not be described in detail here.

In addition, the determination of the particular transmission beam may be performed at the receiver side, and the receiver side informs the transmitter side of beam information of the determined transmission beam. Alternatively, the determination of the particular transmission beam may also be performed at the transmitter side, where the transmitter performs the determination based on the estimated channel time-domain parameters fed back from the receiver, and notifies the receiver side of the beam information of the determined transmission beam, such as a beam index, etc.

Another aspect of the present disclosure relates to a method for a receiver side of a wireless communication system. According to an embodiment, the method can comprise: estimating, based on reference signals which are transmitted from a transmitter side of the wireless communication system via at least one second beam included in coverage of a first beam, parameters for channel paths from the transmitter to the receiver corresponding to the second beam, and wherein a particular second beam of the at least one second beam can be selected based on the estimated parameters for channel paths, and the estimated parameter for channel path corresponding to the particular second beam matches parameter for channel path corresponding to the first beam.

Another aspect of the present disclosure relates to a method for a transmitter side of a wireless communication system. According to an embodiment, the method can comprise: transmitting reference signals to a receiver side of the wireless communication system via at least one second beam included in coverage of a first beam, and wherein a particular second beam of the at least one second beam can be selected based on estimated parameters for channel paths from the transmitter to the receiver corresponding to the second beam, and the estimated parameter for channel path corresponding to the particular second beam matches parameter for channel path corresponding to the first beam.

Another aspect of the present disclosure relates to a method for a receiver side of a wireless communication system. According to an embodiment, the method can comprise estimating a receive channel path parameter based on reference signals which are received with a first beam acting as a receiving beam and transmitted from a transmitter side of the wireless communication system with a second beam acting as a transmission beam; transmitting reference signals to the transmitter side with the first beam acting as a transmission beam, wherein the transmitter side receives the reference signals with the second beam acting as a receiving beam, so that a transmit channel path parameter can be estimated; wherein beam reciprocity between the transmitter side and the receiver side can be determined based on the receive channel path parameter and the transmit channel path parameter.

Another aspect of the present disclosure relates to a method for a transmitter side of a wireless communication system. According to an embodiment, the method can comprise transmitting reference signals to a receiver side of the wireless communication system with a second beam acting as a transmission beam, wherein the receiver side receives the reference signals with a first beam acting as a receiving beam, so that a transmit channel path parameter can be estimated; estimating a receive channel path parameter based on reference signals which are received with the second beam acting as a receiving beam and transmitted from the receiver side with the first beam acting as a transmission beam; wherein beam reciprocity between the transmitter side and the receiver side can be determined based on the receive channel path parameter and the transmit channel path parameter.

Another aspect of the present disclosure relates to a method for a receiver side of a wireless communication system. According to an embodiment, the method can comprise, for each of a plurality of transmission beams which are used by a transmitter of the wireless communication system for transmitting reference signals, based on the reference signals transmitted via the transmission beam, estimating a path gain magnitude in a time domain of a channel path from the transmitter to the receiver corresponding to the transmission beam, and wherein a particular one of the plurality of transmission beams can be determined based on the estimated path gain magnitude in the time domain.

Another aspect of the present disclosure relates to a method for a transmitter side of a wireless communication system. According to an embodiment, the method comprise transmitting reference signals to a receiver side of the wireless communication system via each of a plurality of transmission beams, wherein for each of a plurality of transmission beams, based on the reference signals transmitted via the transmission beam, a path gain magnitude in a time domain of a channel path from the transmitter to the receiver corresponding to the transmission beam can be estimated, and wherein a particular one of the plurality of transmission beams can be determined based on the estimated path gain magnitude in the time domain.

It should be noted that such method embodiments can be implemented in any manner. For example, they can be implemented by corresponding devices, circuitries, apparatus in the receiver and/or transmitter in any appropriate manner. The implementation manner of the method will not be described in detail here.

It should be understood that the operations or functions of these electronic devices may be combined with each other to achieve more or less operations or functions than that described. The operational steps of the methods can also be combined with each other in any suitable order, so that more or fewer operations than described can be similarly achieved.

It should be noted that the application examples described above are merely exemplary. The embodiments of the present disclosure can also be executed in any other suitable manner in the above application examples, and the advantageous effects obtained by the embodiments of the present disclosure still can be achieved. Moreover, the embodiments of the present disclosure can also be applied to other similar application examples, and the advantageous effects obtained by the embodiments of the present disclosure can still be achieved.

It should be understood that the machine-executable instructions in the machine-readable storage medium or program product according to the embodiments of the present disclosure may be configured to perform operations corresponding to the above-mentioned device and method embodiments. When referring to the above device and method embodiments, the embodiments of the machine-readable storage medium or program product are clear to those skilled in the art, and therefore will not be described repeatedly. Machine-readable storage medium and program products for carrying or including the above-mentioned machine-executable instructions also fall within the scope of the present disclosure. Such a storage medium may include, but is not limited to, a floppy disk, an optical disk, a magneto-optical disk, a memory card, a memory stick, and the like.

Figure 25:
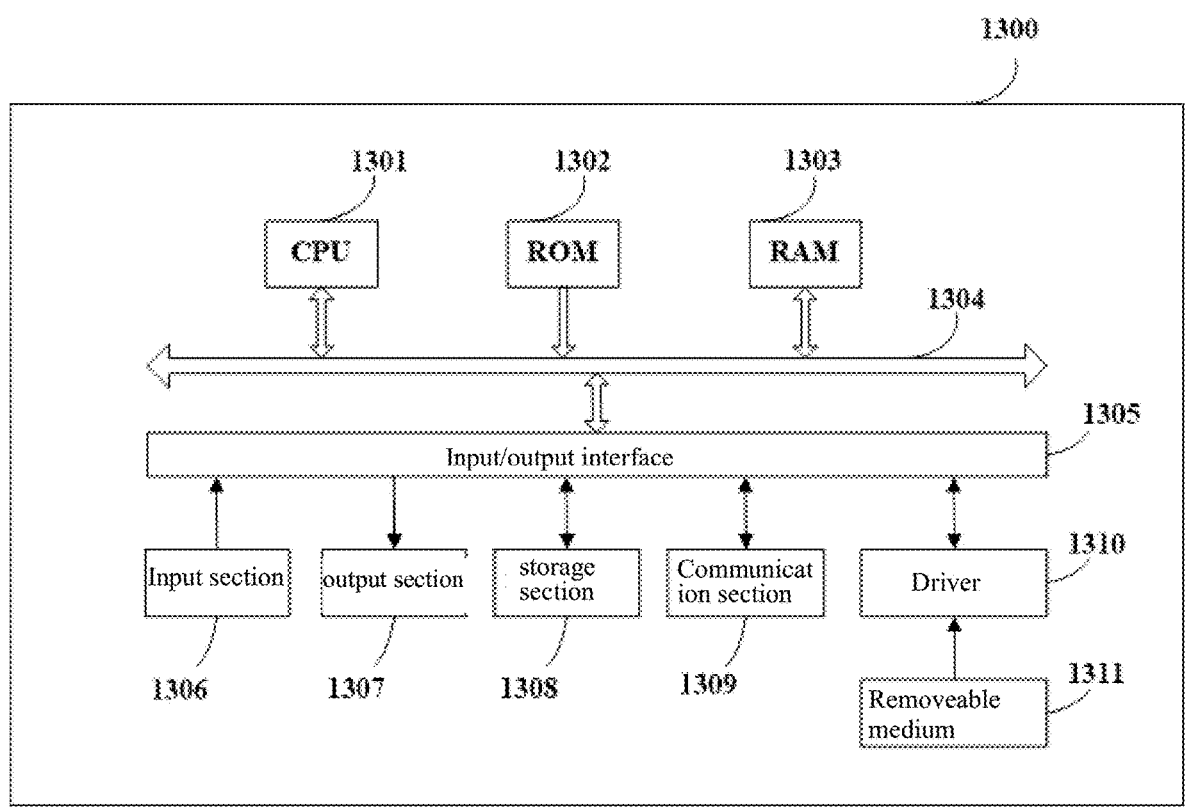
FIG. 25 is a block diagram of an exemplary structure of a personal computer as an information processing device that can be employed in an embodiment of the present disclosure.

In addition, it should be understood that the processes and devices described above may also be implemented by software and/or firmware. When implemented by software and/or firmware, a program constituting the software is installed from a storage medium or a network to a computer having a dedicated hardware structure, such as a general-purpose personal computer 1300 shown in FIG. 25, and the computer can perform a variety of functions by installing various programs thereon. FIG. 25 is a block diagram showing an example structure of a personal computer as an information processing apparatus that can be adopted in an embodiment of the present disclosure. In one example, the personal computer may correspond to the above-described exemplary terminal equipment according to the present disclosure.

In FIG. 25, a central processing unit (CPU) 1301 performs various processes according to a program stored in a read only memory (ROM) 1302 or a program loaded from a storage section 1308 to a random access memory (RAM) 1303. In the RAM 1303, data required when the CPU 1301 executes various processes and the like is also stored as necessary.

The CPU 1301, the ROM 1302, and the RAM 1303 are connected to each other via a bus 1304. An input/output interface 1305 is also connected to the bus 1304.

The following components are connected to the input/output interface 1305: an input section 1306 including a keyboard, a mouse, etc.; an output section 1307 including a display, such as a cathode ray tube (CRT), a liquid crystal display (LCD), etc., and a speaker, etc.; a storage section 1308 including hard disks, etc.; and communication section 1309 including network interface cards such as LAN cards, modems, etc. The communication section 1309 performs communication processing via a network such as the Internet.

A driver 1310 is also connected to the input/output interface 1305 as needed. A removable medium 1311 such as a magnetic disk, an optical disk, a magneto-optical disk, a semiconductor memory, etc. is installed on the drive 1310 as needed, so that a computer program read out therefrom can be installed into the storage section 1308 as needed.

In a case where the above-mentioned processes are realized by a software, the programs constituting the software are installed from a network such as the Internet or a storage medium such as a removable medium 1311.

Those skilled in the art should understand that such a storage medium is not limited to the removable medium 1311 shown in FIG. 25 in which the program is stored and which is distributed separately from the device to provide the program to the user. Examples of the removable medium 1311 include a magnetic disk (including a floppy disk (registered trademark)), an optical disk (including a CD-ROM and a digital versatile disk (DVD)), and a magneto-optical disk (including a mini disk (MD) (registered trademark))) and semiconductor memory. Alternatively, the storage medium may be the ROM 1302, a hard disk included in the storage portion 1308, and the like, in which programs are stored and which are distributed to users along with the device containing them.

The technology of the present disclosure can be applied to various products. For example, the base stations mentioned in this disclosure can be implemented as any type of evolved Node B (gNB), such as macro gNB and small gNB. A small gNB may be a gNB covering a cell smaller than a macro cell, such as a pico gNB, a micro gNB, and a home (femto) gNB. Alternatively, the base station can be implemented as any other type of base station, such as a NodeB and a Base Transceiver Station (BTS). The base station may include: a main body (also referred to as a base station device) configured to control wireless communication; and one or more remote radio heads (RRHs) disposed at a place different from the main body. In addition, various types of terminals described below can work as base stations by temporarily or semi-persistently performing base station functions.

For example, the terminal equipment mentioned in this disclosure is also referred to as user equipment in some examples, and can be implemented as a mobile terminal such as a smart phone, a tablet personal computer (PC), a notebook PC, a portable gaming terminal, a portable/dongle Mobile routers and digital cameras, or vehicle terminals such as car navigation equipment. User equipment can also be implemented as a terminal that performs machine-to-machine (M2M) communication, also called as a machine type communication (MTC) terminal. In addition, the user equipment may be a wireless communication module mounted on each of the terminals described above, such as an integrated circuit module including a single chip.

Examples according to the present disclosure will be described below with reference to FIGS. 26 to 29.

[Example of Base Station]

It should be understood that the term "base station" in this disclosure has the full breadth of its usual meaning and includes at least a wireless communication station that is used as part of a wireless communication system or radio system for facilitating communication. Examples of base stations may be, for example but not limited to, the following: may be one or both of a base transceiver station (BTS) and a base station controller (BSC) in a GSM system, may be one or both of a radio network controller (RNC) and Node B in a WCDMA system, may be eNBs in LTE and LTE-Advanced systems, or may be corresponding network nodes in future communication systems (such as gNB, eLTE, eNB, etc that may appear in 5G communication systems). Part of the functions in the base station of the present disclosure can also be implemented as an entity with control function for communication in D2D, M2M, and V2V communication scenarios, or as an entity that plays a spectrum coordination role in cognitive radio communication scenarios.

First Example

Figure 26:
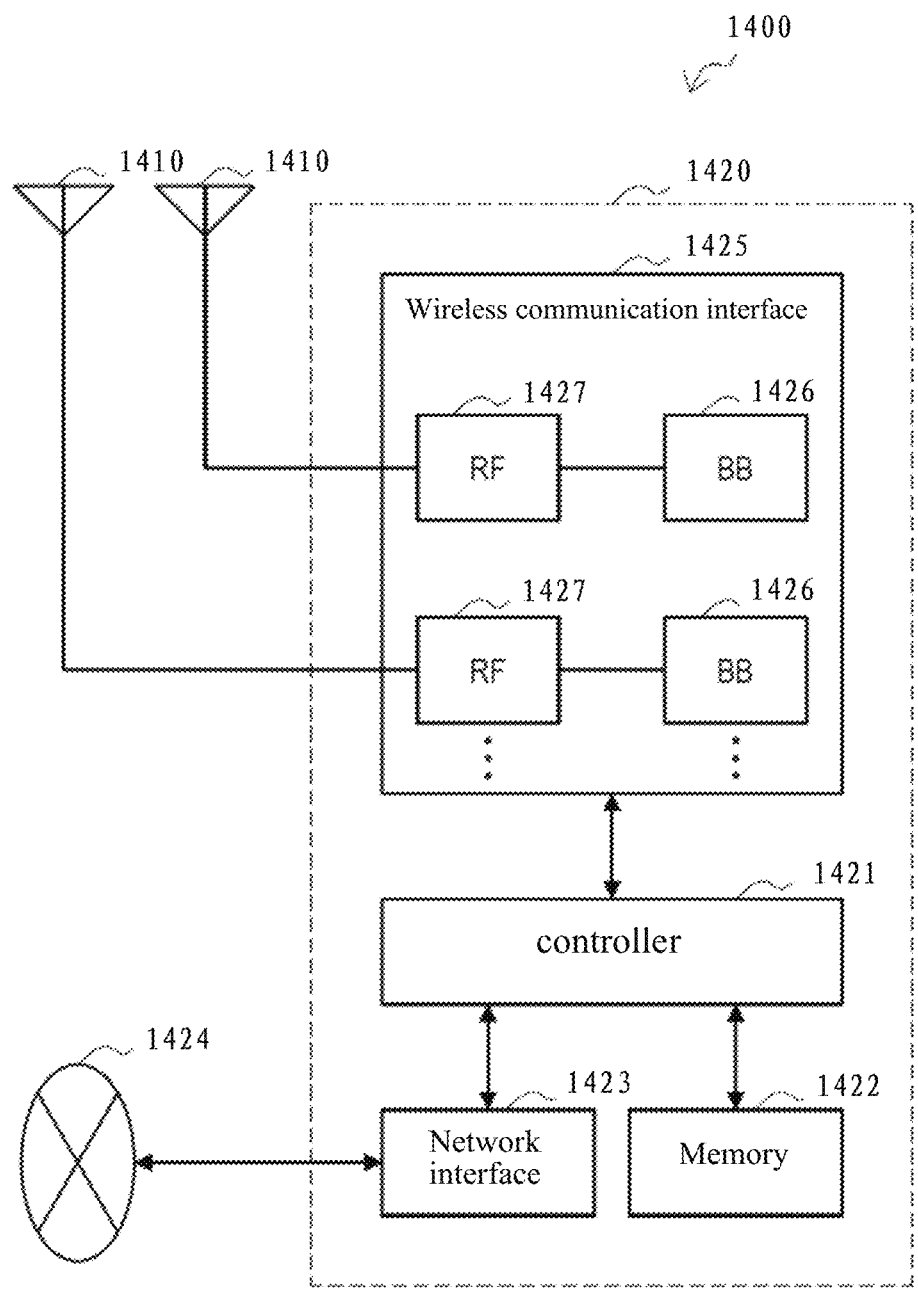
FIG. 26 is a block diagram showing a first example of a schematic configuration of a gNB to which the technology of the present disclosure can be applied.

FIG. 26 is a block diagram showing a first example of a schematic configuration of a gNB to which the technology of the present disclosure can be applied. The gNB 1400 includes a plurality of antennas 1410 and a base station device 1420. The base station device 1420 and each antenna 1410 may be connected to each other via an RF cable. In an implementation manner, the gNB 1400 (or the base station device 1420) herein may correspond to the above-mentioned electronic devices 300A, 1300A, and/or 1500B.

Each of the antennas 1410 includes a single or multiple antenna elements, such as multiple antenna elements included in a multiple-input multiple-output (MIMO) antenna, and is used for the base station device 1420 to transmit and receive wireless signals. As shown in FIG. 26, the gNB 1400 may include a plurality of antennas 1410. For example, multiple antennas 1410 may be compatible with multiple frequency bands used by gNB 1400.

The base station device 1420 includes a controller 1421, a memory 1422, a network interface 1423, and a wireless communication interface 1425.

The controller 1421 may be, for example, a CPU or a DSP, and operates various functions of the base station device 1420 at a higher layer. For example, the controller 1421 generates data packets based on data in signals processed by the wireless communication interface 1425, and passes the generated packets via the network interface 1423. The controller 1421 may bundle data from multiple baseband processors to generate bundled packets, and pass the generated bundled packets. The controller 1421 may have logical functions that perform controls such as radio resource control, radio bearer control, mobility management, admission control, and scheduling. The controls can be performed in conjunction with a nearby gNB or core network node. The memory 1422 includes a RAM and a ROM, and stores a program executed by the controller 1421 and various types of control data such as a terminal list, transmission power data, and scheduling data.

The network interface 1423 is a communication interface for connecting the base station device 1420 to the core network 1424. The controller 1421 may communicate with a core network node or another gNB via the network interface 1423. In this case, the gNB 1400 and the core network node or other gNBs may be connected to each other through a logical interface such as an S1 interface and an X2 interface. The network interface 1423 may also be a wired communication interface or a wireless communication interface for a wireless backhaul line. If the network interface 1423 is a wireless communication interface, compared with the frequency band used by the wireless communication interface 1425, the network interface 1423 can use a higher frequency band for wireless communication.

The wireless communication interface 1425 supports any cellular communication scheme such as Long Term Evolution (LTE) and LTE-Advanced, and provides a wireless connection to a terminal located in a cell of the gNB 1400 via an antenna 1410. The wireless communication interface 1425 may generally include, for example, a baseband (BB) processor 1426 and an RF circuit 1427. The BB processor 1426 may perform, for example, encoding/decoding, modulation/demodulation, and multiplexing/demultiplexing, and execute various types of signal processing in layers such as L1, Medium Access Control (MAC), Radio Link Control (RLC), and Packet Data Convergence Protocol (PDCP). As an alternative of the controller 1421, the BB processor 1426 may have a part or all of the above-mentioned logical functions. The BB processor 1426 may be a memory storing a communication control program, or a module including a processor and related circuits configured to execute the program. Updating the program can change the function of the BB processor 1426. The module may be a card or a blade inserted into a slot of the base station device 1420. Alternatively, the module may be a chip mounted on a card or a blade. Meanwhile, the RF circuit 1427 may include, for example, a mixer, a filter, and an amplifier, and transmits and receives a wireless signal via the antenna 1410. Although FIG. 26 illustrates an example in which one RF circuit 1427 is connected to one antenna 1410, the present disclosure is not limited to this illustration, but one RF circuit 1427 may be connected to multiple antennas 1410 at the same time.

As shown in FIG. 26, the wireless communication interface 1425 may include a plurality of BB processors 1426. For example, the plurality of BB processors 1426 may be compatible with multiple frequency bands used by gNB 1400. As shown in FIG. 26, the wireless communication interface 1425 may include a plurality of RF circuits 1427. For example, the plurality of RF circuits 1427 may be compatible with multiple antenna elements. Although FIG. 26 shows an example in which the wireless communication interface 1425 includes a plurality of BB processors 1426 and a plurality of RF circuits 1427, the wireless communication interface 1425 may also include a single BB processor 1426 or a single RF circuit 1427.

Second Example

Figure 27:
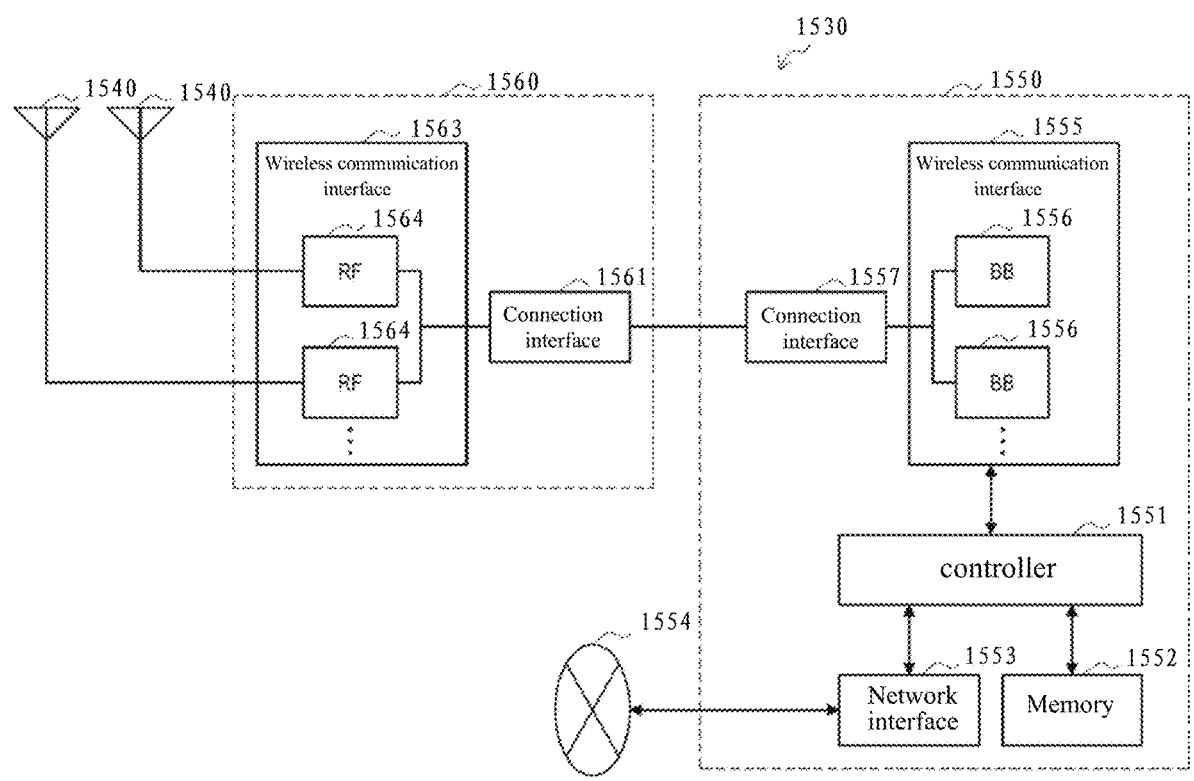
FIG. 27 is a block diagram showing a second example of a schematic configuration of a gNB to which the technology of the present disclosure can be applied.

FIG. 27 is a block diagram showing a second example of a schematic configuration of a gNB to which the technology of the present disclosure can be applied. The gNB 1530 includes multiple antennas 1540, base station equipment 1550, and RRH 1560. The RRH 1560 and each antenna 1540 may be connected to each other via an RF cable. The base station equipment 1550 and the RRH 1560 may be connected to each other via a high-speed line such as a fiber optic cable. In an implementation manner, the gNB 1530 (or the base station device 1550) herein may correspond to the foregoing electronic devices 300A, 1300A, and/or 1500B.

Each of the antennas 1540 includes a single or multiple antenna elements (such as multiple antenna elements included in a MIMO antenna) and is used for RRH 1560 to transmit and receive wireless signals. As shown in FIG. 27, the gNB 1530 may include multiple antennas 1540. For example, multiple antennas 1540 may be compatible with multiple frequency bands used by gNB 1530.

The base station device 1550 includes a controller 1551, a memory 1552, a network interface 1553, a wireless communication interface 1555, and a connection interface 1557. The controller 1551, the memory 1552, and the network interface 1553 are the same as the controller 1421, the memory 1422, and the network interface 1423 described with reference to FIG. 26.

The wireless communication interface 1555 supports any cellular communication scheme such as LTE and LTE-Advanced, and provides wireless communication to a terminal located in a sector corresponding to the RRH 1560 via the RRH 1560 and the antenna 1540. The wireless communication interface 1555 may typically include, for example, a BB processor 1556. The BB processor 1556 is the same as the BB processor 1426 described with reference to FIG. 26 except that the BB processor 1556 is connected to the RF circuit 1564 of the RRH 1560 via the connection interface 1557. As shown in FIG. 27, the wireless communication interface 1555 may include a plurality of BB processors 1556. For example, multiple BB processors 1556 may be compatible with multiple frequency bands used by gNB 1530. Although FIG. 27 shows an example in which the wireless communication interface 1555 includes a plurality of BB processors 1556, the wireless communication interface 1555 may also include a single BB processor 1556.

The connection interface 1557 is an interface for connecting the base station device 1550 (wireless communication interface 1555) to the RRH 1560. The connection interface 1557 may also be a communication module for communication in the above-mentioned high-speed line connecting the base station device 1550 (wireless communication interface 1555) to the RRH 1560.

The RRH 1560 includes a connection interface 1561 and a wireless communication interface 1563.

The connection interface 1561 is an interface for connecting the RRH 1560 (wireless communication interface 1563) to the base station device 1550. The connection interface 1561 may also be a communication module for communication in the above-mentioned high-speed line.

The wireless communication interface 1563 transmits and receives wireless signals via the antenna 1540. The wireless communication interface 1563 may generally include, for example, an RF circuit 1564. The RF circuit 1564 may include, for example, a mixer, a filter, and an amplifier, and transmits and receives wireless signals via the antenna 1540. Although FIG. 27 illustrates an example in which one RF circuit 1564 is connected to one antenna 1540, the present disclosure is not limited to this illustration, but one RF circuit 1564 may be connected to multiple antennas 1540 at the same time.

As shown in FIG. 27, the wireless communication interface 1563 may include a plurality of RF circuits 1564. For example, the plurality of RF circuits 1564 may support multiple antenna elements. Although FIG. 27 shows an example in which the wireless communication interface 1563 includes a plurality of RF circuits 1564, the wireless communication interface 1563 may include a single RF circuit 1564.

Example of User Equipment

First Example

Figure 28:
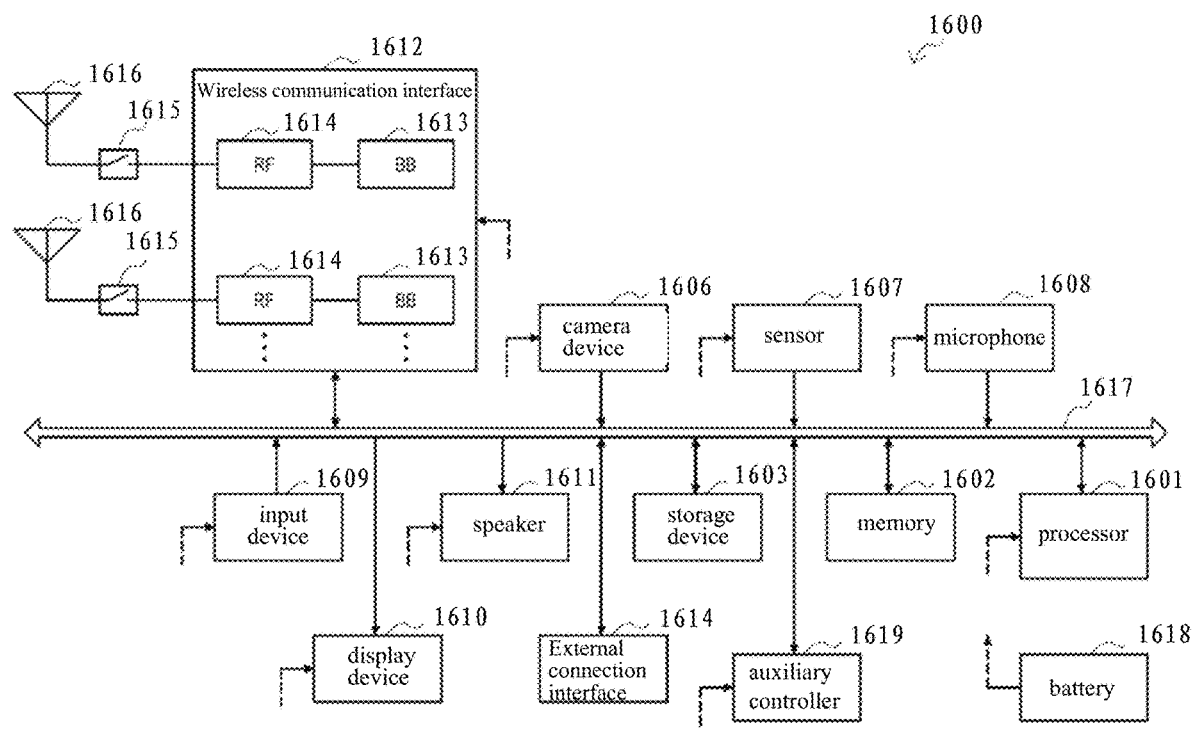
FIG. 28 is a block diagram showing an example of a schematic configuration of a smartphone to which the technology of the present disclosure can be applied.

FIG. 28 is a block diagram showing an example of a schematic configuration of a smartphone 1600 to which the technology of the present disclosure can be applied. The smartphone 1600 includes a processor 1601, a memory 1602, a storage device 1603, an external connection interface 1604, a camera device 1606, a sensor 1607, a microphone 1608, an input device 1609, a display device 1610, a speaker 1611, a wireless communication interface 1612, one or more antenna switches 1615, one or more antennas 1616, a bus 1617, a battery 1618, and an auxiliary controller 1619. In an implementation manner, the smart phone 1600 (or the processor 1601) herein may correspond to the foregoing terminal equipment 300B and/or 1500A.

The processor 1601 may be, for example, a CPU or a system on chip (SoC), and controls functions of an application layer and another layer of the smartphone 1600. The memory 1602 includes a RAM and a ROM, and stores data and programs executed by the processor 1601. The storage device 1603 may include a storage medium such as a semiconductor memory and a hard disk. The external connection interface 1604 is an interface for connecting external devices such as a memory card and a universal serial bus (USB) device to the smartphone 1600.

The camera device 1606 includes an image sensor such as a charge-coupled device (CCD) and a complementary metal oxide semiconductor (CMOS), and generates a captured image. The sensor 1607 may include a set of sensors such as a measurement sensor, a gyroscope sensor, a geomagnetic sensor, and an acceleration sensor. The microphone 1608 converts a sound input to the smartphone 1600 into an audio signal. The input device 1609 includes, for example, a touch sensor, a keypad, a keyboard, a button, or a switch configured to detect a touch on the screen of the display device 1610, and receives an operation or information input from a user. The display device 1610 includes a screen such as a liquid crystal display (LCD) and an organic light emitting diode (OLED) display, and displays an output image of the smartphone 1600. The speaker 1611 converts an audio signal output from the smartphone 1600 into a sound.

The wireless communication interface 1612 supports any cellular communication scheme such as LTE and LTE-Advanced, and performs wireless communication. The wireless communication interface 1612 may generally include, for example, a BB processor 1613 and an RF circuit 1614. The BB processor 1613 may perform, for example, encoding/decoding, modulation/demodulation, and multiplexing/demultiplexing, and perform various types of signal processing for wireless communication. Meanwhile, the RF circuit 1614 may include, for example, a mixer, a filter, and an amplifier, and transmits and receives wireless signals via the antenna 1616. The wireless communication interface 1612 may be a chip module on which a BB processor 1613 and an RF circuit 1614 are integrated. As shown in FIG. 28, the wireless communication interface 1612 may include multiple BB processors 1613 and multiple RF circuits 1614. Although FIG. 28 illustrates an example in which the wireless communication interface 1612 includes a plurality of BB processors 1613 and a plurality of RF circuits 1614, the wireless communication interface 1612 may also include a single BB processor 1613 or a single RF circuit 1614.

In addition, in addition to the cellular communication scheme, the wireless communication interface 1612 may support other types of wireless communication scheme, such as a short-range wireless communication scheme, a near field communication scheme, and a wireless local area network (LAN) scheme. In this case, the wireless communication interface 1612 may include a BB processor 1613 and an RF circuit 1614 for each wireless communication scheme.

Each of the antenna switches 1615 switches a connection destination of the antenna 1616 between a plurality of circuits included in the wireless communication interface 1612 (for example, circuits for different wireless communication schemes).

Each of the antennas 1616 includes a single or multiple antenna elements, such as multiple antenna elements included in a MIMO antenna, and is used for the wireless communication interface 1612 to transmit and receive wireless signals. As shown in FIG. 28, the smartphone 1600 may include a plurality of antennas 1616. Although FIG. 28 illustrates an example in which the smart phone 1600 includes a plurality of antennas 1616, the smart phone 1600 may also include a single antenna 1616.

In addition, the smartphone 1600 may include an antenna 1616 for each wireless communication scheme. In this case, the antenna switch 1615 may be omitted from the configuration of the smartphone 1600.

The bus 1617 connects the processor 1601, the memory 1602, the storage device 1603, the external connection interface 1604, the camera device 1606, the sensor 1607, the microphone 1608, the input device 1609, the display device 1610, the speaker 1611, the wireless communication interface 1612, and the auxiliary controller 1619 to each other. The battery 1618 supplies power to each block of the smartphone 1600 shown in FIG. 28 via a feeder, and the feeder is partially shown as a dotted line in the figure. The auxiliary controller 1619 operates the minimum necessary functions of the smartphone 1600 in the sleep mode, for example.

Second Example

Figure 29:
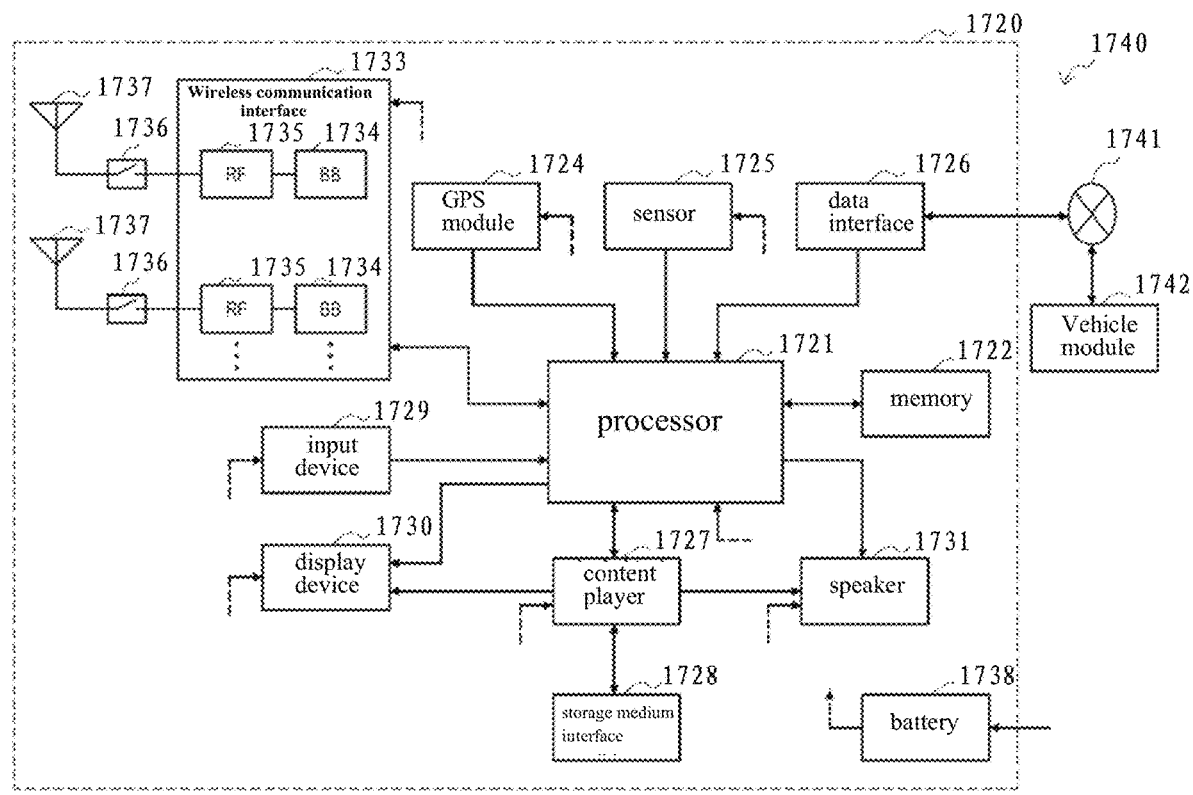
FIG. 29 is a block diagram showing an example of a schematic configuration of a car navigation device to which the technology of the present disclosure can be applied.

FIG. 29 is a block diagram showing an example of a schematic configuration of a car navigation device 1720 to which the technology of the present disclosure can be applied. The car navigation device 1720 includes a processor 1721, a memory 1722, a global positioning system (GPS) module 1724, a sensor 1725, a data interface 1726, a content player 1727, a storage medium interface 1728, an input device 1729, a display device 1730, a speaker 1731, and a wireless communication interface 1733, one or more antenna switches 1736, one or more antennas 1737, and a battery 1738. In an implementation manner, the car navigation device 1720 (or the processor 1721) herein may correspond to the terminal equipment 300B and/or 1500A described above.

The processor 1721 may be, for example, a CPU or a SoC, and controls navigation functions and other functions of the car navigation device 1720. The memory 1722 includes a RAM and a ROM, and stores data and programs executed by the processor 1721.

The GPS module 1724 uses a GPS signal received from a GPS satellite to measure the position (such as latitude, longitude, and altitude) of the car navigation device 1720. The sensor 1725 may include a set of sensors such as a gyroscope sensor, a geomagnetic sensor, and an air pressure sensor. The data interface 1726 is connected to, for example, an in-vehicle network 1741 via a terminal not shown, and acquires data (such as vehicle speed data) generated by the vehicle.

The content player 1727 reproduces content stored in a storage medium such as a CD and a DVD, which is inserted into the storage medium interface 1728. The input device 1729 includes, for example, a touch sensor, a button, or a switch configured to detect a touch on the screen of the display device 1730, and receives an operation or information input from a user. The display device 1730 includes a screen such as an LCD or OLED display, and displays an image of a navigation function or reproduced content. The speaker 1731 outputs the sound of the navigation function or the reproduced content.

The wireless communication interface 1733 supports any cellular communication scheme such as LTE and LTE-Advanced, and performs wireless communication. The wireless communication interface 1733 may generally include, for example, a BB processor 1734 and an RF circuit 1735. The BB processor 1734 may perform, for example, encoding/decoding, modulation/demodulation, and multiplexing/demultiplexing, and perform various types of signal processing for wireless communication. Meanwhile, the RF circuit 1735 may include, for example, a mixer, a filter, and an amplifier, and transmit and receive wireless signals via the antenna 1737. The wireless communication interface 1733 may also be a chip module on which a BB processor 1734 and an RF circuit 1735 are integrated. As shown in FIG. 29, the wireless communication interface 1733 may include a plurality of BB processors 1734 and a plurality of RF circuits 1735. Although FIG. 29 shows an example in which the wireless communication interface 1733 includes a plurality of BB processors 1734 and a plurality of RF circuits 1735, the wireless communication interface 1733 may also include a single BB processor 1734 or a single RF circuit 1735.

In addition, in addition to the cellular communication scheme, the wireless communication interface 1733 may support other types of wireless communication scheme, such as a short-range wireless communication scheme, a near field communication scheme, and a wireless LAN scheme. In this case, the wireless communication interface 1733 may include a BB processor 1734 and an RF circuit 1735 for each wireless communication scheme.

Each of the antenna switches 1736 switches the connection destination of the antenna 1737 between a plurality of circuits included in the wireless communication interface 1733, such as circuits for different wireless communication schemes.

Each of the antennas 1737 includes a single or multiple antenna elements, such as multiple antenna elements included in a MIMO antenna, and is used for the wireless communication interface 1733 to transmit and receive wireless signals. As shown in FIG. 29, the car navigation device 1720 may include a plurality of antennas 1737. Although FIG. 29 shows an example in which the car navigation device 1720 includes a plurality of antennas 1737, the car navigation device 1720 may also include a single antenna 1737.

In addition, the car navigation device 1720 may include an antenna 1737 for each wireless communication scheme. In this case, the antenna switch 1736 may be omitted from the configuration of the car navigation device 1720.

The battery 1738 supplies power to each block of the car navigation device 1720 shown in FIG. 29 via a feeder, and the feeder is partially shown as a dotted line in the figure. The battery 1738 accumulates power provided from the vehicle.

The technology of the present disclosure may also be implemented as a vehicle on-board system (or vehicle) 1740 including one or more of a car navigation device 1720, an in-vehicle network 1741, and a vehicle module 1742. The vehicle module 1742 generates vehicle data such as vehicle speed, engine speed, and failure information, and outputs the generated data to the in-vehicle network 1741.

The exemplary embodiments of the present disclosure have been described above with reference to the accompanying drawings, but the present disclosure is of course not limited to the above examples. A person skilled in the art may find various alternations and modifications within the scope of the appended claims, and it should be understood that they will naturally fall in the technical scope of the present disclosure.

For example, a plurality of functions included in one unit in the above embodiments may be implemented by separate devices. Alternatively, multiple functions implemented by multiple units in the above embodiments may be implemented by separate devices, respectively. In addition, one of the above functions may be implemented by multiple units. Needless to say, such configurations are included in the technical scope of the present disclosure.

In this specification, the steps described in the flowchart include not only processes performed in time series in the described order, but also processes performed in parallel or individually instead of having to be performed in time series. Further, even in the steps processed in a time series, needless to say, the order can be appropriately changed.

Although the present disclosure and its advantages have been described in detail, it should be understood that various changes, substitutions and alterations can be made hereto without departing from the spirit and scope of the present disclosure as defined by the appended claims. Furthermore, the terms "including", "comprising", or any other variation thereof, of the embodiments of the present disclosure are intended to encompass non-exclusive inclusion, such that a process, method, article, or device that includes a series of elements includes not only those elements, but also includes other elements not explicitly listed, or those inherent in the process, method, article, or equipment. Without more restrictions, the elements defined by the sentence "including a . . . " do not exclude the existence of other identical elements in the process, method, article, or equipment including the elements.

What is claimed is:

1. An electronic device for a receiver side of a wireless communication system, including a processing circuitry configured to:
    estimate, based on reference signals or synchronization signals which are transmitted from the transmitter side via a first beam, a parameter for channel path corresponding to the first beam,
    estimate, based on reference signals which are transmitted from a transmitter side of the wireless communication system via at least one second beam included in coverage of the first beam, each at least one second beam being narrower than the first beam, parameters for channel paths from the transmitter to the receiver corresponding to the second beam, and
    wherein a particular second beam of the at least one second beam is selected when the estimated parameter for channel path corresponding to the particular second beam matches the parameter for channel path corresponding to the first beam.

2. The electronic device of claim 1, wherein the parameter for channel path include a path gain, and
    wherein when a path gain of a channel path corresponding to a second beam is greater than a path gain of a target path corresponding to the first beam by more than a gain threshold, it is determined that the parameter for channel path corresponding to the second beam matches the parameter for channel path corresponding to the first beam.

3. The electronic device of claim 2, wherein, the gain threshold is set based on a difference between a maximum path gain corresponding to the first beam and a maximum path gain corresponding to the second beam.

4. The electronic device of claim 1, wherein, the parameter for channel path include a path delay, and
wherein, when a difference between the path delay of the channel path corresponding to a second beam and a path delay of a target path corresponding to the first beam is less than a delay threshold, it is determined that the parameter for channel path corresponding to the second beam matches the parameter for channel path corresponding to the first beam.

5. The electronic device of claim 4, wherein, the delay threshold is set based on a delay estimation accuracy.

6. The electronic device of claim 1, wherein, the reference signal includes one or more of CSI-RS, UE-RS, SRS, DMRS.

7. The electronic device of claim 1, wherein, the synchronization signal includes one or both of PSS or SSS.

8. The electronic device of claim 1, wherein, the estimated parameter for channel path corresponding to the particular second beam or beam information of the particular second beam are fed back to the transmitter.

9. The electronic device of claim 8, wherein, the beam information at least includes one or both of beam index and beam quality.

10. The electronic device of claim 1, wherein, the processing circuitry is further configured to:
after the particular second beam is selected, cease estimation of parameters for channel paths corresponding to the remaining second beams.

11. The electronic device of claim 1, wherein, the processing circuitry is further configured to:
estimate, based on reference signals from the transmitter, channel states on a communication resource carrying the reference signals; and
estimate the parameters for channel paths by using the estimated channel states of the communication resource.

12. The electronic device of claim 1, wherein, the reference signals are distributed over communication resources in a first frequency domain range of the communication system, and frequency domain resources of the communication system are divided into a plurality of orthogonal frequency domain ranges including the first frequency domain range.

13. The electronic device of claim 1, wherein, the reference signals are distributed at a predetermined interval over a frequency domain, and the predetermined interval is determined based on a maximum delay spread of channel and a frequency domain interval between adjacent communication resources in the communication system.

14. An electronic device for a receiver side of a wireless communication system, including a processing circuitry configured to:
estimate a receive channel path parameter based on reference signals which are received with a first beam acting as a receiving beam and transmitted from a transmitter side of the wireless communication system with a second beam acting as a transmission beam;
transmit reference signals to the transmitter side with the first beam acting as a transmission beam, wherein the transmitter side receives the reference signals with the second beam acting as a receiving beam, so that a transmit channel path parameter can be estimated;
wherein beam reciprocity between the transmitter side and the receiver side is determined based on the receive channel path parameter and the transmit channel path parameter,
wherein each of the receive channel path parameter and transmit channel path parameter includes a channel path delay, and
wherein, when a difference between the receive channel path delay and the transmit channel path delay is less than a delay threshold, there exists a beam reciprocity between the transmitter side and the receiver side.

15. The electronic device of claim 14, wherein, each of the receive channel path parameter and transmit channel path parameter includes a channel path gain, and
wherein when a difference between the receive channel path gain and the transmit channel path gain is less than a gain threshold, there exists a beam reciprocity between the transmitter side and the receiver side.

16. An electronic device for a receiver side of a wireless communication system including a processing circuitry configured to:
for each of a plurality of transmission beams which are used for transmitting reference signals by a transmitter side of the wireless communication system, based on the reference signals transmitted via the transmission beam, estimate a path gain magnitude in a time domain of a channel path from the transmitter to the receiver corresponding to the transmission beam and
wherein a particular one of the plurality of transmission beams is selected based on the estimated path gain magnitude in the time domain,
wherein the path gain magnitude in the time domain is a magnitude of a time-domain impulse response of the channel path.

17. The electronic device of claim 16, wherein, among the plurality of transmission beams, the path gain magnitude in the time domain of the channel path covered by the particular transmission beam is maximum.

* * * * *